US012736956B2

(12) United States Patent
Waga et al.

(10) Patent No.: US 12,736,956 B2
(45) Date of Patent: Sep. 15, 2026

(54) MONITORING DEVICE AND MONITORING METHOD

(71) Applicants: INTER-UNIVERSITY RESEARCH INSTITUTE CORPORATION RESEARCH ORGANIZATION OF INFORMATION AND SYSTEMS, Tokyo (JP); UNIVERSITE DE LORRAINE, Nancy cedex (FR)

(72) Inventors: Masaki Waga, Tokyo (JP); Etienne Andre, Paris (FR); Ichiro Hasuo, Tokyo (JP)

(73) Assignees: INTER-UNIVERSITY RESEARCH INSTITUTE CORPORATION RESEARCH ORGANIZATION OF INFORMATION AND SYSTEMS, Tokyo (JP); UNIVERSITE DE LORRAINE, Nancy cedex (FR)

( * ) Notice: Subject to any disclaimer, the term of this patent is extended or adjusted under 35 U.S.C. 154(b) by 594 days.

(21) Appl. No.: 18/338,058

(22) Filed: Jun. 20, 2023

(65) Prior Publication Data

US 2023/0333546 A1 Oct. 19, 2023

Related U.S. Application Data

(63) Continuation of application No. PCT/JP2021/047731, filed on Dec. 22, 2021.

(30) Foreign Application Priority Data

Dec. 24, 2020 (JP) ................................ 2020-215603

(51) Int. Cl.
*G05B 23/02* (2006.01)
*G06F 11/07* (2006.01)
*G16Y 40/20* (2020.01)

(52) U.S. Cl.
CPC .............. *G05B 23/02* (2013.01); *G06F 11/07* (2013.01); *G05B 23/0232* (2013.01); *G06F 2201/88* (2013.01); *G16Y 40/20* (2020.01)

(58) Field of Classification Search
USPC .......................................................... 702/182
See application file for complete search history.

(56) References Cited

U.S. PATENT DOCUMENTS 6,073,089 A 6/2000 Baker et al.
2002/0016640 A1* 2/2002 Gagne .................. G05B 13/042 700/29

(Continued)

FOREIGN PATENT DOCUMENTS

DE 10-2004-037352 3/2006
JP 2015-194917 11/2015
WO 2016/152750 9/2016

OTHER PUBLICATIONS

International Search Report for PCT/JP2021/047731 mailed on Mar. 15, 2022.

(Continued)

*Primary Examiner* — Paul D Lee
(74) *Attorney, Agent, or Firm* — IPUSA, PLLC

(57) ABSTRACT

The present disclosure aims to provide a technique for monitoring the behavior of a control system accurately. One aspect of the present invention relates to a monitoring device having: an acquiring part configured to acquire observed values of a variable that is sampled with respect to a behavior of a control system while the control system is running; and a determining part configured to determine a range of possible observed values that the variable possibly reaches upon a temporal change thereof, based on the acquired observed values, and determine whether a variation range of the acquired observed values satisfies a specifica- (Continued)

tion, based on an overlap between the range of the possible observed values and a range not satisfying the specification.

12 Claims, 56 Drawing Sheets

(56) References Cited

U.S. PATENT DOCUMENTS

| | | | | |
|---|---|---|---|---|
| 2007/0113629 | A1 | 5/2007 | Lohmiller et al. | |
| 2012/0210173 | A1* | 8/2012 | Schloegel | G06F 11/3608 714/E11.029 |
| 2016/0163179 | A1 | 6/2016 | Matsumoto et al. | |
| 2018/0005118 | A1* | 1/2018 | Kapoor | G06N 7/01 |
| 2018/0118207 | A1 | 5/2018 | Ishiguro et al. | |
| 2018/0314238 | A1* | 11/2018 | Fujita | G05B 19/4184 |
| 2019/0051547 | A1* | 2/2019 | Kang | H01L 21/67253 |
| 2019/0179988 | A1* | 6/2019 | Malik | G06F 9/4498 |

OTHER PUBLICATIONS

Nakamura, Katsunori et al. "On a Nonstandard Model of Hybrid Automaton" Transactions of the Institute of Systems, Control and Information Engineers [online], vol. 23, No. 2, 2010, pp. 29-38, [retrieval date Mar. 1, 2022], Internet: <URL: https:/ /www.jstage.jst.go.jp/article/iscie/23/2/23_2_29/_pdf>, cited in the International Search Report for PCT/JP2021/047731 mailed on Mar. 15, 2022.

Office Action mailed on Mar. 11, 2025 with respect to the corresponding Japanese patent application No. 2022-571593.

Yuichi Tasaki et al., "Analysis and Control of Hybrid Systems", Measurement and Control, The Society of Measurement and Automatic Control, Apr. 10, 2013, vol. 52, No. 4, pp. 329-335 (With Partial Translation).

Extended European Search Report mailed on May 23, 2024 with respect to the corresponding European patent application No. 21910918.8.

* cited by examiner

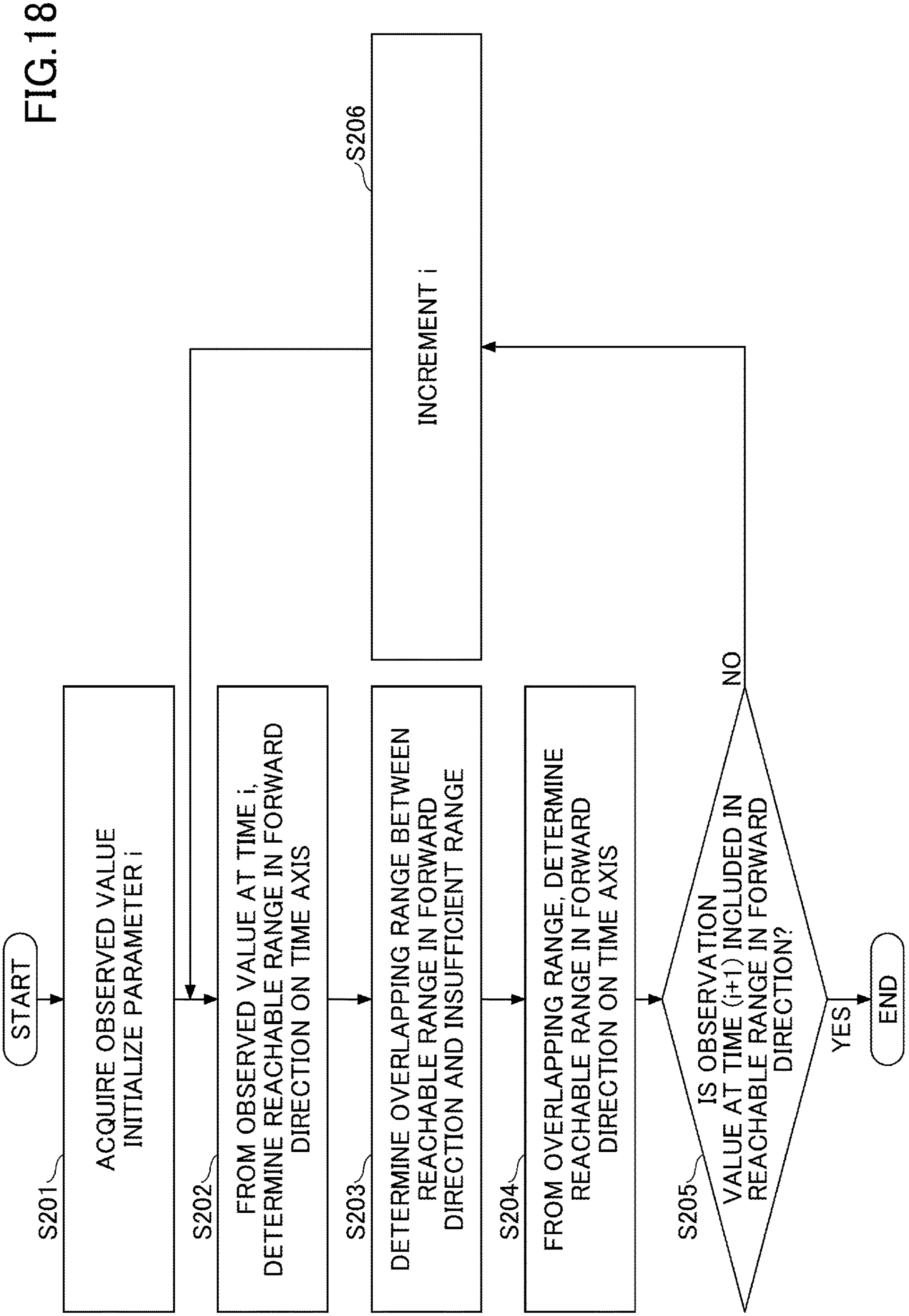

FIG.18
START
S201
ACQUIRE OBSERVED VALUE
INITIALIZE PARAMETER i
S202
FROM OBSERVED VALUE AT TIME i, DETERMINE REACHABLE RANGE IN FORWARD DIRECTION ON TIME AXIS
S203
DETERMINE OVERLAPPING RANGE BETWEEN REACHABLE RANGE IN FORWARD DIRECTION AND INSUFFICIENT RANGE
S204
FROM OVERLAPPING RANGE, DETERMINE REACHABLE RANGE IN FORWARD DIRECTION ON TIME AXIS
S205
IS OBSERVATION VALUE AT TIME (i+1) INCLUDED IN REACHABLE RANGE IN FORWARD DIRECTION?
YES
END
NO
S206
INCREMENT i t>0
T ∈ [75−2t, 75]
start
OFF
dT/dt ∈ [−2, 0]
ON
dT/dt ∈ [2, 4]
T<70 or T>80
OFF
dT/dt ∈ [−2, 0]
ON
dT/dt ∈ [2, 4]
T<70 or T>80
TEMPERATURE T [°C]
80
78
76
74
72
70
TIME t
0
2
4
6
F1OFF1
i = 1
i = 2
i = 3
i = 4 t>0 T ∈ [75−2t, 75+4t]
t>0 T ∈ [75−2t, 75+4t]
start
OFF dT/dt ∈ [−2, 0]
ON dT/dt ∈ [2, 4]
T<70 or T>80
T<70 or T>80
OFF dT/dt ∈ [−2, 0]
ON dT/dt ∈ [2, 4]
t>0 T ∈ [75−2t, 75+4t] ∧ (T<70 V T>80)
RANGE IN WHICH T<70 V T>80 IS SATISFIED DURING OFF
N
$I_1$
TEMPER-ATURE T [°C]
80
78
76
74
72
70
i = 1
i = 2
i = 3
i = 4
TIME t
0
2
4
6
$I_1$
N
RANGE IN WHICH T<70 V T>80 IS SATISFIED DURING OFF t>0
T ∈ [75−2t, 75+4t]
t>0
T ∈ [75−2t, 75+4t]
t>5/4 ∧ T ∈ [82.5−2t, 75+4t]
start
OFF
dT/dt ∈ [−2, 0]
ON
dT/dt ∈ [2, 4]
TEMPER-
ATURE
T [°C]
80
78
76
74
72
70
i = 1
i = 2
i = 3
i = 4
F2OFF1
TIME t
0
2
4
6
T<70 or T>80
T<70 or T>80
OFF
dT/dt ∈ [−2, 0]
ON
dT/dt ∈ [2, 4]
(t>5/2 ∧ T ∈ [75−2t, 60+4t])
∨ (t>5/4 ∧ T ∈ [82.5−2t, 75+4t])
t>5/2 ∧ T ∈ [75−2t, 60+4t]

$t>0$
$T \in [75-2t, 75+4t]$ start

OFF
$dT/dt \in [-2, 0]$ $t>0$
$T \in [75-2t, 75+4t]$

ON
$dT/dt \in [2, 4]$

T<70 or T>80

T<70 or T>80

OFF
$dT/dt \in [-2, 0]$ $(t>5/2 \wedge T \in [75-2t, 60+4t])$
$\vee (t>5/4 \wedge T \in [82.5-2t, 75+4t])$ ON
$dT/dt \in [2, 4]$ $(t>5/2 \wedge T \in [75-2t, 60+4t])$
$\vee (t>5/4 \wedge T \in [82.5-2t, 75+4t])$ $t>5/4 \wedge T \in [82.5-2t, 75+4t]$ $t>5/2 \wedge T \in [75-2t, 60+4t]$

TEMPERATURE T [°C]

80
78
76
74
72
70

0
2
4
6

TIME t i = 1
i = 2
i = 3
i = 4

F2OFF
=F2ON t>0
T ∈ [75−2t, 75+4t]
t>0
T ∈ [75−2t, 75+4t]
NOT IN DANGEROUS RANGE
start
OFF
dT/dt ∈ [−2, 0]
ON
dT/dt ∈ [2, 4]
TEMPERATURE T [°C]
80
78
76
74
72
70
F2
i = 1
i = 2
i = 3
i = 4
T<70 or T>80
T<70 or T>80
TIME t
0
2
4
6
OFF
dT/dt ∈ [−2, 0]
ON
dT/dt ∈ [2, 4]
(t>5/2 ∧ T ∈ [75−2t, 60+4t])
∨ (t>5/4 ∧ T ∈ [82.5−2t, 75+4t])
t >5/2 ∧ T ∈ [75−2t, 60+4t]

t>0
T ∈ [75−2t, 75+4t]
t>0
T ∈ [75−2t, 75+4t]
start
OFF
dT/dt ∈ [−2, 0]
ON
dT/dt ∈ [2, 4]
T<70 or T>80
T<70 or T>80
OFF
dT/dt ∈ [−2, 0]
ON
dT/dt ∈ [2, 4]
(t>5/2 ∧ T ∈ [75−2t, 60+4t])
∨ (t>5/4 ∧ T ∈ [82.5−2t, 75+4t])
TEMPER-ATURE T [°C]
80
78
76
74
72
70
0
2
4
6
TIME t
F2₁
i = 1
i = 2
i = 3
i = 4
INCLUDED IN REACHING RANGE t>2
T ∈ [79−2t, 67+4t]
t>2
T ∈ [79−2t, 67+4t]
start
OFF
dT/dt ∈ [−2, 0]
ON
dT/dt ∈ [2, 4]
T<70 or T>80
T<70 or T>80
OFF
dT/dt ∈ [−2, 0]
ON
dT/dt ∈ [2, 4]
(t>9/2 ∧ T ∈ [79−2t, 52+4t])
∨ (t>13/4 ∧ T ∈ [76.5−2t, 57+4t])
(t>9/2 ∧ T ∈ [79−2t, 52+4t])
∨ (t>13/4 ∧ T ∈ [76.5−2t, 57+4t])
TEMPERATURE T [°C]
80
78
76
74
72
70
i = 1
i = 2
i = 3
i = 4
F2₂
0
2
4
6
TIME t t>4
T ∈ [79−2t, 55+4t]
t>2
T ∈ [79−2t, 55+4t]
start
OFF
dT/dt ∈ [−2, 0]
ON
dT/dt ∈ [2, 4]
T<70 or T>80
T<70 or T>80
OFF
dT/dt ∈ [−2, 0]
ON
dT/dt ∈ [2, 4]
(t>9/2 ∧ T ∈ [79−2t, 52+4t])
∨ (t>25/4 ∧ T ∈ [92.5−2t, 55+4t])
TEMPERATURE T [°C]
80
78
76
74
72
70
0
2
4
6
TIME t
i = 1
i = 2
i = 3
i = 4
F2₃

HIGH
v≥30
dv/dt ∈ [−6, 7]
dc/dt=1 v≥120

HIGH
v≥30
dv/dt ∈ [−6, 7]
dc/dt=1 v≥45, c≥2/c:= 0 v≤50, c≥2/c:=0 v≥45, c≥2/c:= 0 v≤50, c≥2/c:=0

LOW
v ∈ [0, 90]
dv/dt ∈ [−6, 15]
dc/dt=1 v≥120

LOW
v ∈ [0, 90]
dv/dt ∈ [−6, 15]
dc/dt=1 c:=0 t=1, c=0, THAT IS
t=c+1=1
v=30 t=c+1 ∈ [1, 6],
v ∈ [0, 90]
−6t+36≤v≤15t+15 v+8c≤15t+15,
3≤c+3≤t≤6, 30≤v
v ∈ [45−6c, 90+7c]

c:=0

LOW
v ∈ [0, 90]
dv/dt ∈ [−6, 15]
dc/dt=1 v≥45, c≥2/c:= 0

HIGH
v≥30
dv/dt ∈ [−6, 7]
dc/dt=1 v≤50, c≥2/c:=0 v≥120 v≥120 v≥45, c≥2/c:= 0

LOW
v ∈ [0, 90]
dv/dt ∈ [−6, 15]
dc/dt=1

HIGH
v≥30
dv/dt ∈ [−6, 7]
dc/dt=1 v≤50, c≥2/c:=0 t=6, c=5,
v=90 c:=0

LOW
v ∈ [0, 90]
dv/dt ∈ [−6, 15]
dc/dt=1 t=6,
0≤c≤15/8
v=90

HIGH
v≥30
dv/dt ∈ [−6, 7]
dc/dt=1 v≥45, c≥2/c:= 0 v≤50, c≥2/c:=0 v≥120 v≥120

LOW
v ∈ [0, 90]
dv/dt ∈ [−6, 15]
dc/dt=1

HIGH
v≥30
dv/dt ∈ [−6, 7]
dc/dt=1 v≥45, c≥2/c:= 0 v≤50, c≥2/c:=0 t=c+1 ∈ [6, 15],
90−6(t−6)≤v≤90
c:=0
LOW
v ∈ [0, 90]
dv/dt ∈ [−6, 15]
dc/dt=1
v≥45, c≥2/c:= 0
v≤50, c≥2/c:=0
HIGH
v≥30
dv/dt ∈ [−6, 7]
dc/dt=1
t ∈ [6, 15], 0≤c≤15/8+(t−6),
90−6(t−6)≤v≤90+7(t−6),
v≤90+7c, 45≤v+6c
v≥120
v≥120
LOW
v ∈ [0, 90]
dv/dt ∈ [−6, 15]
dc/dt=1
v≥45, c≥2/c:= 0
v≤50, c≥2/c:=0
HIGH
v≥30
dv/dt ∈ [−6, 7]
dc/dt=1
t ∈ [6, 15], 0≤c≤15/8+(t−6),
90−6(t−6)≤v≤90+7(t−6),
v≤90+7c, v≤120, 45≤v+6c t ∈ [6, 15], 0≤c≤15/8+(t−6),
90−6(t−6)≤v≤90+7(t−6),
v≤90+7c, 45≤v+6c
v≤7t+48, v−90≤7c, 33≤8(t−c),
t≤15, 1272≤7v+42t,
1020≤7v+42c
HIGH
v≥30
dv/dt ∈ [−6, 7]
dc/dt=1
v≥120
HIGH
v≥30
dv/dt ∈ [−6, 7]
dc/dt=1
v≥45, c≥2/c:= 0
v≤50, c≥2/c:=0
v≥45, c≥2/c:= 0
v≤50, c≥2/c:=0
t=c+1 ∈ [6, 15],
90−6(t−6)≤v≤90
c:=0
LOW
v ∈ [0, 90]
dv/dt ∈ [−6, 15]
dc/dt=1
v≥120
LOW
v ∈ [0, 90]
dv/dt ∈ [−6, 15]
dc/dt=1

0<t≤10,
x1 ∈ [40+7.5t, 40+8.5t],
x2 ∈ [25+8.0t, 25+9.0t]
NORMAL
dx1/dt ∈ [7.5, 8.5]
dx2/dt ∈ [8.0, 9.0]
x1−x2≤4
x1−x2≥4
WIDEN
dx1/dt ∈ [11.0, 13.0]
dx2/dt ∈ [9.0, 11.0]
0<t≤10, x1≤13t−1/3,
−x1+11/3x2−20t≥92,
x2≤11t+31/3,
4x1−7x2+33t≥−15,
x1≥7.5t+40
x1−x2<1
x1−x2<1
NORMAL
dx1/dt ∈ [7.5, 8.5]
dx2/dt ∈ [8.0, 9.0]
x1−x2≤4
x1−x2≥4
WIDEN
dx1/dt ∈ [11.0, 13.0]
dx2/dt ∈ [9.0, 11.0]

MONITORING DEVICE AND MONITORING METHOD

CROSS-REFERENCE TO RELATED APPLICATION

The present application is a continuation filed under 35 U.S.C. 111(a) claiming the benefit under 35 U.S.C. 120 and 365(c) of PCT International Application No. PCT/JP2021/047731, filed on Dec. 22, 2021, and designating the U.S., which is based on and claims priority to Japanese Patent Application No. 2020-215603, filed on Dec. 24, 2020. The entire contents of PCT International Application No. PCT/JP2021/047731 and Japanese Patent Application No. 2020-215603 are incorporated herein by reference.

BACKGROUND OF THE INVENTION

1. Field of the Invention

The present disclosure relates to a monitoring device and a monitoring method.

2. Description of the Related Art

When inspecting the operation of a control system such as a cyber-physical model, parameters that relate to the operation of the control system are discretely sampled and monitored. When parameters are monitored based on discrete sampling, it is necessary to estimate and interpolate the changes with the parameters that occur between samplings as accurately as possible. Especially, in IoT (Internet of Things), the sampling interval is sometimes extended for reduced power consumption. However, accurate inspection of operation can be performed only by accurately monitoring the unsafe phenomena that occur between samplings.

Conventionally, linear interpolation and constant interpolation are used for parameter interpolation between samplings. In linear interpolation, sampling points are interpolated based on a linear formula, as shown in FIG. 1(*a*). In constant interpolation, sampling points are interpolated based on a constant, as shown in FIG. 1(*b*).

SUMMARY OF THE INVENTION

Technical Problem

However, the actual variation of a parameter between samplings might be as shown in FIG. 1(*c*), and conventional linear interpolation and constant interpolation cannot monitor such unsafe phenomena of the control system accurately.

In view of the above problem, the present disclosure aims to provide a technique for monitoring the behavior of a control system accurately.

Solution to Problem

In order to solve the above problem, one aspect of the present invention relates to a monitoring device that has: an acquiring part configured to acquire observed values of a variable that is sampled with respect to a behavior of a control system while the control system is running; and a determining part configured to determine a range of possible observed values that the variable possibly reaches upon a temporal change thereof, based on the acquired observed values, and determine whether a variation range of the acquired observed values satisfies a specification, based on an overlap between the range of the possible observed values and a range not satisfying the specification.

Advantageous Effects of the Invention

According to the present disclosure, it is possible to provide a technique for monitoring the behavior of a control system accurately.

BRIEF DESCRIPTION OF THE DRAWINGS

FIG. 18 is a diagram that shows a monitoring process according to an embodiment 2 of the present disclosure;

DETAILED DESCRIPTION OF THE PREFERRED EMBODIMENTS

In the following embodiment, a monitoring device for a control system such as a cyber-physical model will be disclosed.

[Overview]

Figure 1:
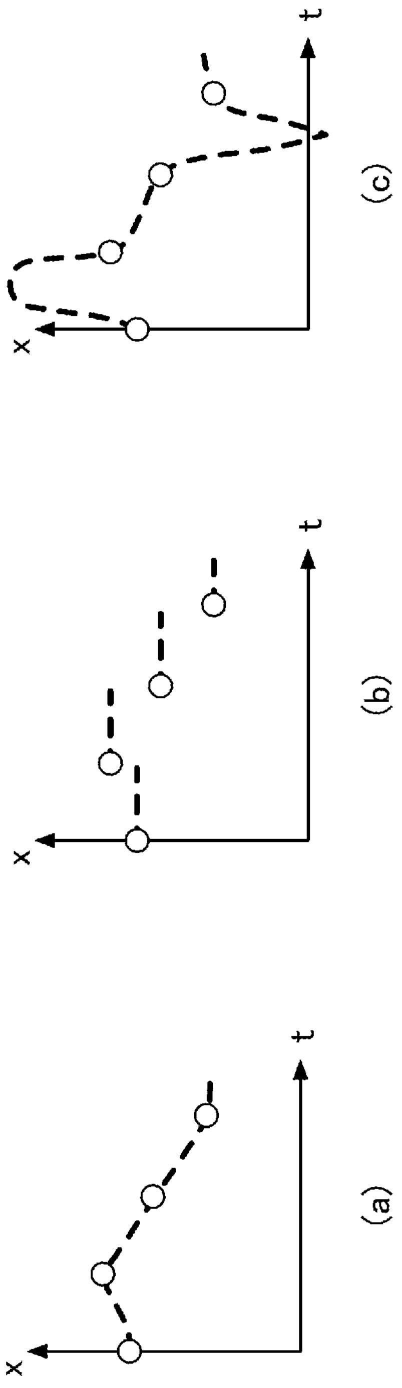
FIG. 1 is an overview that shows a specific example of a sampling method.
Figure 2:
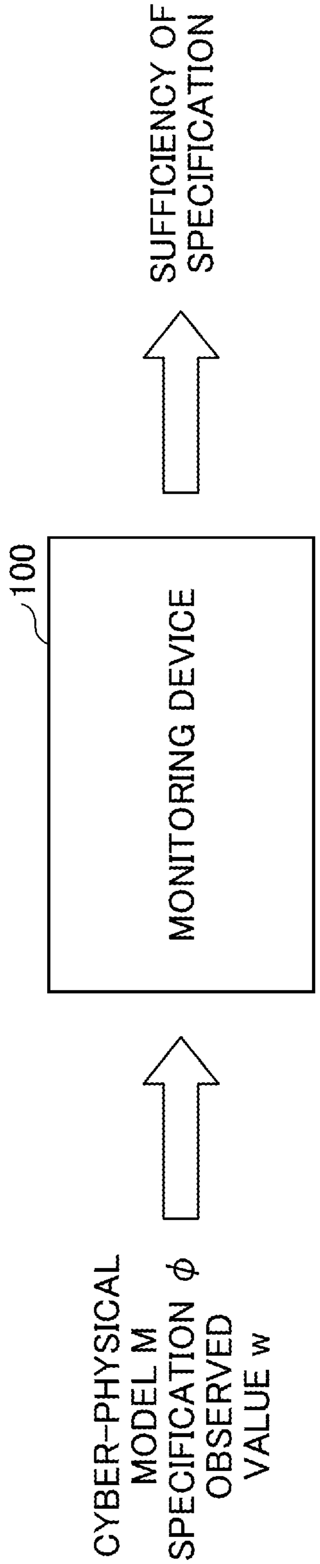
FIG. 2 is an overview that shows a monitoring device according to one embodiment of the present disclosure.

When a monitoring device 100 according to one embodiment of the present disclosure acquires a cyber-physical model M, a specification φ, and an observed value w of the cyber-physical model M, as shown in FIG. 2, the monitoring device 100 determines whether or not the cyber-physical model M satisfies the specification φ. The cyber-physical model M generally refers to a system that is built by combining a physical system such as an automobile, a robot, and a building, with an information system such as a computer.

In the following embodiment, the cyber-physical model M operates in discrete modes such as on mode and off mode, low-speed mode and high-speed mode, and so forth. As a result of such operation, for example, parameter values such as the velocity of an automobile, the amount of products a robot produces, the air-conditioning temperature in a building, and so forth vary. Such variation may be defined by, for example, conditions that express changes of parameter values over time, such as differential equations defined in advance for each discrete mode. Also, the specification φ may be, for example, "$v<v_0$" for velocity "v," "$p_0<p$" for the amount of product production per hour "p," "$tmp_L<tmp<tmp_H$" for the room temperature "tmp," and so forth.

While these parameter values vary substantially continuously, the observed values w of a parameter are sampling values collected on a discrete basis, such as at a predetermined sampling rate. Therefore, as mentioned earlier, observed values w cannot always explain the actual variation of parameter values between samplings, and it is not possible to determine whether the cyber-physical model M satisfies a specification φ based on observed values w.

While there are such limitations to sampling, the monitoring device 100 collects observed values w regarding a behavior of the cyber-physical model M, determines a possible variation range of a parameter value based on the collected observed values w, and determines whether the cyber-physical model M satisfies the specification φ based on the observed values w and the variation range.

Figure 3:
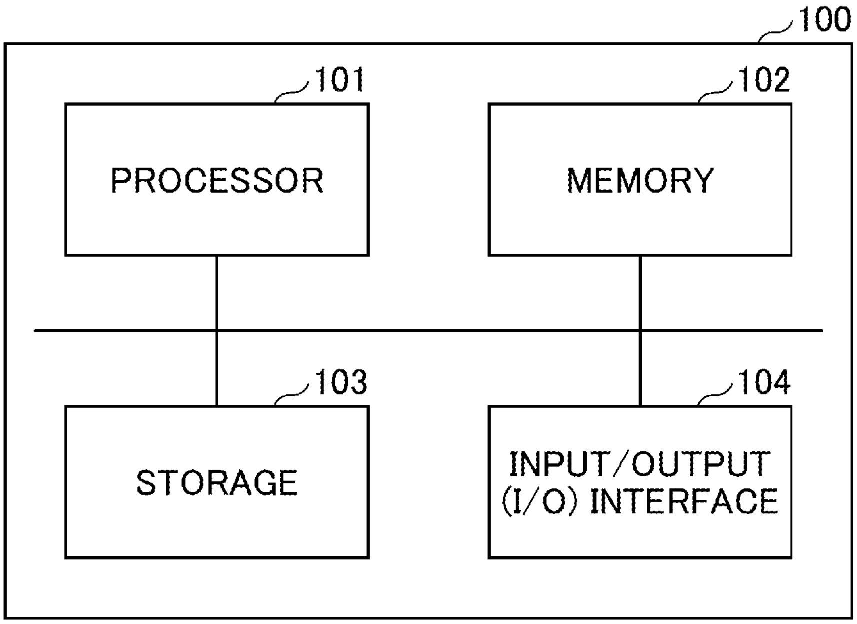
FIG. 3 is a block diagram that shows a hardware structure of a monitoring device according to one embodiment of the present disclosure.

Here, as shown in FIG. 3, for example, the monitoring device 100 may have a hardware structure including a processor 101 such as a central processing unit (CPU), a random access memory (RAM), a memory 102 such as a flash memory, a storage 103, and an input/output (I/O) interface 104.

The processor 101 executes various processes of the monitoring device 100, which will be described later.

The memory 102 stores various data and programs in the monitoring device 100, and, in particular, functions as a working memory for working data, running programs, and so forth. To be more specific, the memory 102 stores the programs that are loaded from the storage 103 to execute and control various processes, which will be described later, and functions as a working memory while the processor 101 executes these programs.

The storage 103 stores various data and programs in the monitoring device 100.

The I/O interface 104 is an interface for receiving commands, input data, and so forth from the user, playing/displaying the output results, and inputting/outputting data to and from external devices. For example, the I/O interface 104 may be a device for inputting/outputting various data, such as a universal serial bus (USB), a communication line, a keyboard, a mouse, a display, a microphone, a speaker, and the like.

However, the monitoring device 100 according to the present disclosure is by no means limited to the hardware structure described above, and may have any other suitable hardware structure. For example, one or more of various processes performed by the monitoring device 100 may be implemented by processing circuitry or electronic circuitry that is hardwired to accomplish these.

[Monitoring Device]

Figure 4:
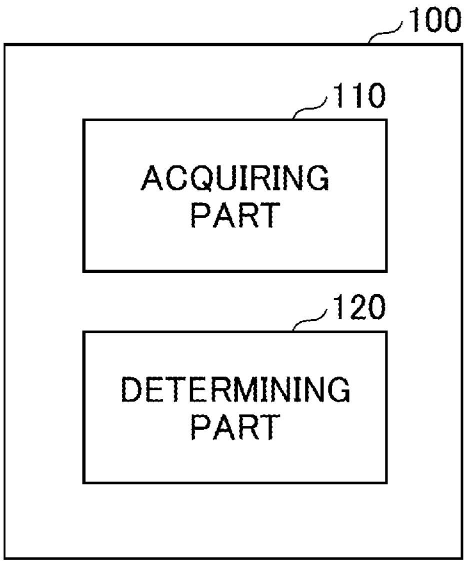
FIG. 4 is a block diagram that shows a functional structure of a monitoring device according to one embodiment of the present disclosure.

Next, the monitoring device 100 according to one embodiment of the present disclosure will be described with reference to FIG. 4. FIG. 4 is a block diagram that shows a functional structure of the monitoring device 100 according to one embodiment of the present disclosure.

As shown in FIG. 4, the monitoring device 100 has an acquiring part 110 and a determining part 120. The acquiring part 110 and determining part 120 are installed in the monitoring device 100, and implemented by one or more processors that execute one or more programs stored in one or more memories.

The acquiring part 110 acquires observed values sampled with respect to a behavior of the control system. To be more specific, the acquiring part 110 acquires the parameter values that are collected on a discrete basis during the operation of the cyber-physical model M, as observed values w.

For example, assuming that the cyber-physical model M is an automobile control system, the velocity, the engine speed, the number of gears, and so forth may be treated as parameter values. Also, if the cyber-physical model M is a robot control system, the amount of product production, the power consumption, and so forth may be treated as parameter values. Furthermore, if the cyber-physical model M is a building control system, the room temperature, the brightness of lighting, the power consumption, and so forth may be treated as parameter values. The observed values w may be, for example, a sequence of parameter values collected at a predetermined sampling rate. In the event the velocity is collected every x seconds while the cyber-physical model M is running and treated as observed values w, the observed values w can be expressed as: $w=(w_1, w_2, \ldots, w_n)$. Here, $w_i$ represents the velocity at a time i. The acquiring part 110 provides the acquired observed values w to the determining part 120.

The determining part 120 determines the variation range of the observed values with respect to a behavior of the control system, and determines whether the variation range of observed values satisfies the specification regarding observed values. To be more specific, upon acquiring observed values w, the determining part 120 determines the range of variation of the observed values w that can be reached from each observed value $w_i$, with respect to the behavior of the cyber-physical model M, by using a mathematical model, and determines whether the determined variation range satisfies the specification φ. Here, although a mathematical model using the behavior of the cyber-physical model M can be built if the exact behavior of the cyber-physical model M is known, if the exact behavior of the cyber-physical model M is not clear, a mathematical model can be used to determine an approximate operating range that covers the actual behavior of the cyber-physical model M. If the variation range does not satisfy the specification φ, the determining part 120 determines that the cyber-physical model M does not satisfy the specification φ. If the range of variation that can be reached from each observed value $w_i$ satisfies the specification φ, the determining part 120 determines that the cyber-physical model M satisfies the specification φ.

Embodiment 1

In one embodiment, the determining part 120 may determine a first reachable range that can be reached in the forward direction, between the observed value at time i and a time (i+1), and a second reachable range that can be reached in the backward direction, between the observed value at time (i+1) and time i, and determine whether the variation ranges satisfy the specification based on whether there is an overlapping range between a common range between the first reachable range and the second reachable range, and a range not satisfying the specification (also referred to as an "insufficient range"). To be more specific, for the observed value at each time i, the determining part 120 determines a reachable range $F_i$ that can be reached in the forward direction, between the observed value at time i and time (i+1), and a reachable range $B_i$ that can be reached in the backward direction, between the observed value at time (i+1) and time i, and determines whether the common range $I_i$ between the reachable ranges $F_i$ and $B_i$ overlap the specification's insufficient range N. When a common range $I_i$ that overlaps the insufficient range N is detected, the determining part 120 determines that the cyber-physical model M does not satisfy the specification φ. If the common range $I_i$ and the specification's insufficient range N do not overlap with respect to any of times i, the determining part 120 determines that the cyber-physical model M satisfies the specification φ.

Figure 5:
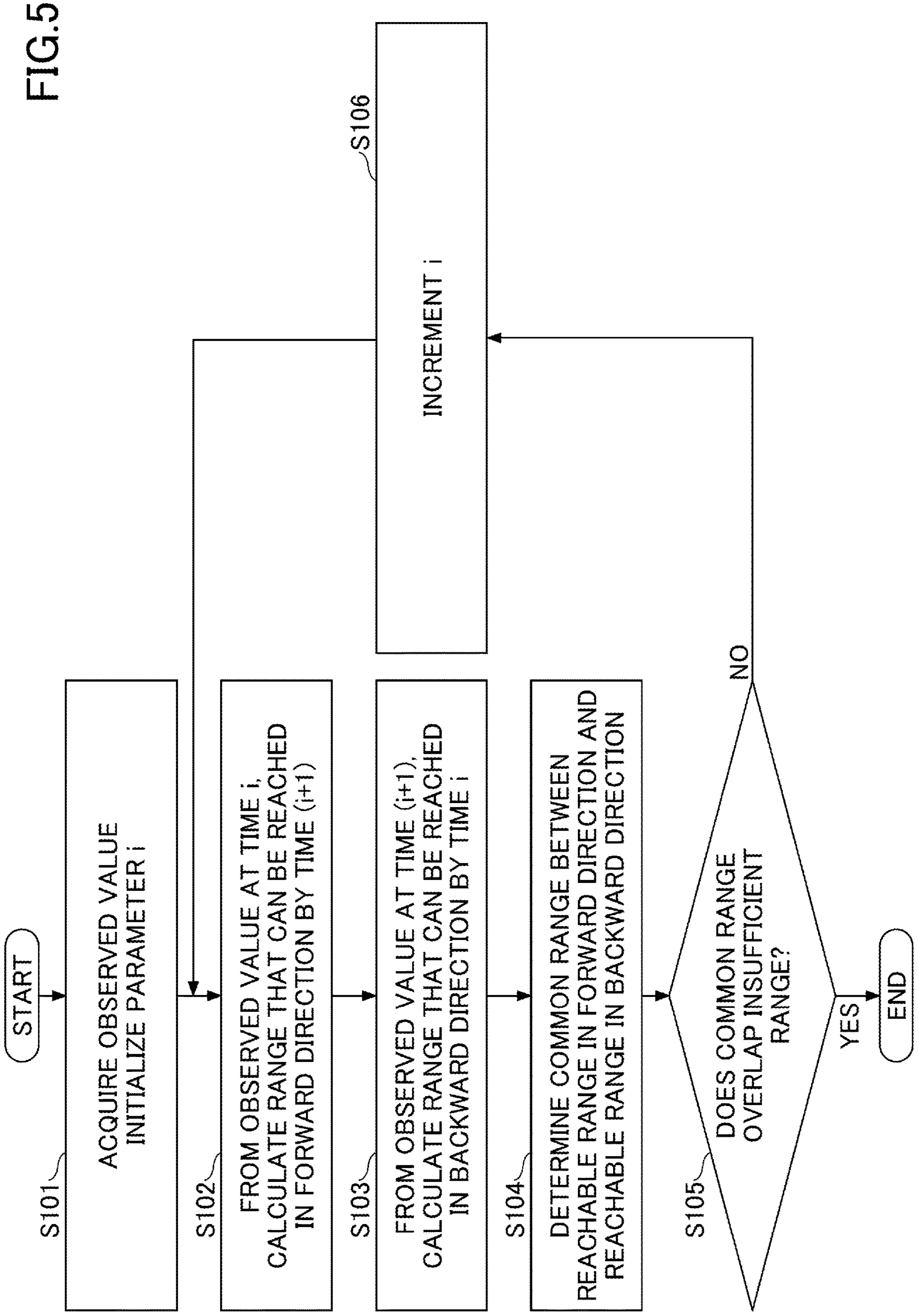
FIG. 5 is a flowchart that shows a monitoring process according to an embodiment 1 of the present disclosure.

FIG. 5 is a flowchart that shows the monitoring process according to embodiment 1 of the present disclosure. This monitoring process is performed by the monitoring device 100 described above, and can be realized, for example, by one or more processors that execute programs stored in one or more memories of the monitoring device 100.

As shown in FIG. 5, in step S101, the acquiring part 110 acquires observed values $w=(w_1, w_2, \ldots, w_n)$ for the cyber-physical model M, and initializes a parameter i as: i=1.

In step S102, the determining part 120 determines a forward-direction reachable range $F_i$ that can be reached in the forward direction on the time axis, between the observed value $w_i$ at time i and time (i+1). For example, if the variation range of observed values per unit time is made clear in advance from a differential equation that determines the variation of a parameter value over time, the determining part 120 may determine the forward-direction reachable range $F_i$ based on the observed value $w_i$ at time i and the variation range.

In step S103, the determining part 120 determines a backward-direction reachable range $B_i$ that can be reached in the backward direction, between the observed value $w_{i+1}$ at time (i+1) and time i. For example, if a differential equation that defines the changes of a parameter value over time makes clear, in advance, the variation range of observed values per unit time, the determining part 120 may determine the backward-direction reachable range $B_i$ based on the observed value $w_i$+1 at time (i+1) and the variation range.

In step S104, the determining part 120 determines the common range $I_i$ between the forward-direction reachable range $F_i$ and the backward-direction reachable range $B_i$. The common range $I_i$ is a range in which the forward-direction reachable range $F_i$ and the backward-direction reachable range $B_i$ overlap.

In step S105, the determining part 120 determines whether the common range $I_i$ overlaps the insufficient range N according to the specification p. If the common range $I_i$ and the insufficient range N overlap (S105: YES), the determining part 120 determines that the cyber-physical model M does not satisfy the specification φ, and ends the process. On the other hand, if the common range $I_i$ and the insufficient range N do not overlap (S105: NO), the determining part 120 increments the parameter i in step S106, and repeats steps S102 to S105.

[Monitoring Process for Constant Temperature Bath Control System According to Embodiment 1]

Figure 6:
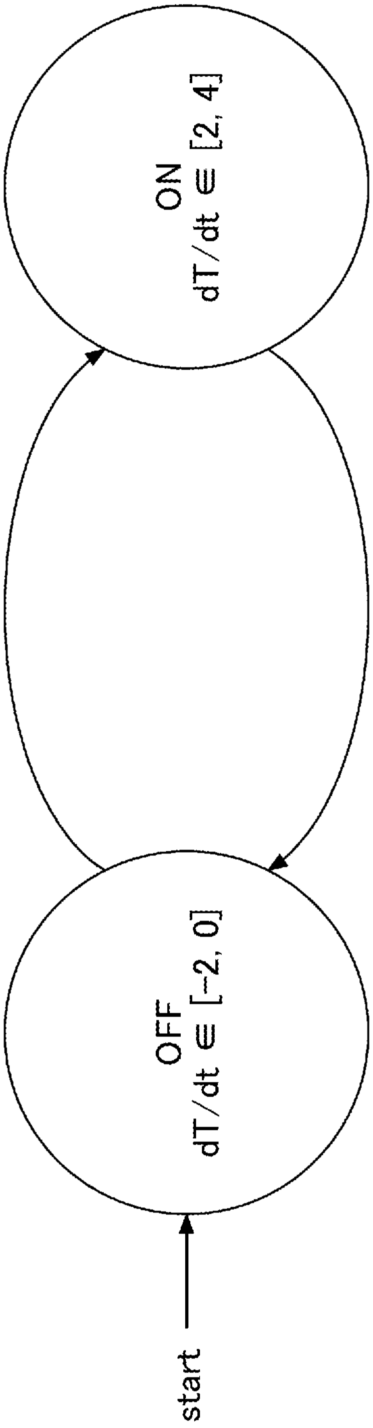
FIG. 6 is a state transition diagram that shows a hybrid automaton according to one embodiment of the present disclosure.
Figure 7:
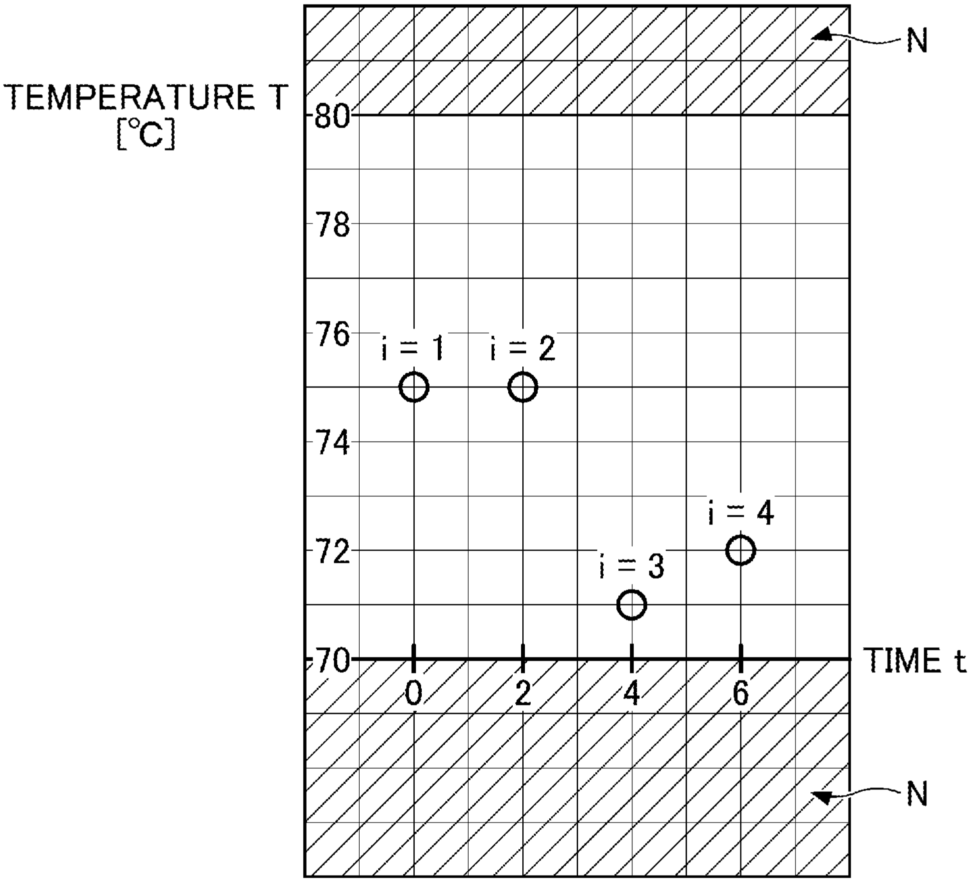
FIG. 7 is a diagram that shows observed values according to one embodiment of the present disclosure.

To illustrate an example, a case will be described below in which a monitoring process is performed to determine whether or not a constant temperature bath control system that controls a constant temperature bath by turning on/off a heater satisfies a specification φ: "the temperature T is in the range of 70 to 80 degrees ($70 \le T \le 80$)." In the constant temperature bath control system according to the present embodiment, the temperature T rises in the range of 2 to 4 degrees per unit time when the heater is turned on (ON), and drops in the range of 0 to 2 degrees per unit time when the heater is turned off (OFF). For example, as shown in FIG. 6, such a constant temperature bath control system can be represented by a hybrid automaton that can express discrete mode changes of a differential equation. At this time, assume that, as illustrated in FIG. 7, the acquiring part 110 acquires four observed values, namely $T_1=75$ (t=0), $T_2=75$ (t=2), $T_3=71$ (t=4), and $T_4=72$ (t=6), sampled every 2 seconds with respect to a constant temperature bath that is controlled by the constant temperature bath control system.

Figure 8:
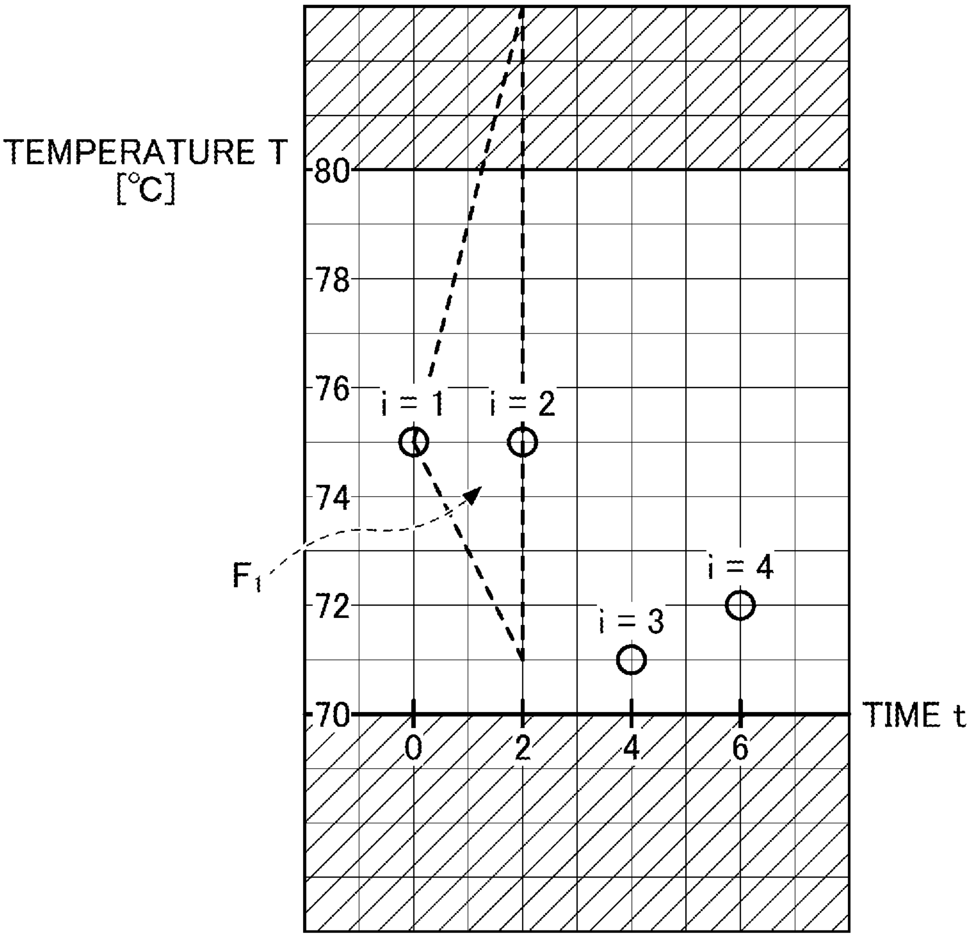
FIG. 8 is a diagram that shows a monitoring process according to one embodiment of the present disclosure.

First, for the first point in time (i=1), the determining part 120 derives a reachable range $F_1$ that can be reached in the forward direction on the time axis, between the observed value $T_1$ at the first point in time and a second point in time. Since the starting point is $T_1=75$, it is possible to determine that the temperature T is in the variation range of 83 to 71 degrees until the second point in time, which is 2 seconds later, and the determining part 120 determines the reachable range $F_1$ of a triangular shape, as shown in FIG. 8.

Figure 9:
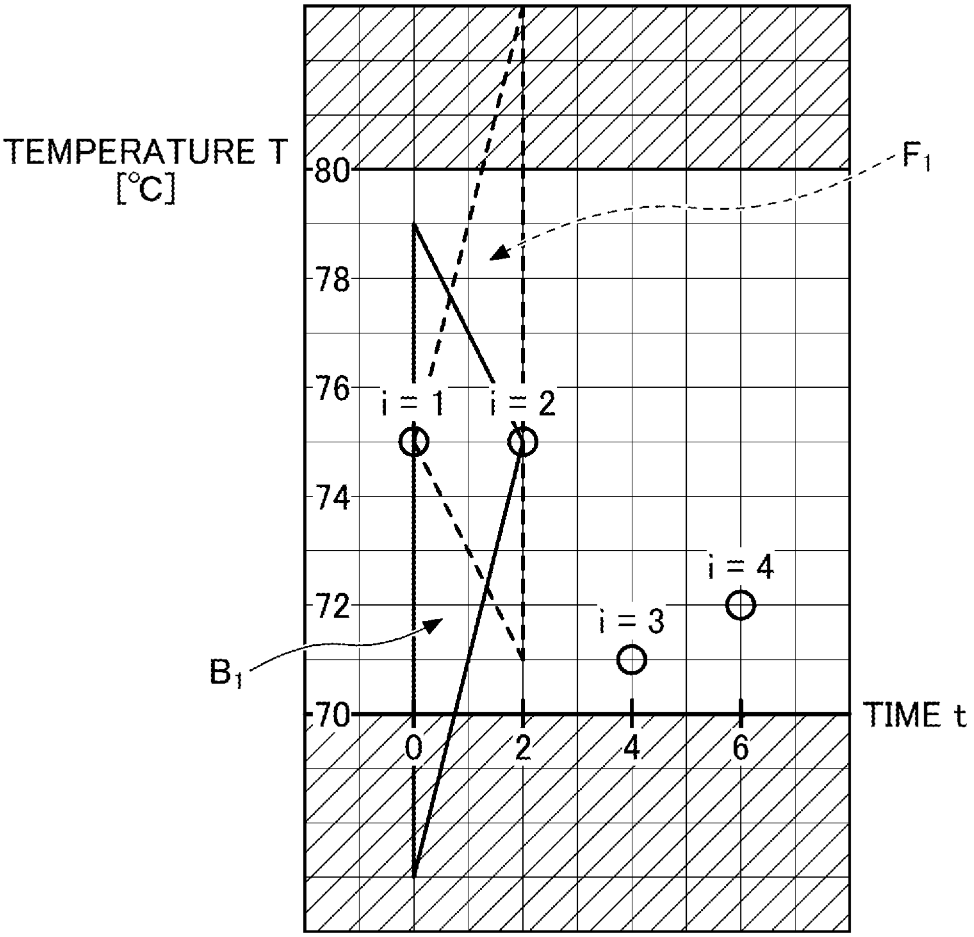
FIG. 9 is a diagram that shows a monitoring process according to one embodiment of the present disclosure.

On the other hand, the determining part 120 also derives a reachable range $B_1$ that can be reached in the backward direction on the time axis, between an observed value $T_2$ at the second point in time and the first point in time. Since the starting point is $T_2=75$, it is possible to determine that the temperature T is in the variation range of 67 to 79 degrees until the first point in time, which is 2 seconds earlier, and the determining part 120 determines the reachable range $B_1$ of a triangular shape, as shown in FIG. 9.

Figure 10:
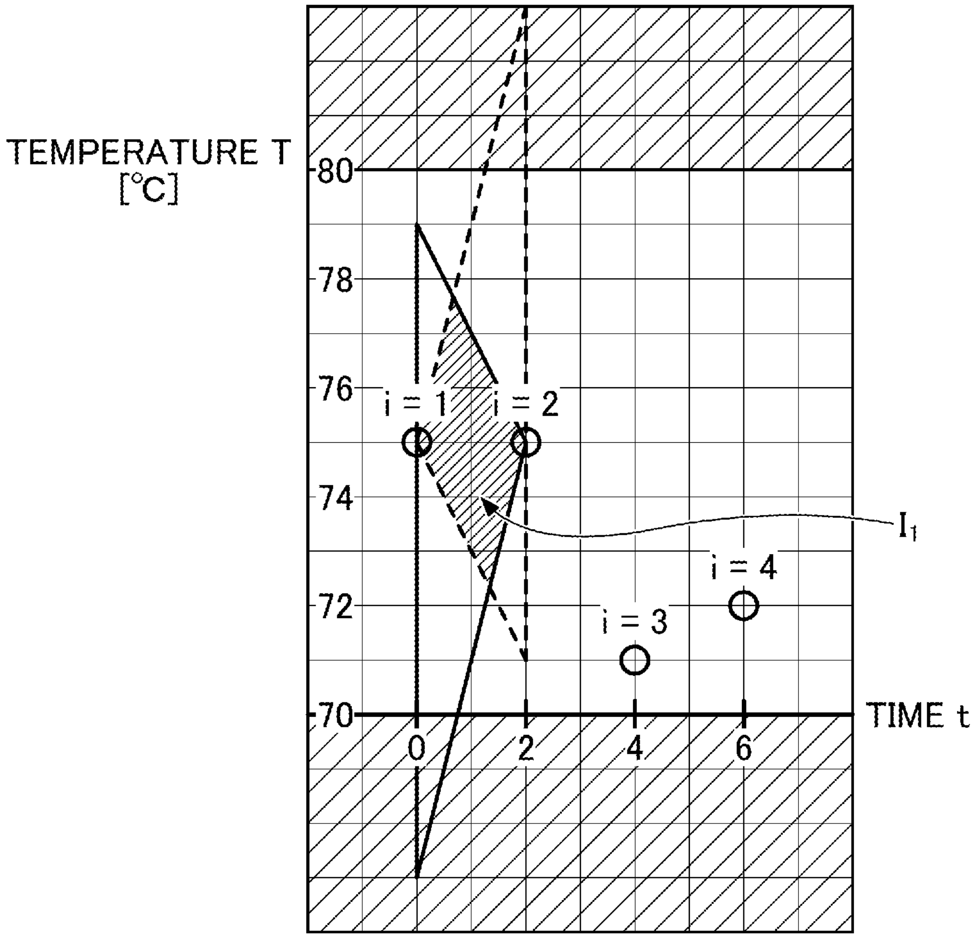
FIG. 10 is a diagram that shows a monitoring process according to one embodiment of the present disclosure.

Then, the determining part 120 derives the common range $I_1$ between the reachable range $F_1$ and the reachable range $B_1$ with respect to the first point in time. For example, the shaded part in FIG. 10 may be derived as the common range $I_1$. The determining part 120 determines whether there is an overlapping range between the common range $I_1$ and the insufficient range N according to the specification φ: "T<70 degrees or 80 degrees<T." As understood from the positional relationship between the common range $I_1$ and the insufficient range N shown in FIG. 10, there is no overlapping range between the common range $I_1$ and the insufficient range N, and therefore the determining part 120 determines that the variation range of the temperature T from the first point in time to the second point in time satisfies the specification φ.

Figure 11:
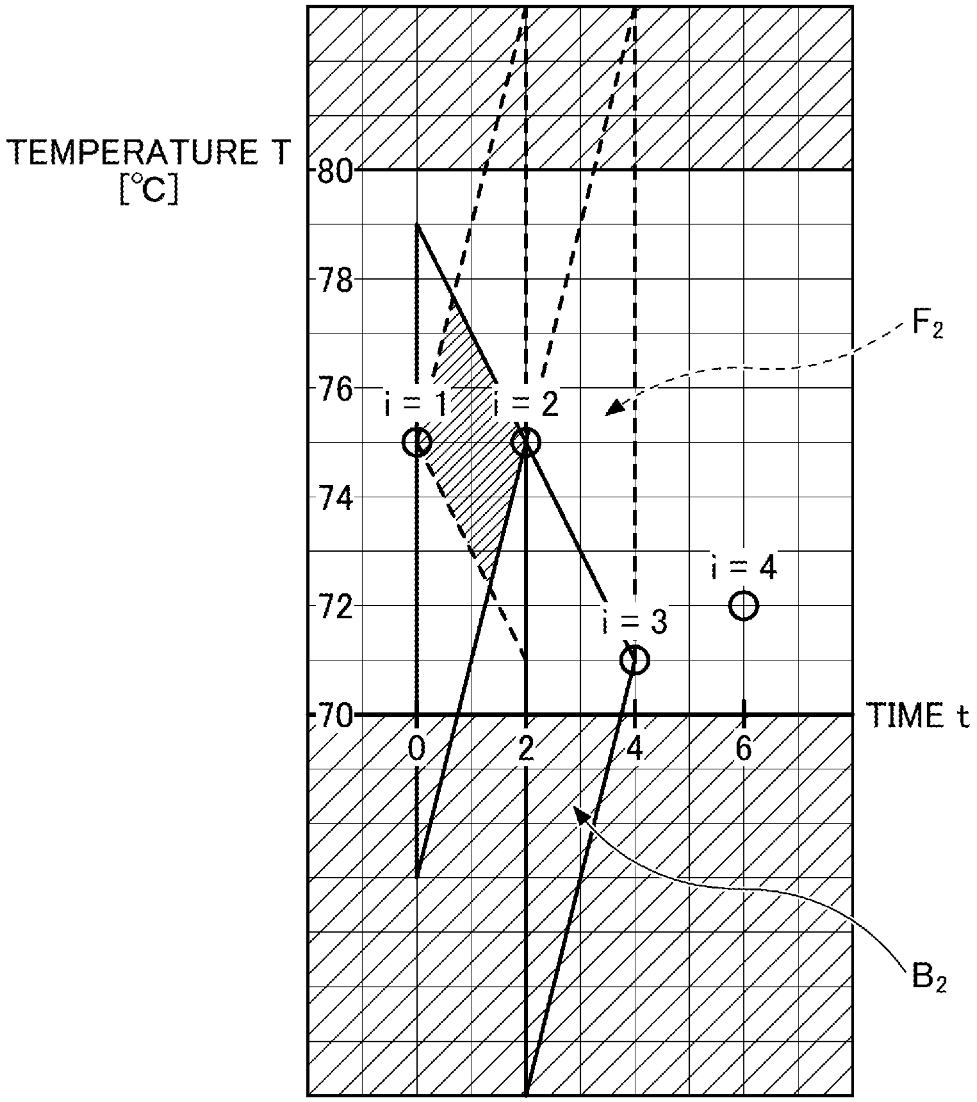
FIG. 11 is a diagram that shows a monitoring process according to one embodiment of the present disclosure.

Next, for the second point in time (i=2), the determining part 120 likewise derives a reachable range $F_2$ that can be reached in the forward direction on the time axis, between an observed value $T_2$ at the second point in time and a third point in time, and a reachable range $B_2$ that can be reached in the backward direction on the time axis, between an observed value $T_3$ at the third point in time and the second point in time. The reachable range $F_2$ and the reachable range $B_2$ are triangular ranges, as shown in FIG. 11.

Figure 12:
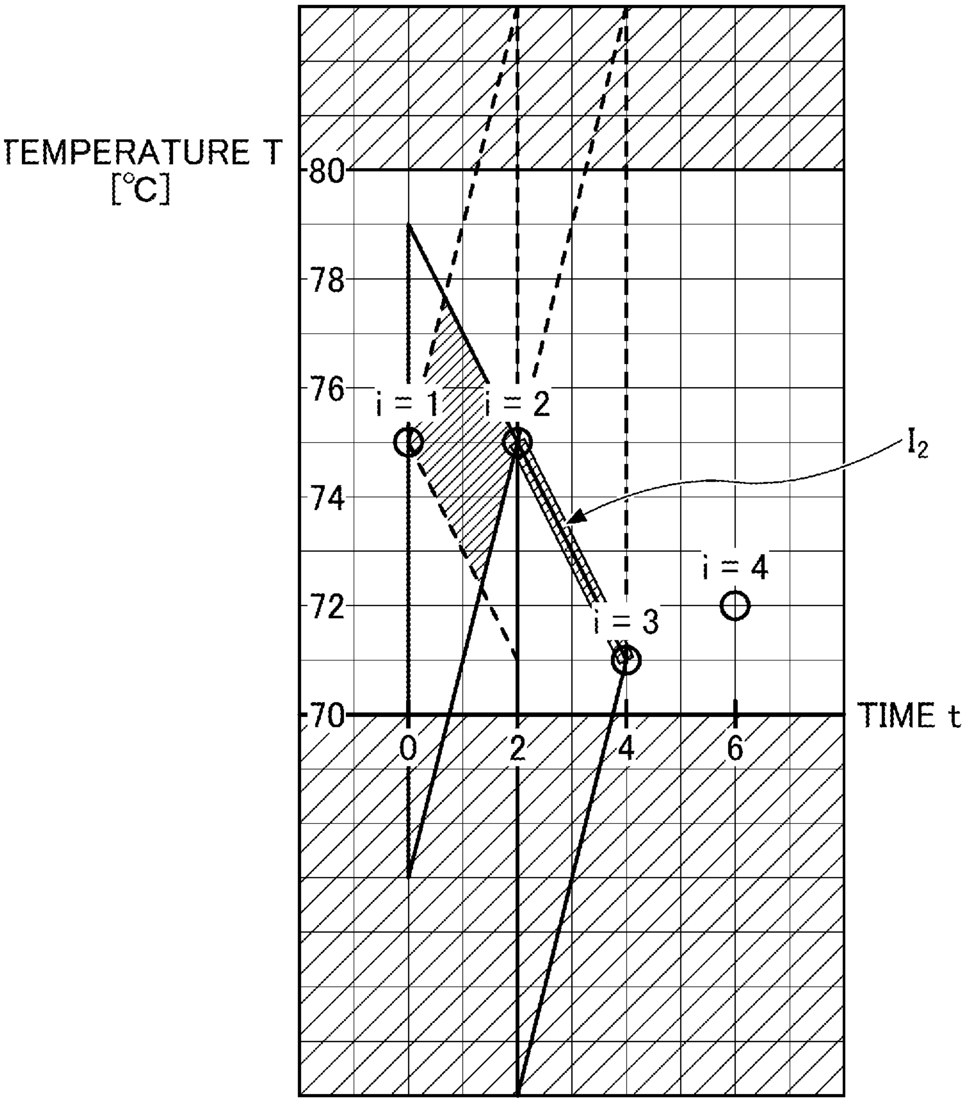
FIG. 12 is a diagram that shows a monitoring process according to one embodiment of the present disclosure.

Then, the determining part 120 derives a common range $I_2$ between the reachable range $F_2$ and the reachable range $B_2$ with respect to the second point in time. For example, the shaded part in FIG. 12 where two triangles contact one another may be derived as the common range 12. As understood from the positional relationship between the common range $I_2$ and the insufficient range N shown in FIG. 12, there is no overlapping range between the common range $I_2$ and the insufficient range N, and therefore the determining part 120 determines that the variation range of the temperature T from the second point in time to the third point in time satisfies the specification φ.

Figure 13:
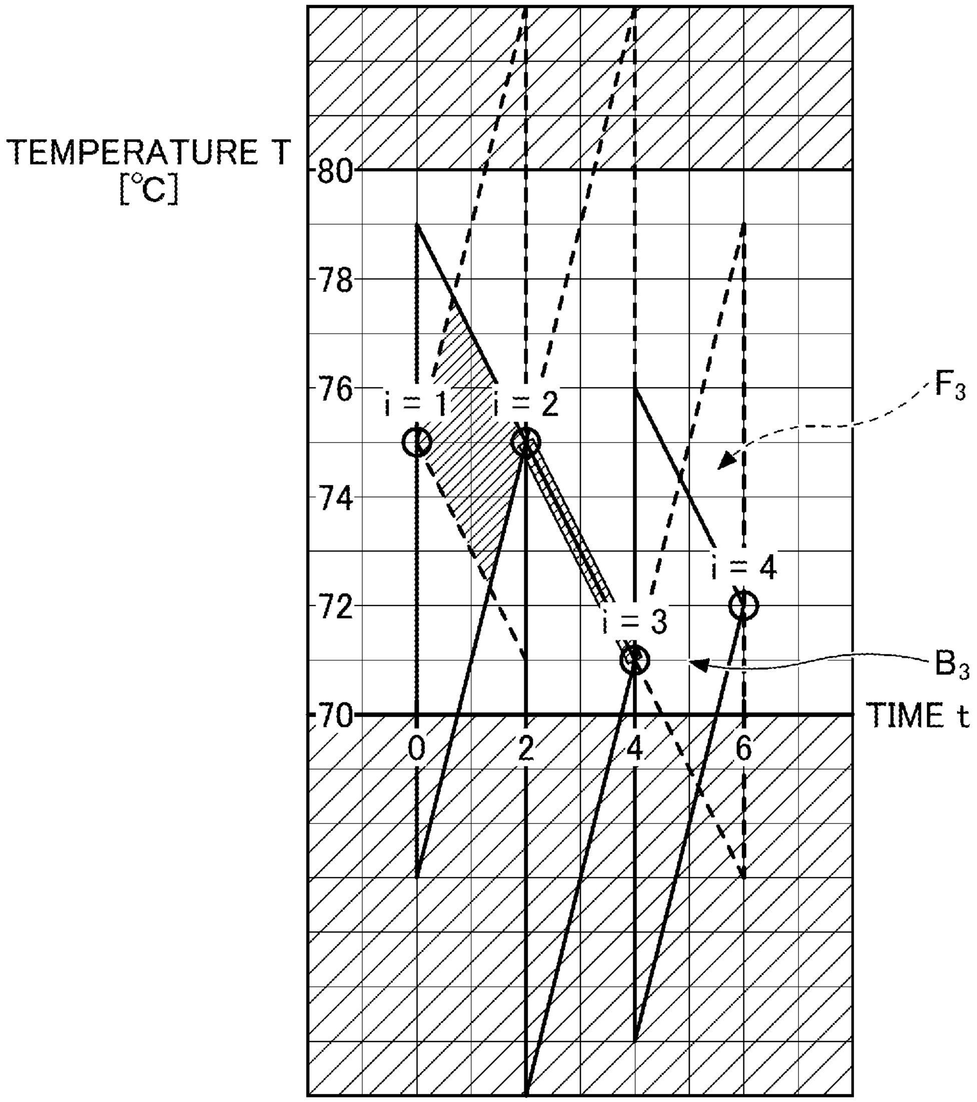
FIG. 13 is a diagram that shows a monitoring process according to one embodiment of the present disclosure.

Next, for the third point in time (i=3), the determining part 120 likewise derives a reachable range $F_3$ that can be reached in the forward direction on the time axis, between an observed value $T_3$ at the third point in time and a fourth point in time, and a reachable range $B_3$ that can be reached in the backward direction on the time axis, between an observed value $T_4$ of the fourth point in time and the third point in time. The reachable range $F_3$ and the reachable range $B_3$ are triangular ranges, as shown in FIG. 13.

Figure 14:
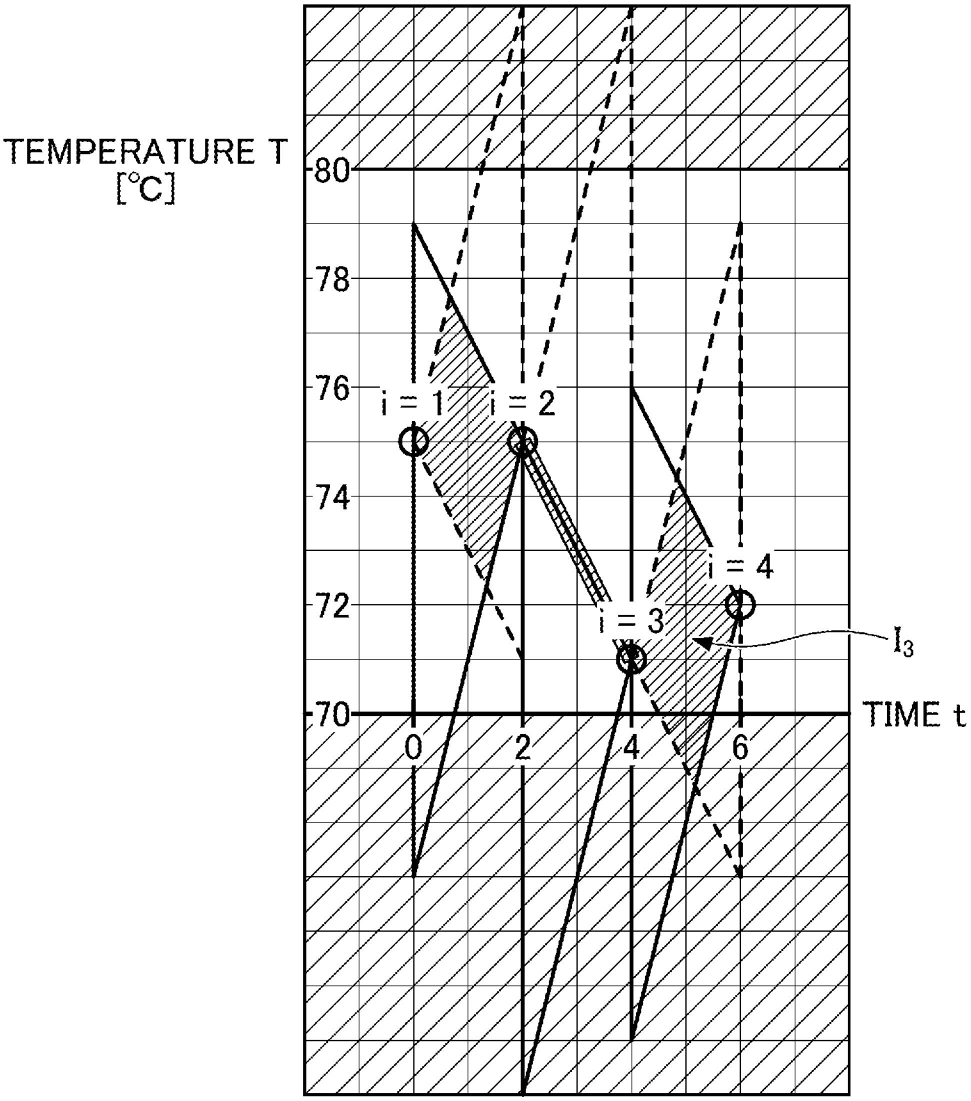
FIG. 14 is a diagram that shows a monitoring process according to one embodiment of the present disclosure.

Then, the determining part 120 derives a common range $I_3$ between the reachable range $F_3$ and the reachable range $B_3$ with respect to the third point in time. For example, the shaded part in FIG. 14 may be derived as the common range 13. As understood from the positional relationship between the common range $I_3$ and the insufficient range N shown in FIG. 14, there is an overlapping range between the common range $I_3$ and the insufficient range N, and therefore the determining part 120 determines that the variation range of the temperature T from the third point in time to the fourth point in time does not satisfy the specification φ, and that the constant temperature bath control system does not satisfy the specification φ.

[Monitoring Process for Automobile Control System According to Embodiment 1]

Figure 15:
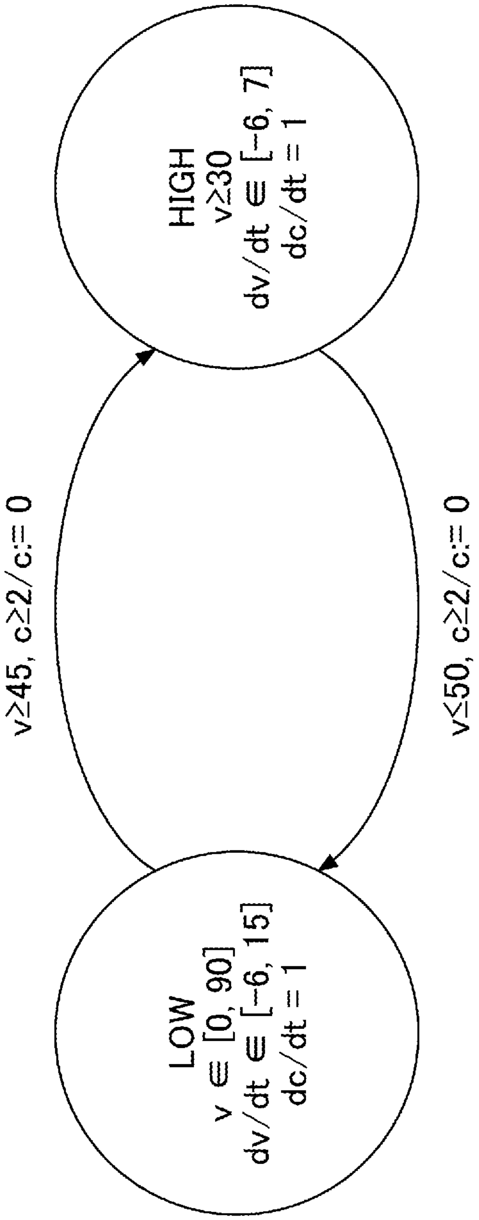
FIG. 15 is a state transition diagram that shows a hybrid automaton according to one embodiment of the present disclosure.
Figure 16:
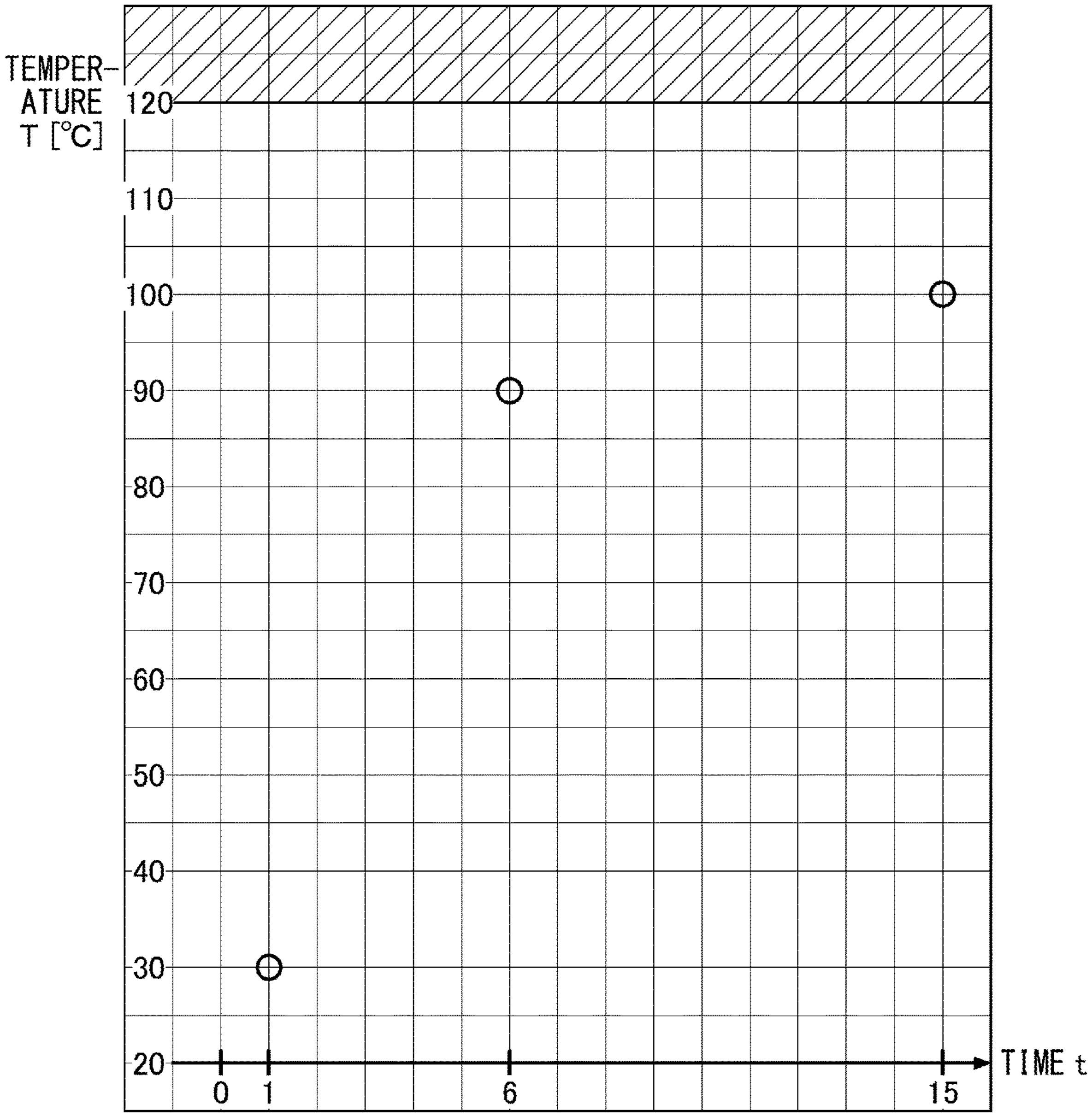
FIG. 16 is a diagram that shows observed values according to one embodiment of the present disclosure.

To illustrate another example, a case will be described below in which a monitoring process is performed to determine whether or not an automobile control system that controls an automobile satisfies a specification φ: "the velocity v is always 120 km/h or slower ($v \le 120$)." The automobile control system according to the present embodiment operates an automobile in a low-speed mode (LOW) and a high-speed mode (HIGH). A minimum interval of 2 seconds is required to switch the mode. In the low-speed mode, the velocity v is from 0 to 90 km/h ($v \in [0, 90]$), and, in the low-speed mode, the velocity v varies in a range of −6 to 15 km/h per unit time ($dv/dt \in [-6, 15]$). On the other hand, in the high-speed mode, the velocity v is 30 km/h or faster ($v \ge 30$), and, in the high-speed mode, the velocity v varies in a range of −6 to 7 km/h per unit time ($dv/dt \in [-6, 7]$). Also, transition from the low-speed mode to the high-speed mode is possible only when $v \ge 45$ holds, and transition from the high-speed mode to the low-speed mode is possible only when $v \le 50$ holds. Also, the time to spend in each mode is represented by a parameter c. For example, as shown in FIG. 15, the automobile control system according to this embodiment can be represented by a hybrid automaton that can express discrete mode changes of a differential equation. For example, assume that, as illustrated in FIG. 16, the acquiring part 110 acquires three observed values, namely $v_1$=30 (t=1), $v_2$=90 (t=6), and $v_3$=100 (t=15), sampled with respect to an automobile that is controlled by the automobile control system.

Figure 17:
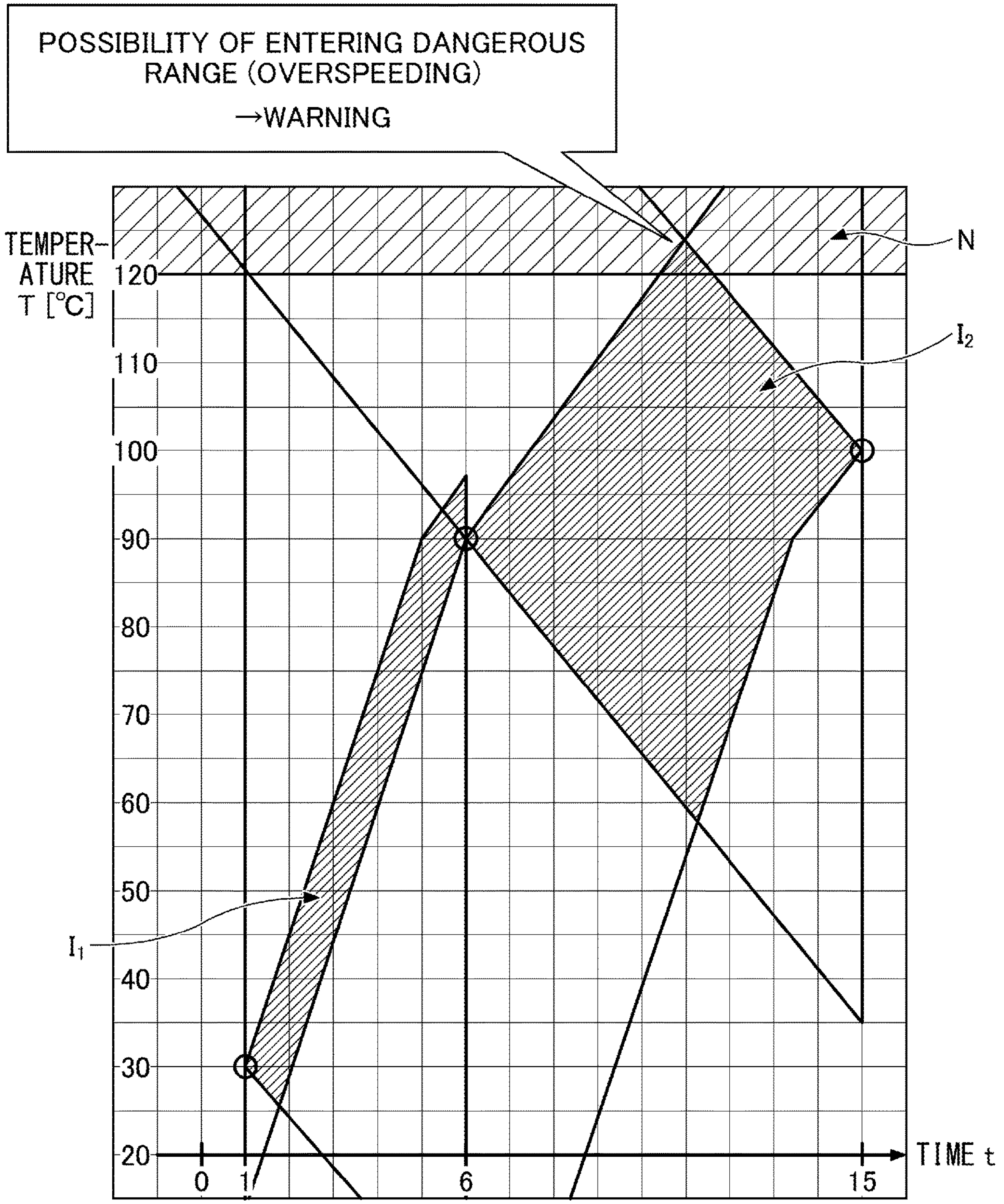
FIG. 17 is a diagram that shows a monitoring process according to one embodiment of the present disclosure.

First, for the first point in time (i=1), the determining part 120 derives a reachable range $F_1$ that can be reached in the forward direction on the time axis, between an observed value $v_1$ at the first point in time (t=1) and a second point in time (t=6), and a reachable range $B_1$ that can be reached in the backward direction on the time axis, between an observed value $v_2$ at the second point in time and the first point in time, and derives the common range $I_1$ between the reachable range $F_1$ and the reachable range $B_1$ with respect to the first point in time. For example, the shaded part in FIG. 17 may be derived as the common range $I_1$. The determining part 120 determines whether there is an overlapping range between the common range $I_1$ and the insufficient range N (v>120) of the specification φ. As understood from the positional relationship between the common range $I_1$ and the insufficient range N shown in FIG. 17, there is no overlapping range between the common range $I_1$ and the insufficient range N, and therefore the determining part 120 determines that the variation range of the velocity v from the first point in time to the second point in time satisfies the specification φ.

Next, for the second point in time (i=2), the determining part 120 likewise derives a reachable range $F_2$ that can be reached in the forward direction on the time axis, between an observed value $v_2$ at the second point in time (t=6) and a third point in time (t=15), and a reachable range $B_2$ that can be reached in the backward direction on the time axis, between an observed value $v_3$ at the third point in time and the second point in time, and derives a common range $I_2$ between the reachable range $F_2$ and the reachable range $B_2$ with respect to the second point in time. For example, the shaded part in FIG. 17 may be derived as the common range 12. The determining part 120 determines whether there is an overlapping range between the common range $I_2$ and the insufficient range N (v>120) of the specification φ. As understood from the positional relationship between the common range $I_2$ and the insufficient range N shown in FIG. 17, there is an overlapping range between the common range $I_2$ and the insufficient range N, and therefore the determining part 120 determines that the variation range of the velocity v from the second point in time to the third point in time does not satisfy the specification φ.

Embodiment 2

In another embodiment, the determining part 120 may determine a forward-direction reachable range that can be reached from an observed value at time i in the forward direction on the time axis, determine the overlapping range between the forward-direction reachable range and a range not satisfying a specification φ, and determine whether a variation range satisfies the specification based on whether or not an observed value at time (i+1) is included in a reachable range that can be reached from the overlapping range in the forward direction on the time axis. To be more specific, given the observed value at each time i, the determining part 120 determines a forward-direction reachable range $F1_i$ that can be reached in the forward direction on the time axis, between the observed value at time i and an overlapping range $O_i$ between the forward-direction reachable range $F1_i$ and the insufficient range N, and determines whether the observed value at time (i+1) is included in a reachable range $F2_i$ that can be reached from the overlapping range $O_1$ in the forward direction on the time axis. If the observed value at time (i+1) is included in the reachable range $F2_i$, the determining part 120 determines that the cyber-physical model M does not satisfy the specification p. The determining part 120 determines that the cyber-physical model M satisfies the specification φ if the observed value at time (i+1) is not included in any of the reachable ranges $F2_i$ related to all time points i.

FIG. 18 is a flowchart that shows the monitoring process according to embodiment 2 of the present disclosure. This monitoring process is performed by the monitoring device 100 described above, and can be realized, for example, by one or more processors that execute programs stored in one or more memories of the monitoring device 100.

As shown in FIG. 18, in step S201, the acquiring part 110 acquires observed values $w=(w_1, w_2, \ldots, w_n)$ for the cyber-physical model M, and initializes a parameter i as: i=1.

In step S202, the determining part 120 determines a forward-direction reachable range $F1_i$ that can be reached from the observed value $w_i$ at time i in the forward direction on the time axis. Note that, while the forward-direction reachable range $F_i$ of above-described embodiment 1 is a range that can be reached between the observed value $w_i$ and time (i+1), the forward-direction reachable range $F1_i$ according to embodiment 2 is a range that can be reached between the observed value $w_i$ at time i and a time n. For example, if the variation range of observed values per unit time is made clear in advance from a differential equation or the like, the determining part 120 may determine the forward-direction reachable range $F1_i$ based on the observed value $w_i$ at time i and the variation range.

In step S203, the determining part 120 determines the overlapping range $O_i$ between the forward-direction reachable range $F1_i$ and the insufficient range N according to the specification φ.

In step S204, the determining part 120 determines a reachable range $F2_i$ that can be reached from the overlapping range $O_i$ in the forward direction on the time axis.

In step S205, the determining part 120 determines whether the observed value $w_{i+1}$ at time (i+1) is included in the reachable range $F2_i$. That is, the determining part 120 determines whether it is possible to reach the observed value $w_{i+1}$ from the observed value $w_i$, via the insufficient range N, by determining whether it is possible to reach the observed value $w_{i+1}$ after the observed value $w_i$ enters the insufficient range N.

If observed value $w_{i+1}$ is included in the reachable range $F2_i$ (S205: YES), the determining part 120 determines that there is a possibility that the parameter value is in the insufficient range N between the observed values $w_i$ and $w_{i+1}$, and determines that the cyber-physical model M does not satisfy the specification φ, thereupon ending the monitoring process. On the other hand, if the observed value $w_{i+1}$ is not included in the reachable range $F2_i$ (S205: NO), the determining part 120 determines that there is no possibility that the parameter value is in the insufficient range N between the observed values $w_i$ and $w_{i+1}$, increments the parameter i in step S206, and repeats steps S202 to S205 described above.

[Monitoring Process for Constant Temperature Bath Control System According to Embodiment 2]

To illustrate an example, a case will be described below in which, as in embodiment 1, a monitoring process is performed to determine whether or not a constant temperature bath control system that controls a constant temperature bath by turning on/off a heater satisfies a specification φ: "the temperature T is in the range of 70 to 80 degrees ($70 \le T \le 80$)." In the constant temperature bath control system according to the present embodiment, the temperature T rises in the range of 2 to 4 degrees per unit time when the heater is turned on (ON), and drops in the range of 0 to 2 degrees per unit time when the heater is turned off (OFF). That is, as described in embodiment 1, such a constant temperature bath control system can be represented by a hybrid automaton that can express discrete mode changes of a differential equation. As in embodiment 1, assume that, as illustrated in FIG. 7, the acquiring part 110 acquires four observed values, namely $T_1=75$ (t=0), $T_2=75$ (t=2), $T_3=71$ (t=4), and $T_4=72$ (t=6), sampled every 2 seconds with respect to a constant temperature bath that is controlled by the constant temperature bath control system.

Figure 19:
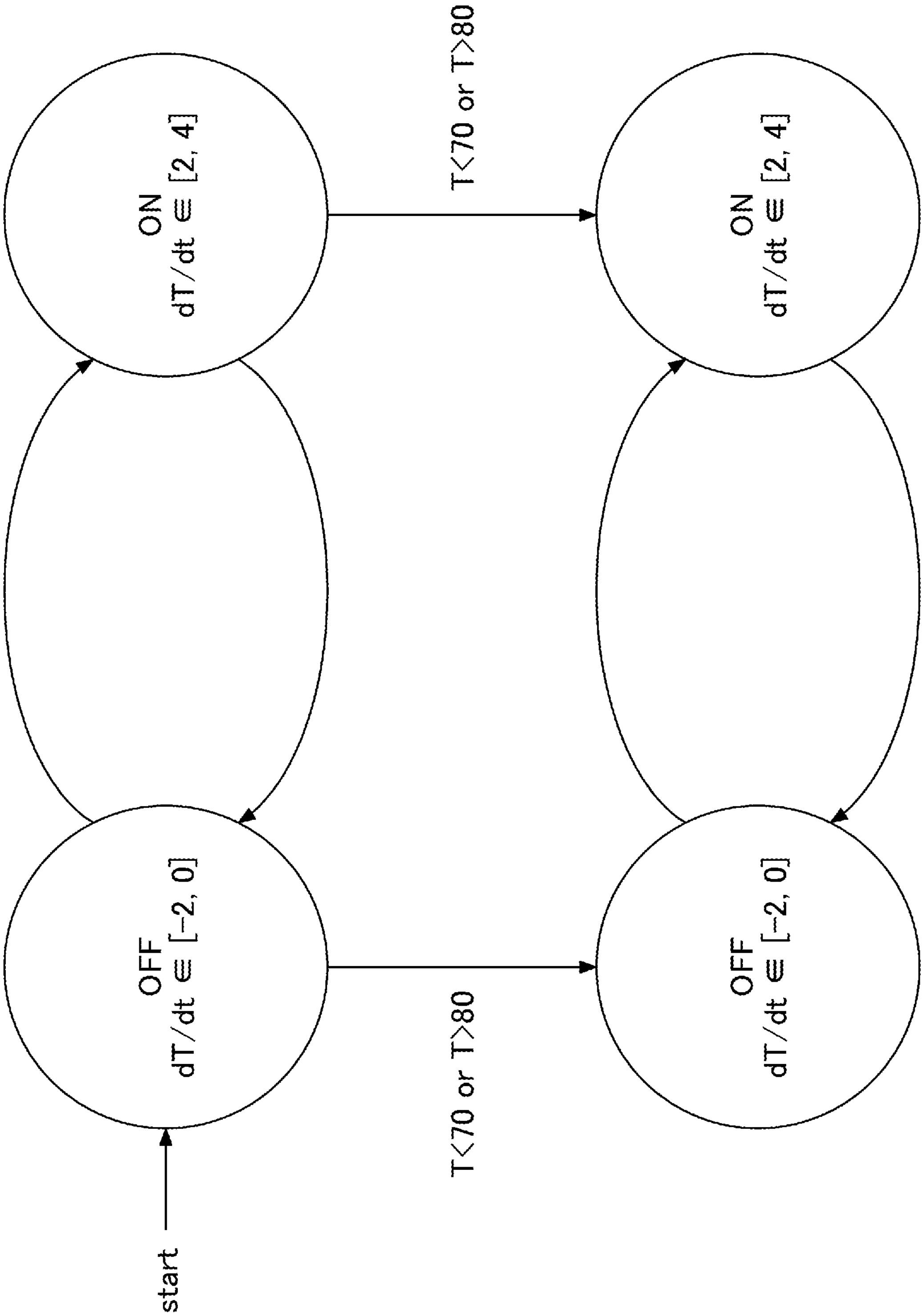
FIG. 19 is a state transition diagram that shows a hybrid automaton according to one embodiment of the present disclosure.

According to embodiment 2, the hybrid automaton of FIG. 6 is enhanced to hybrid automata including transition to the insufficient range "T<70 or T>80," as shown in FIG. 19. The upper half of the enhanced hybrid automata represents transition between the heater-off state and the heater-on state within a range the specification φ is satisfied, from the initial state (start). The lower-half hybrid automaton is a duplicate of the upper-half hybrid automaton, and represents transition between the heater-off state and the heater-on state, after transition from the heater-off state and the heater-on state in the range in which the specification φ is satisfied in the upper-half hybrid automaton, to an insufficient range.

Figure 20:
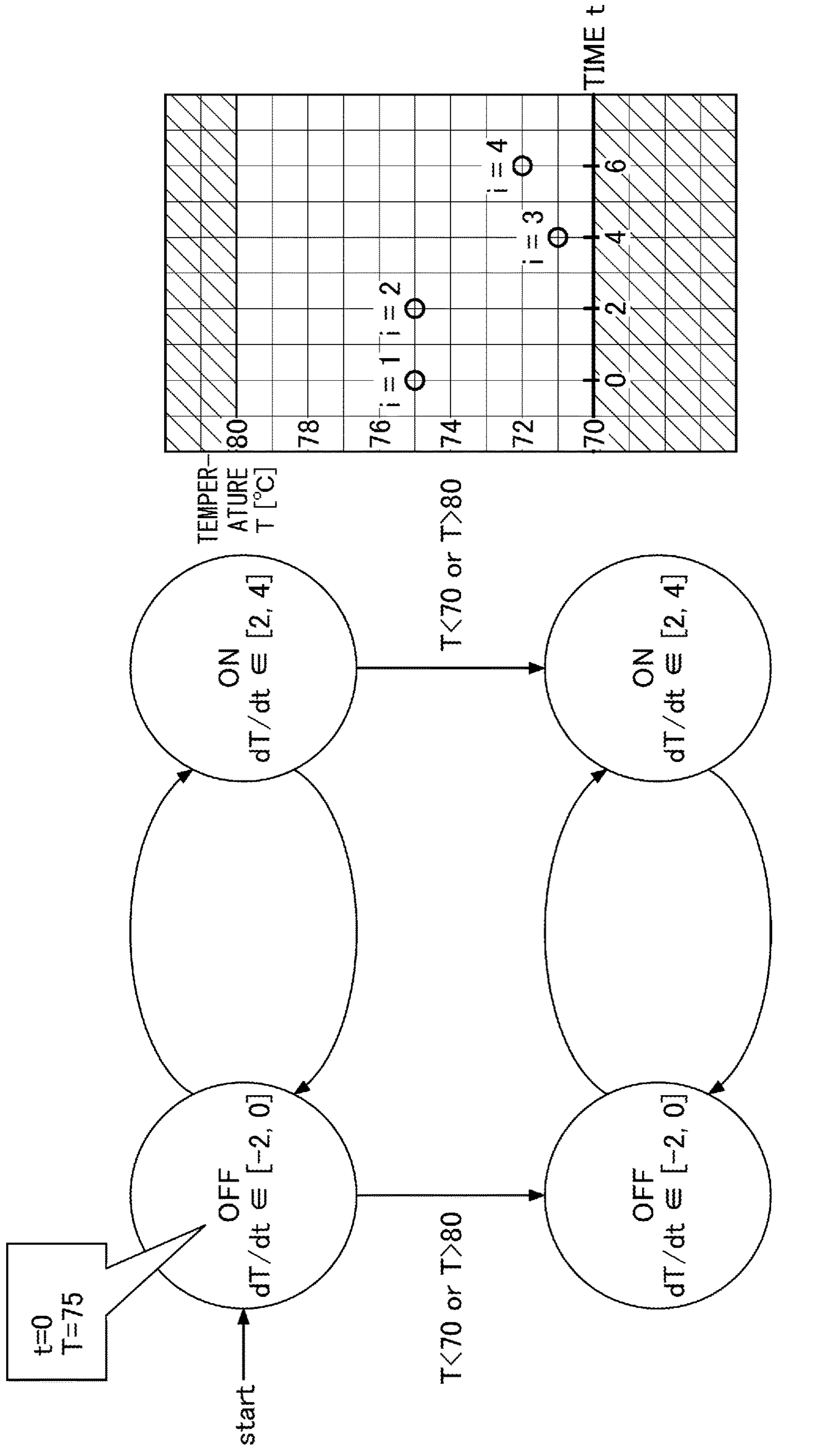
FIG. 20 is a diagram that shows a monitoring process according to one embodiment of the present disclosure.

First, for an observed value $T_1$, at time t=0, the determining part 120 sets the off state of the upper-half hybrid automaton to the initial state, as shown in FIG. 20.

Figure 21:
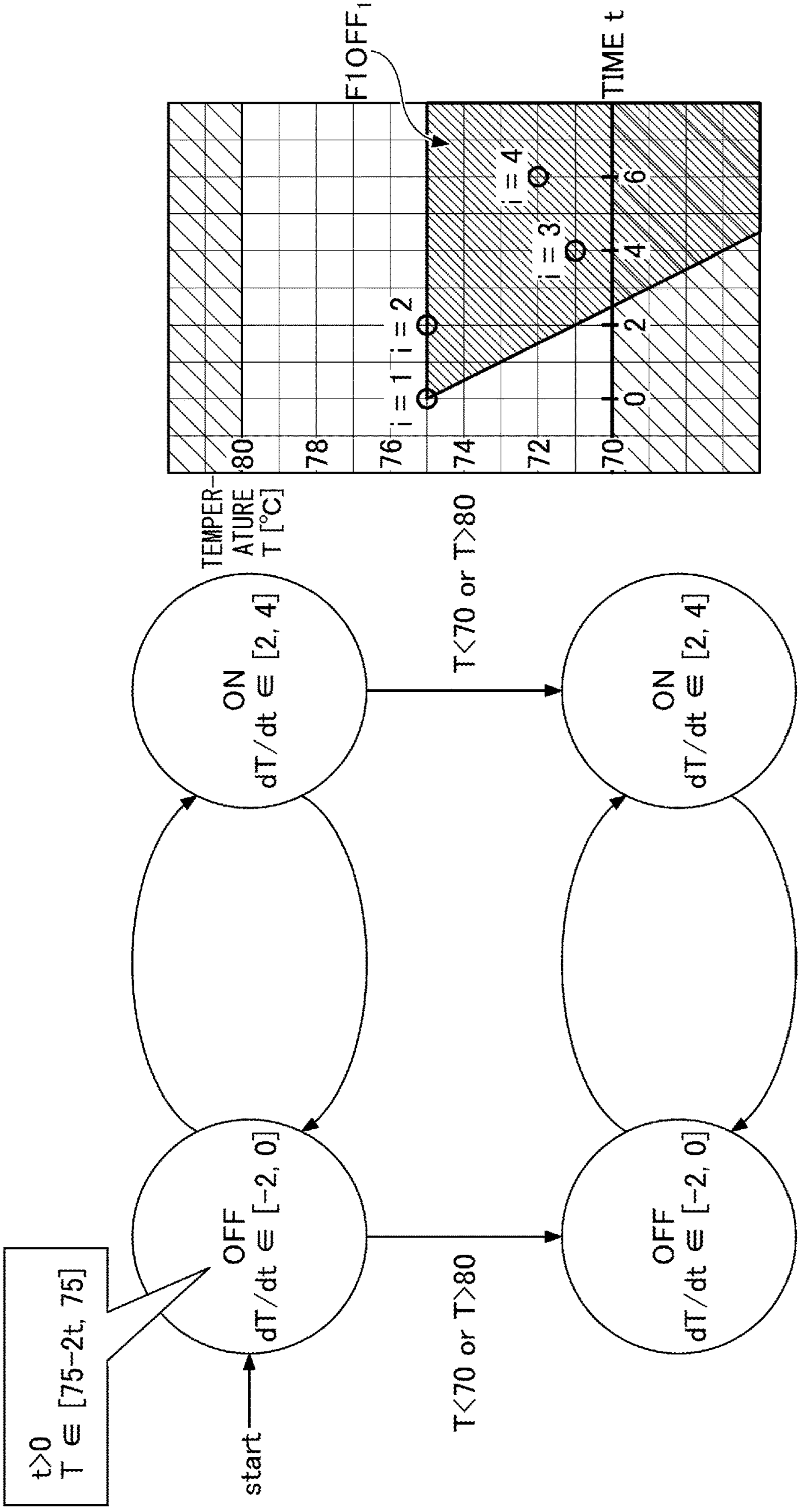
FIG. 21 is a diagram that shows a monitoring process according to one embodiment of the present disclosure.

Next, at time t>0, the determining part 120 determines a forward-direction reachable range $F1OFF_1$ of the temperature T that can be reached from the observed value $T_1$ in the forward direction on the time axis while the present state is in the off state of the upper-half hybrid automaton. At this time, the temperature T can vary in the range of $T \in [75\text{-}2t, 75]$, and, as shown in FIG. 21, the forward-direction reachable range $F1OFF_1$ is in a triangular range starting from the observed value $T_1$.

Figure 22:
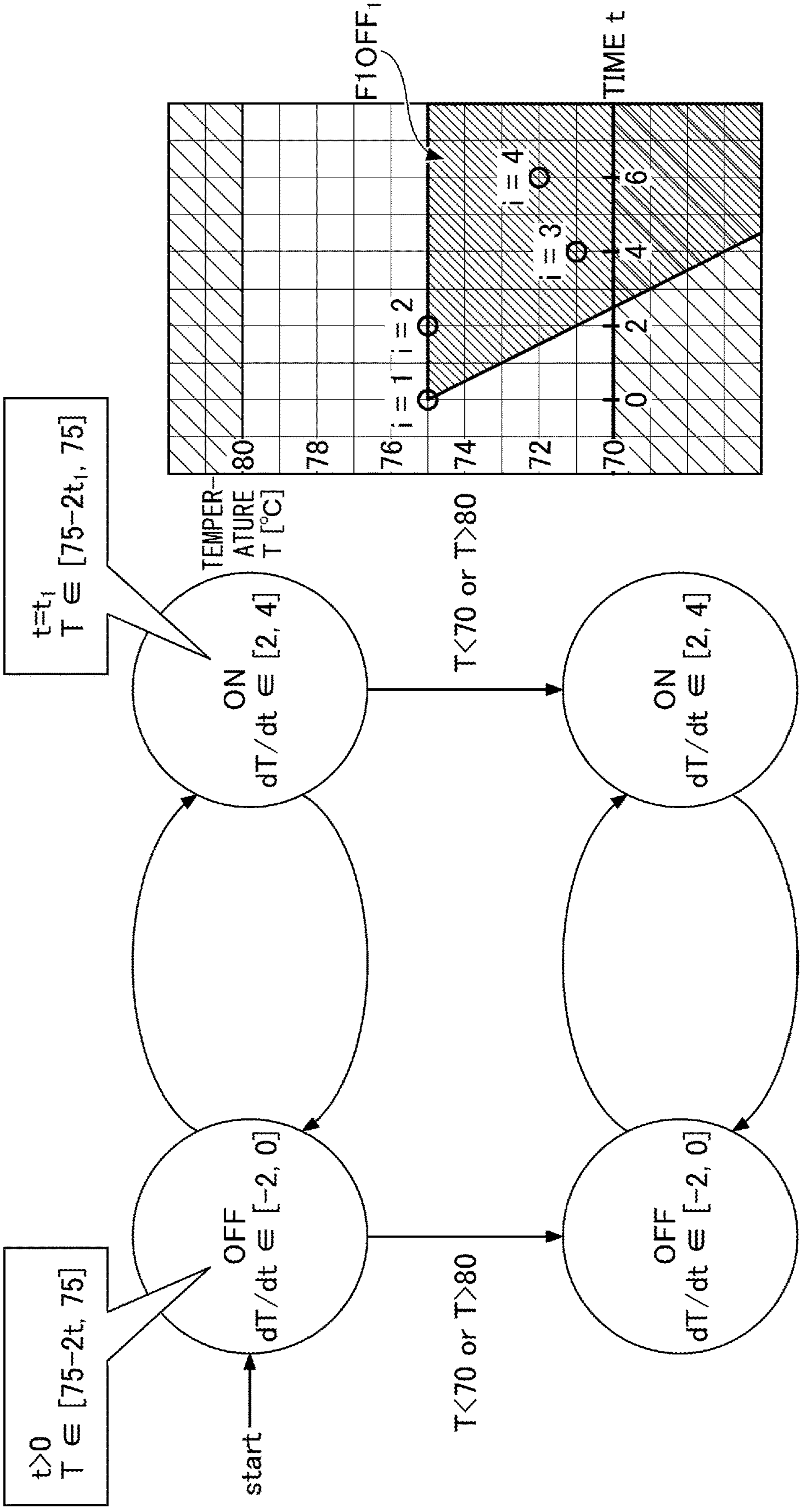
FIG. 22 is a diagram that shows a monitoring process according to one embodiment of the present disclosure.

Next, at time $t=t_1$ (>0), assume that the determining part 120 transitions the present state to the ON state of the upper-half hybrid automaton, as shown in FIG. 22. At this time, the temperature T is in the range of $T \in [75\text{-}2t, 75]$.

Figure 23:
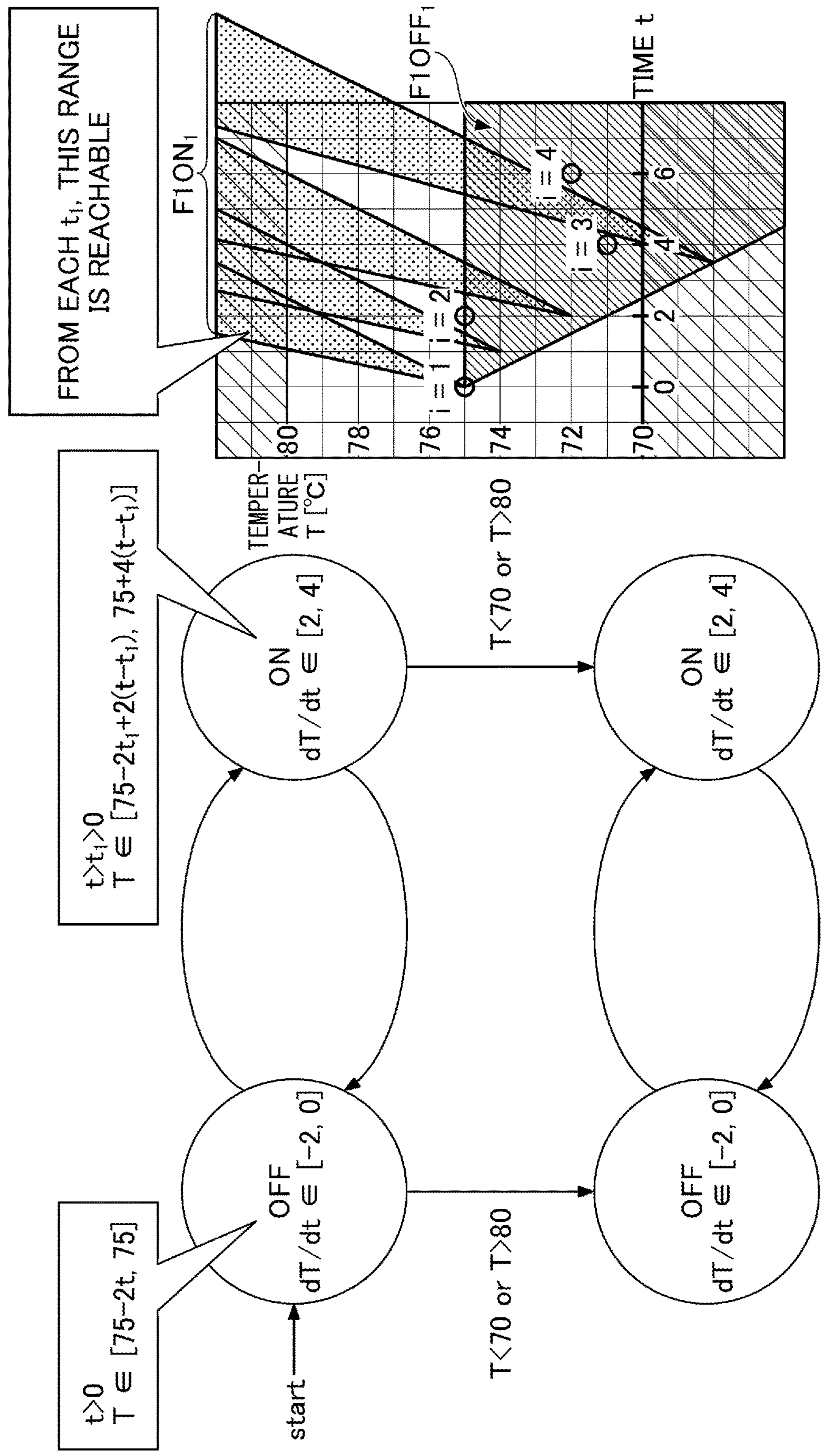
FIG. 23 is a diagram that shows a monitoring process according to one embodiment of the present disclosure.
Figure 24:
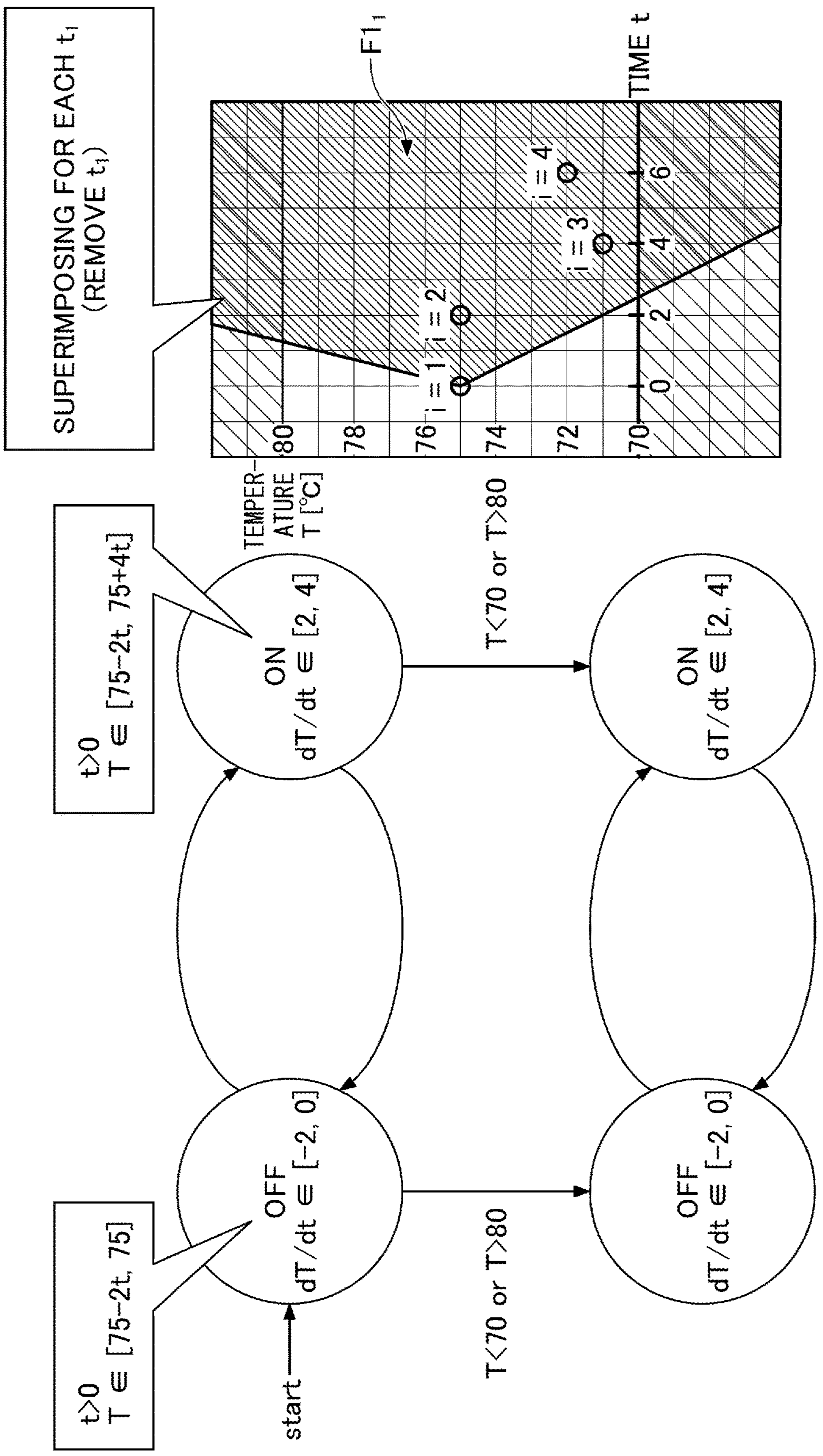
FIG. 24 is a diagram that shows a monitoring process according to one embodiment of the present disclosure.

Next, at time $t>t_1$, the determining part 120 determines a forward-direction reachable range $F1ON_1$ of the temperature T that can be reached from the forward-direction reachable range $F1OFF_1$ in the forward direction on the time axis while the present state is in the on state of the upper-half hybrid automaton. At this time, the temperature T can vary in the range of $T \in [75-2t_1+2\ (t-t_1), 75+4\ (t-t_1)]$, and, as shown in FIG. 23, the forward-direction reachable range $F1ON_1$ is in the triangles that each start from a point in the forward-direction reachable range $F1OFF_1$. Then, by superimposing the forward-direction reachable range $F1OFF_1$ and each triangle over one another (that is, $F1OFF_1+F1ON_1$), the determining part 120 obtains a forward-direction reachable range $F1_1$, as shown in FIG. 24. Then the determining part 120 removes $t_1$, and the temperature T is in the range of $T \in [75-2, 75+4t]$.

Figure 25:
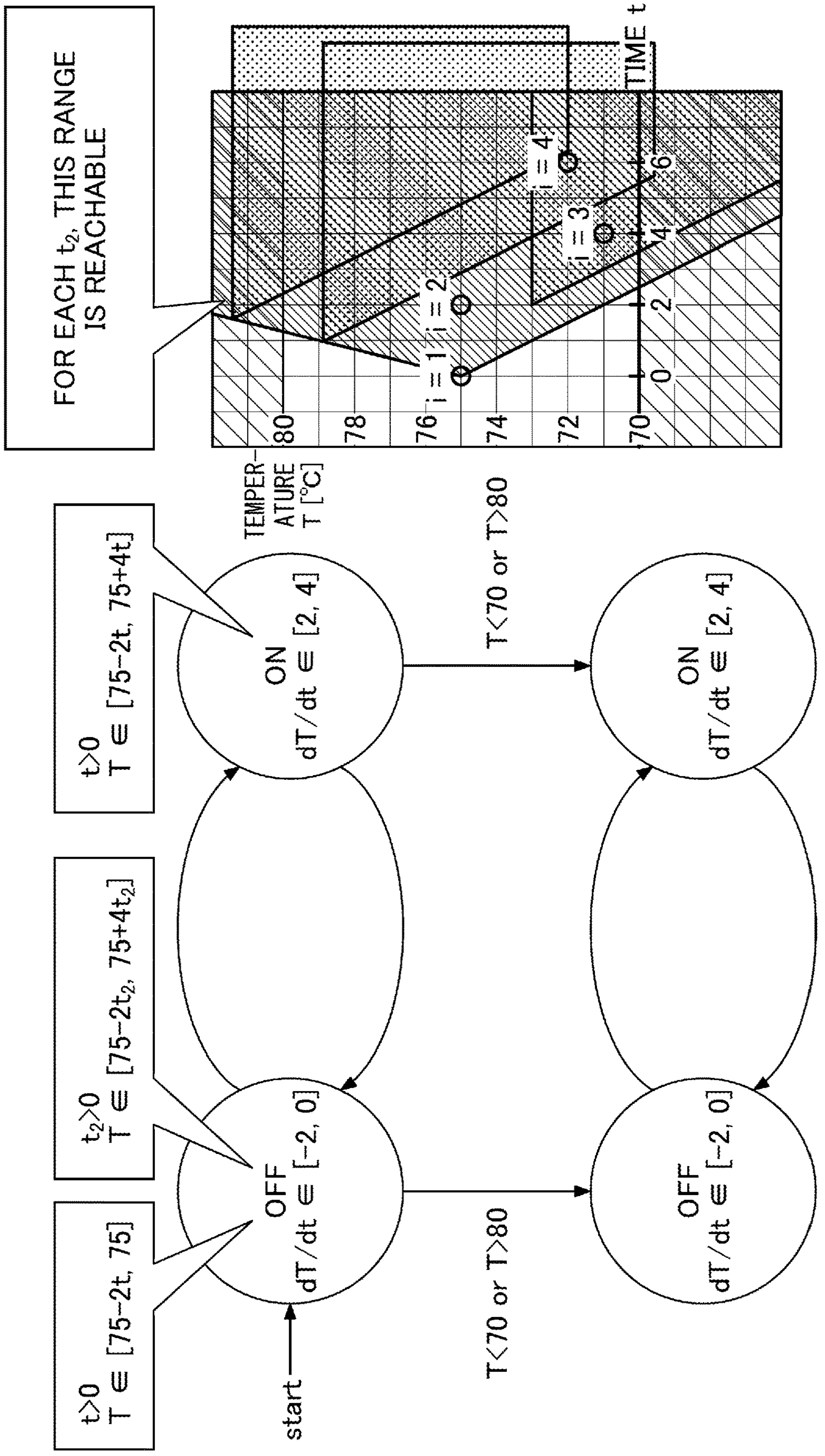
FIG. 25 is a diagram that shows a monitoring process according to one embodiment of the present disclosure.
Figure 26:
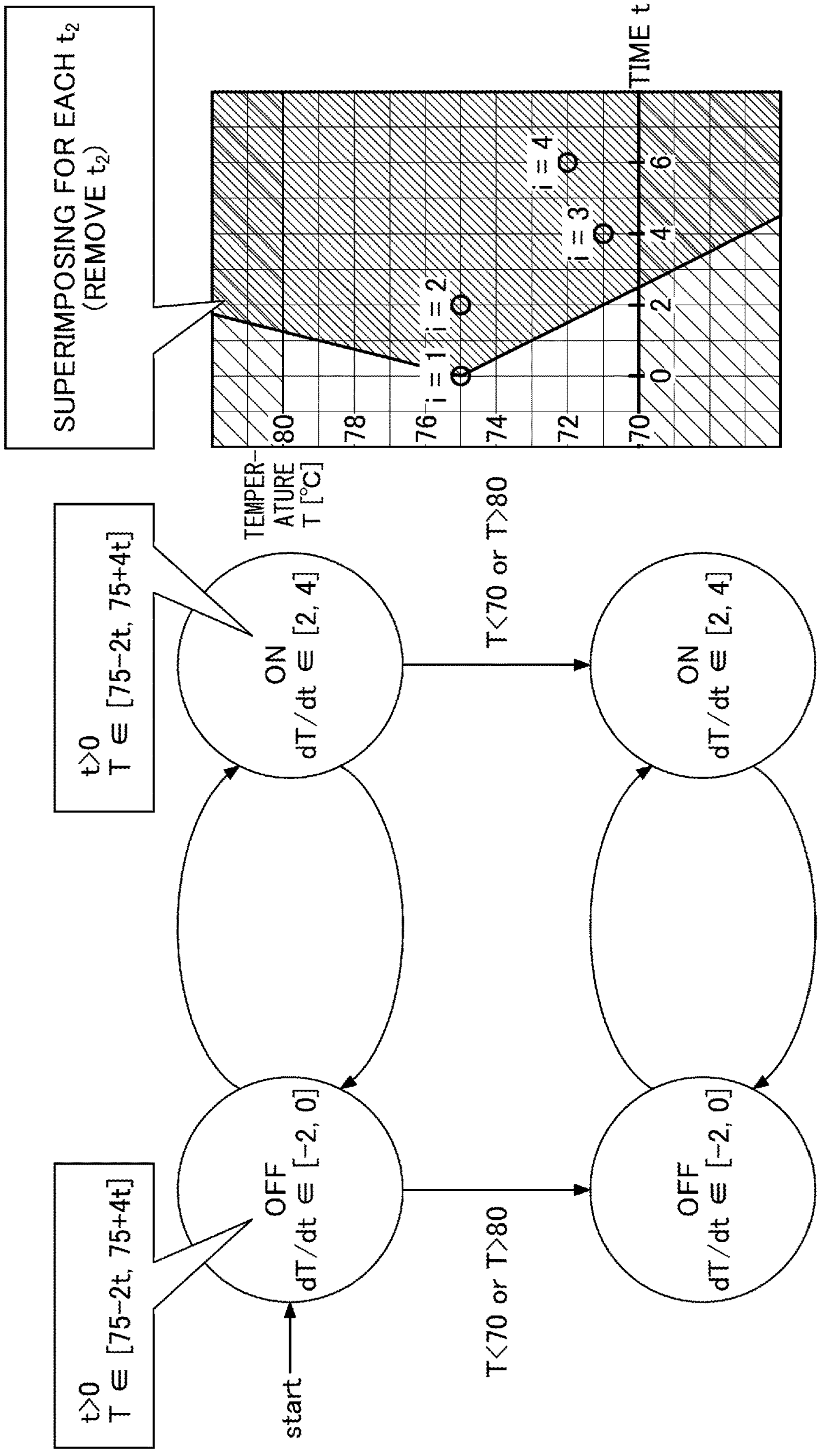
FIG. 26 is a diagram that shows a monitoring process according to one embodiment of the present disclosure.

Next, at time $t=t_2$ ($>t_1$), assume that the determining part 120 transitions the present state to the off state of the upper-half hybrid automaton, as shown in FIG. 25. At this time, the temperature T is in the range of $T \in [75-2t_2, 75+4t_2]$. The determining part 120 determines triangles that each start from a point in the forward-direction reachable range $F1_1$, and confirms that these triangles are included in the forward-direction reachable range $F1_1$. Then, the determining part 120 removes $t_2$, and, as shown in FIG. 26, the temperature T is in the range of $T \in [75-2, 75+4_t]$.

Figure 27:
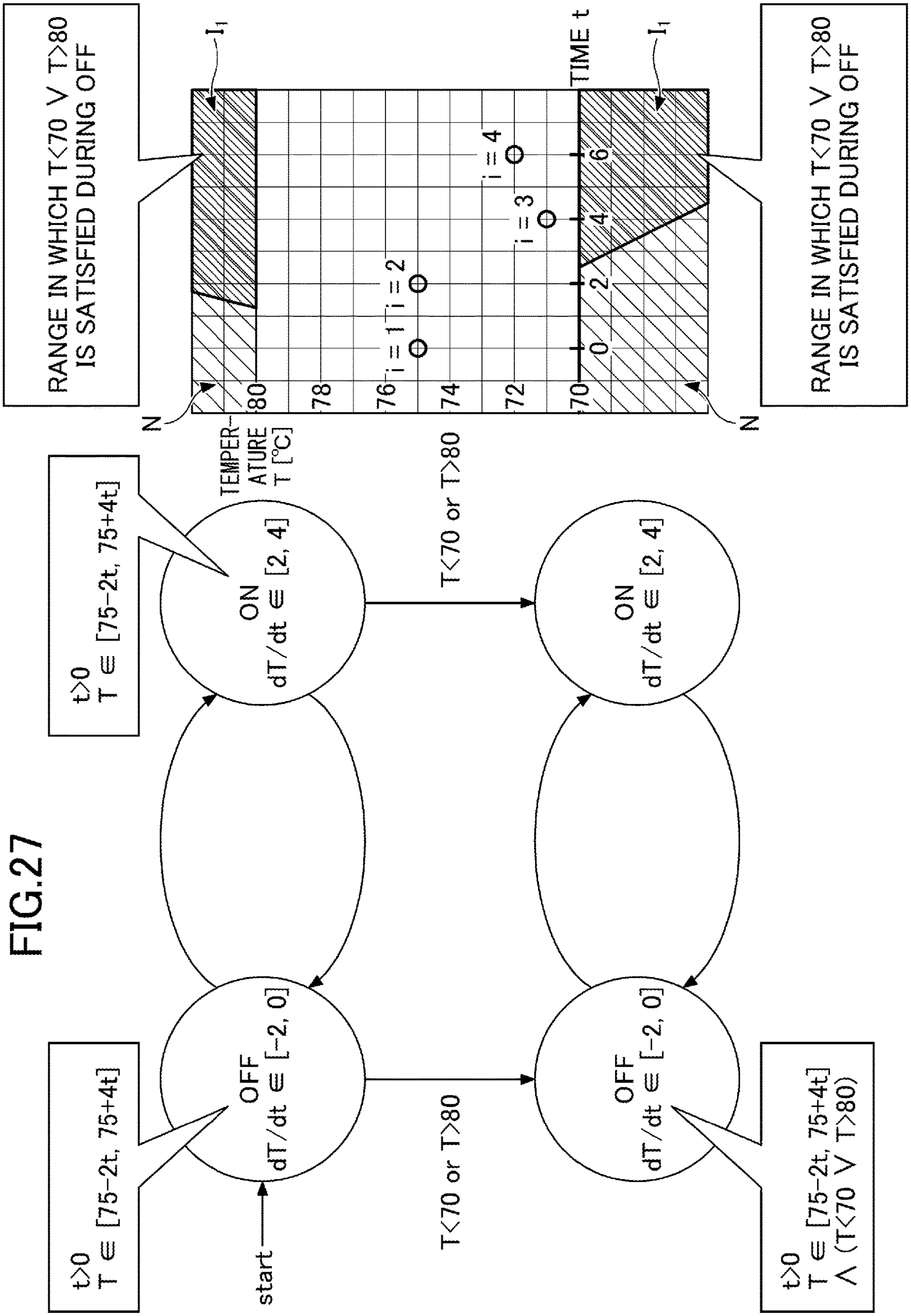
FIG. 27 is a diagram that shows a monitoring process according to one embodiment of the present disclosure.

Then, to determine the overlapping range $O_1$ between the forward-direction reachable range $F1_1$ and the insufficient range N according to the specification φ: "T<70 or T>80," the determining part 120 transitions the present state from the off state of the upper-half hybrid automaton to the off state of the lower-half hybrid automaton. As shown in FIG. 27, the overlapping range $O_1$ is the common range $I_1$ between the forward-direction reachable range $F_1$ and the insufficient range N.

Figure 28:
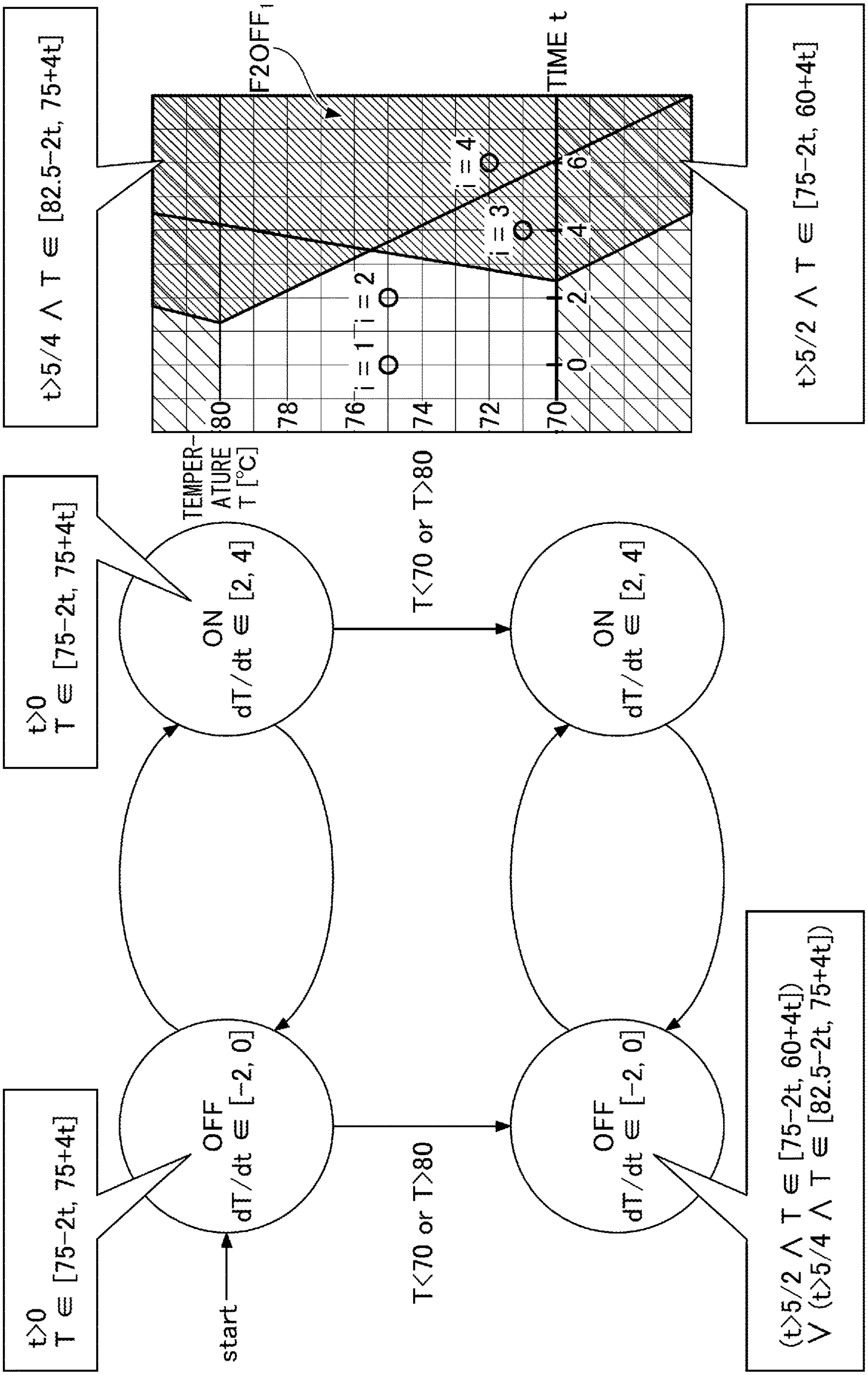
FIG. 28 is a diagram that shows a monitoring process according to one embodiment of the present disclosure.

Next, the determining part 120 determines a reachable range $F2OFF_1$ that can be reached from the overlapping range $O_1$ in the forward direction on the time axis while the present state is in the off state of the lower-half hybrid automaton. To be more specific, similar to the above-described method of calculating the forward-direction reachable range $F1_1$, the determining part 120 determines the ranges of triangles that can be reached from each point of the overlapping range $O_1$ in the forward direction on the time axis, and, by superimposing the ranges of these triangles over one another, obtains the reachable range $F2OFF_1$, as shown in FIG. 28.

Figure 29:
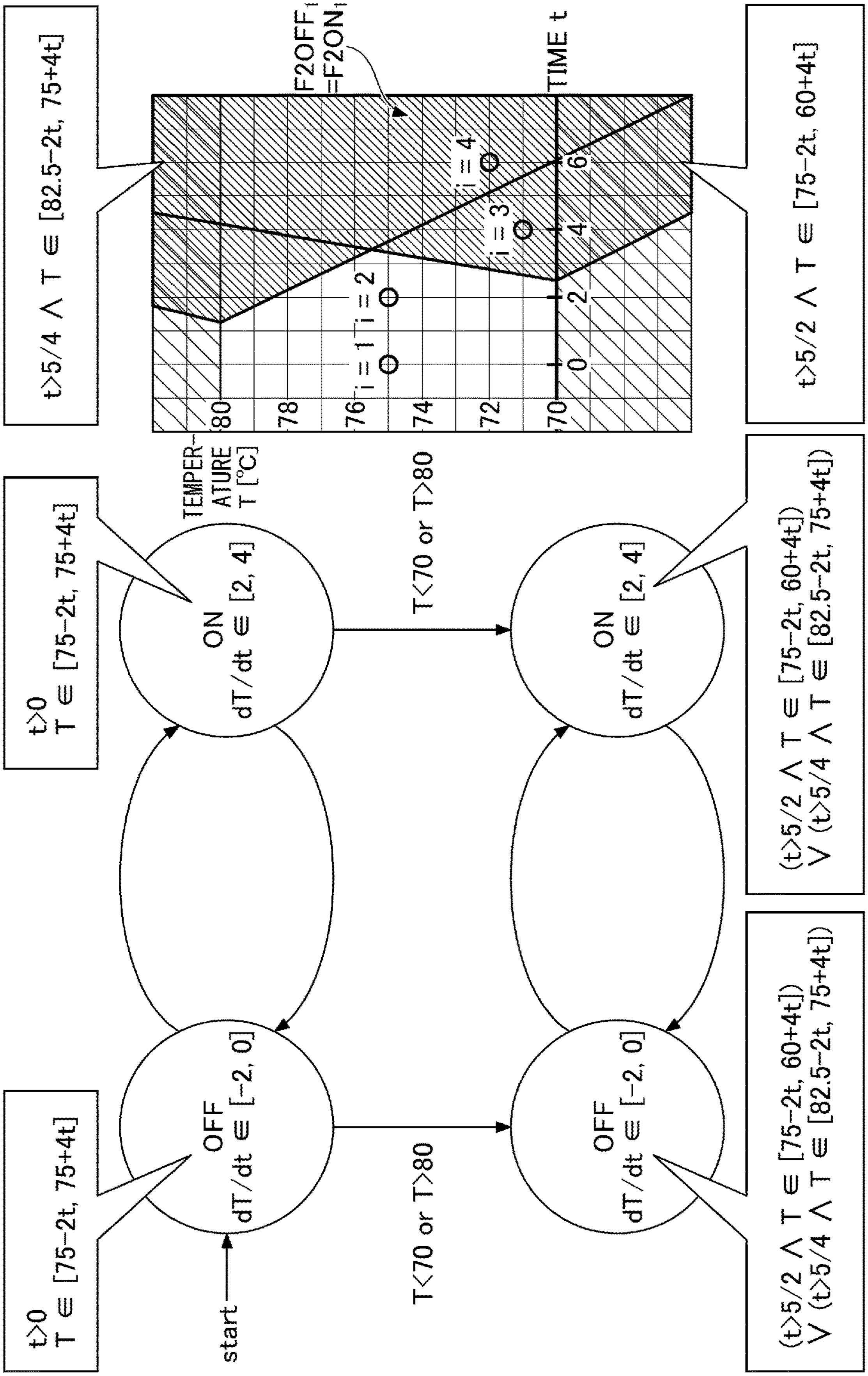
FIG. 29 is a diagram that shows a monitoring process according to one embodiment of the present disclosure.

Next, the determining part 120 transitions the present state to the on state of the lower-half hybrid automaton, and determines a reachable range $F2ON_1$ that can be reached from the overlapping range $O_1$ in the forward direction on the time axis while the present state is in the on state of the lower-half hybrid automaton. As shown in FIG. 29, the reachable range $F2OFF_1$ and the reachable range $F2ON2_1$ are the same, and so these will be referred to as a "reachable range $F2_1$."

Figure 30:
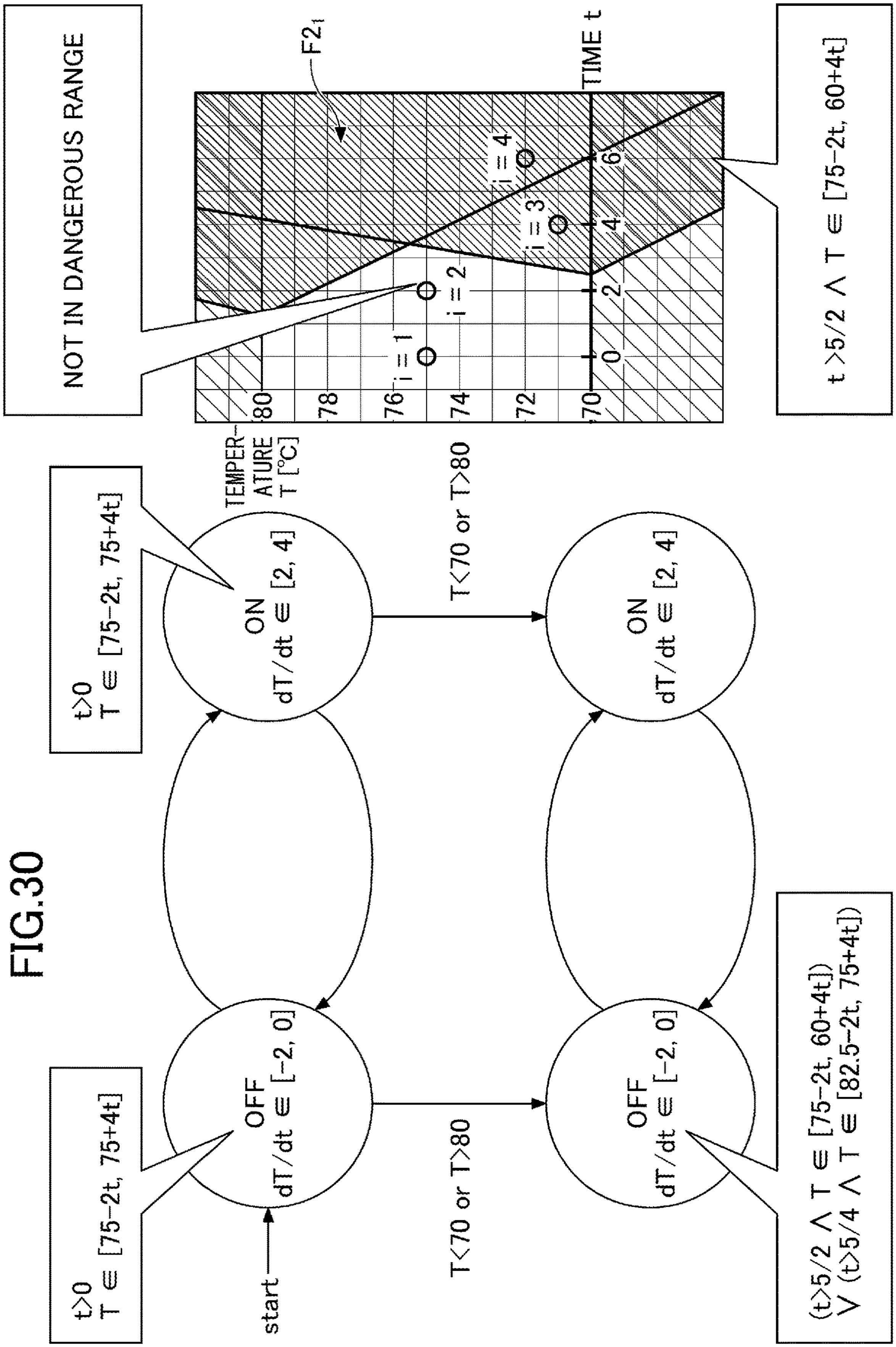
FIG. 30 is a diagram that shows a monitoring process according to one embodiment of the present disclosure.

Then, the determining part 120 determines whether $T_2=75$ is included in the reachable range $F2_1$. As shown in FIG. 30, $T_2=75$ is not included in the reachable range $F2_1$, and therefore the determining part 120 determines that it is not possible to reach $T_2=75$ from $T_1=75$ via the insufficient range N, and that the constant temperature bath control system satisfies the specification φ in the range of time $0 \le t \le 2$.

Figure 31:
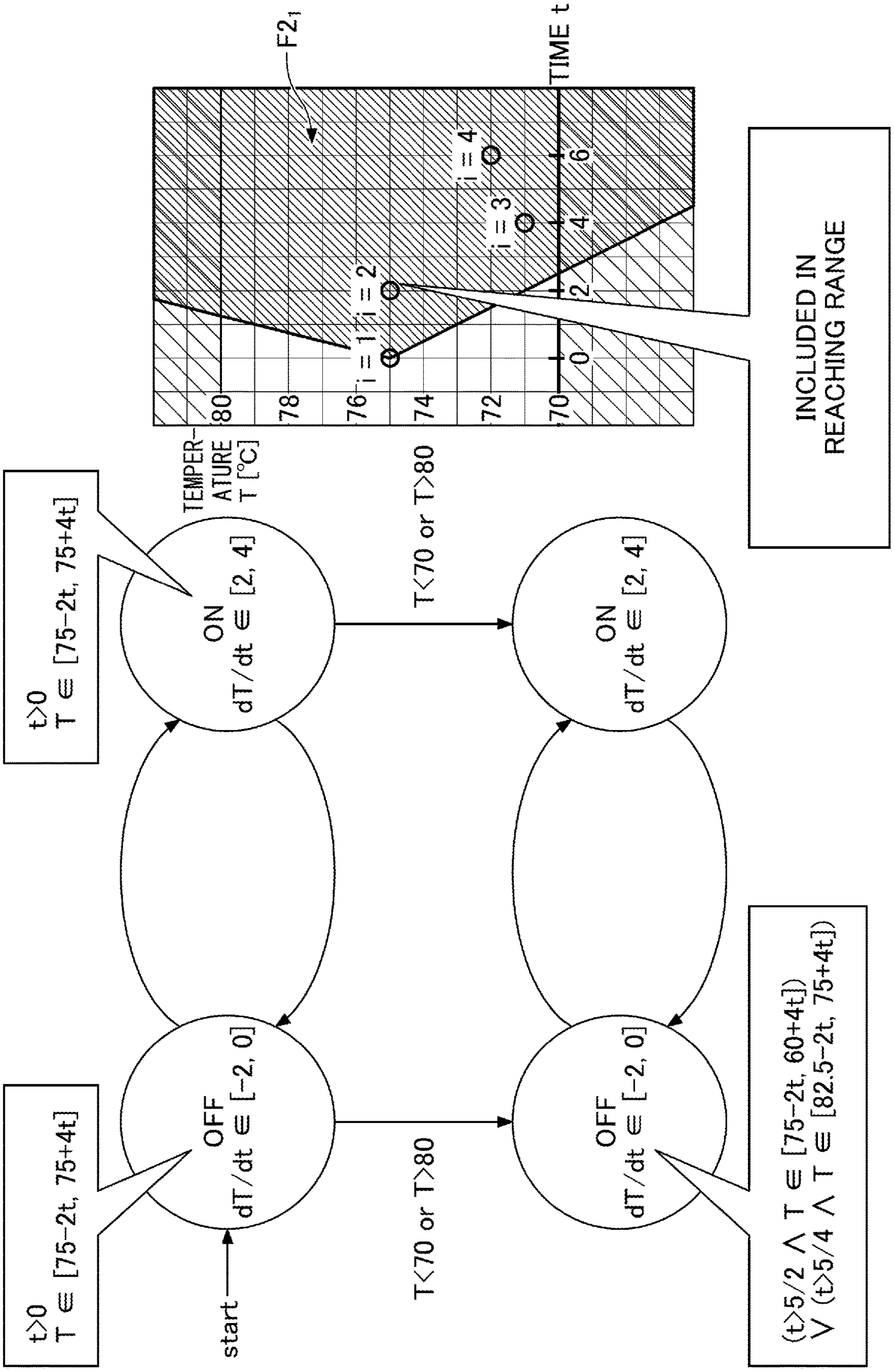
FIG. 31 is a diagram that shows a monitoring process according to one embodiment of the present disclosure.

Note that the determining part 120 may confirm if it is possible to reach from $T_1$ to $T_2$ in the forward direction on the time axis. As shown in FIG. 31, since the forward-direction reachable range $F2_1$, which starts from T1, includes $T_2=75$, it is clear that it is possible to reach from $T_1$ to $T_2$ in the forward direction on the time axis. If it is not possible to reach from $T_1$ to $T_2$ in the forward direction on the time axis, it then can be determined that there was a problem with the observation of the observed value $T_2$.

Figure 32:
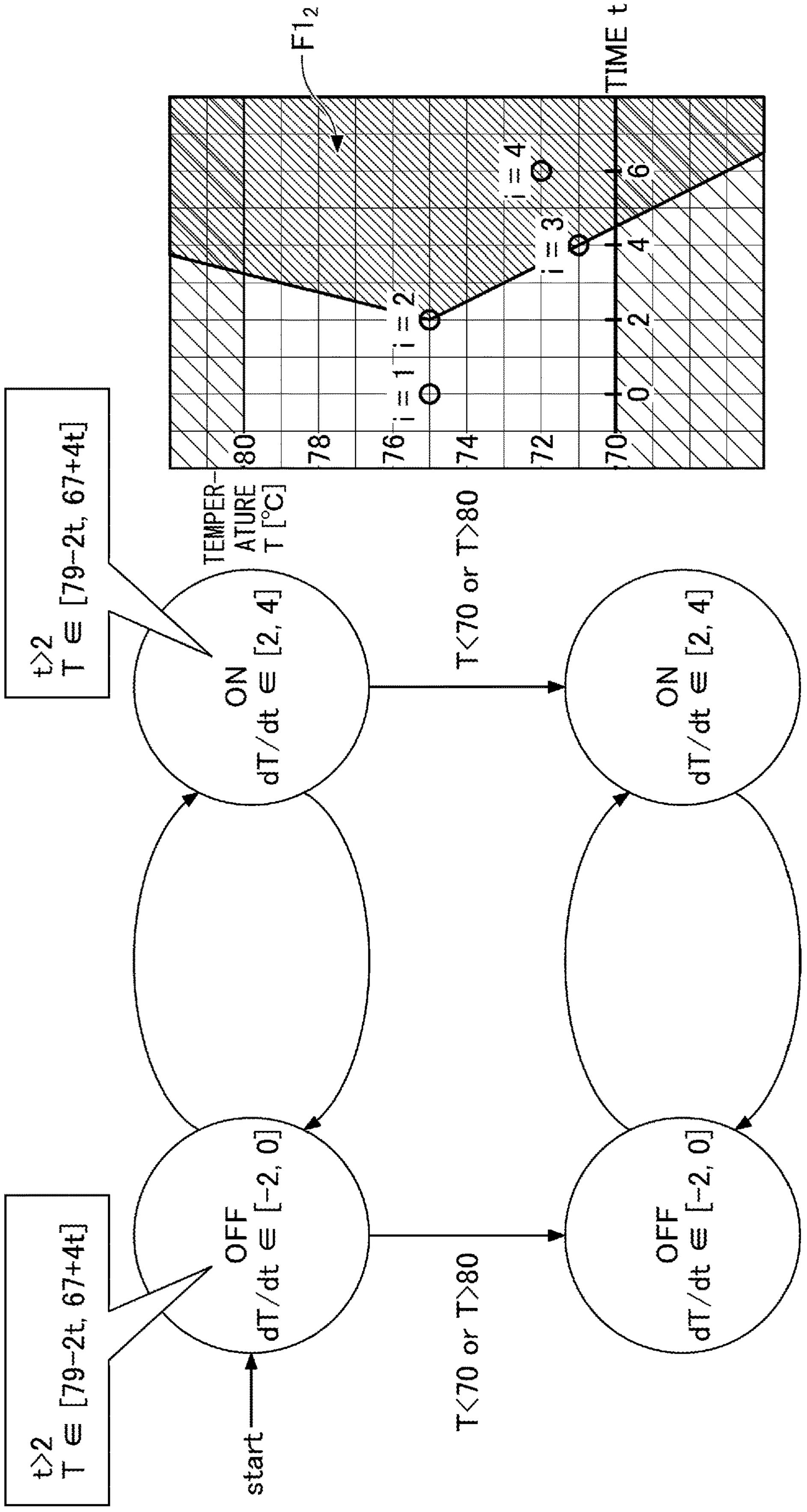
FIG. 32 is a diagram that shows a monitoring process according to one embodiment of the present disclosure.

Next, the above process is repeated with respect to the observed value $T_2$. At time $t>_2$, $T \in [79-2t, 67+4t]$ holds, and, as shown in FIG. 32, the determining part 120 determines a forward-direction reachable range $F1_2$ that can be reached in the forward direction on the time axis while the present state is in the off state or the on state of the upper-half hybrid automaton.

Figure 33:
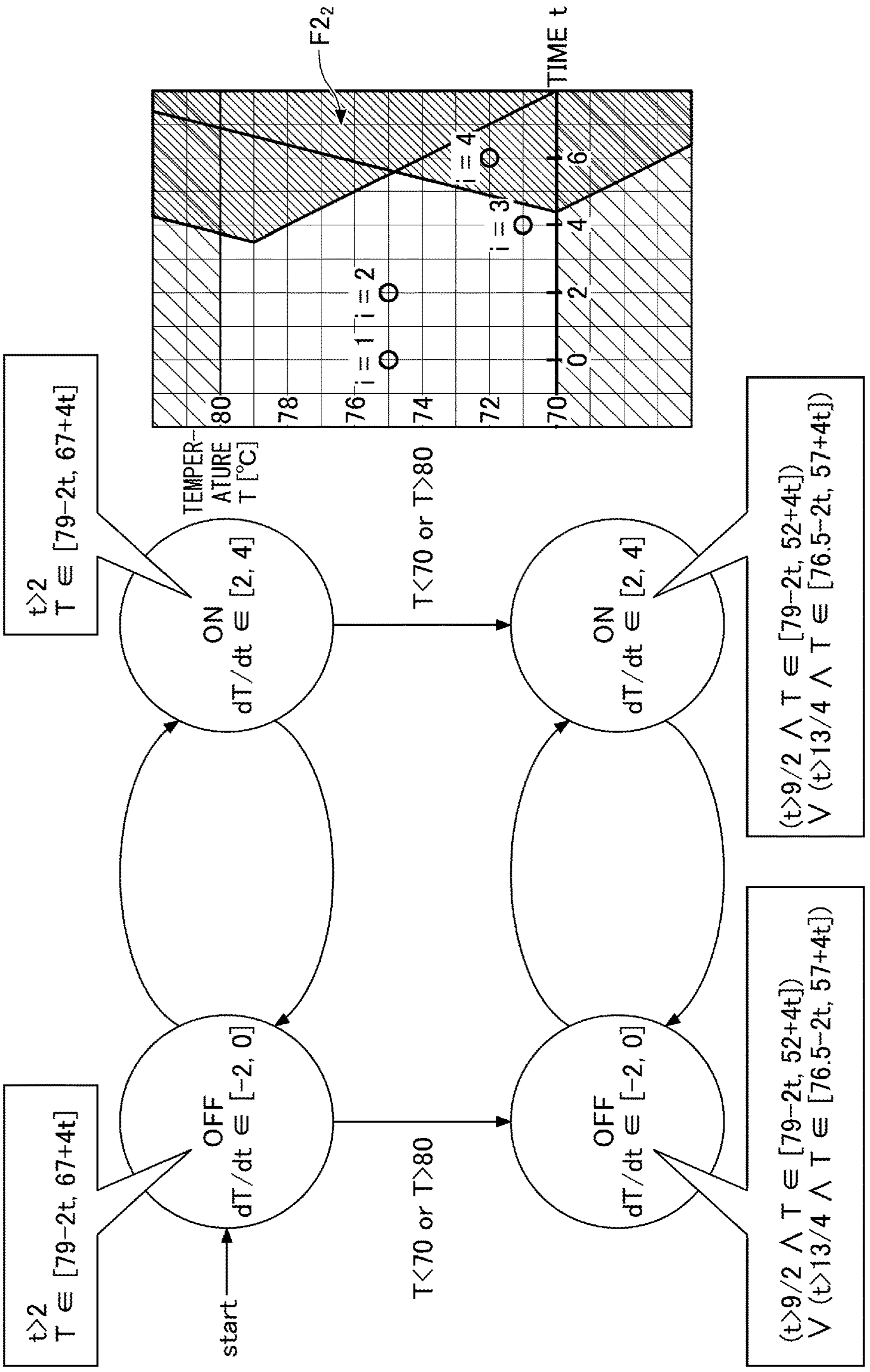
FIG. 33 is a diagram that shows a monitoring process according to one embodiment of the present disclosure.

Next, the determining part 120 determines an overlapping range $O_2$ between the forward-direction reachable range $F1_2$ and the insufficient range N, and determines a reachable range $F2_2$ that can be reached from the overlapping range $O_2$ in the forward direction on the time axis while the present state is in the off state and the on state of the lower-half hybrid automaton. The reachable range $F2_2$ is, for example, the range shown in FIG. 33.

Figure 34:
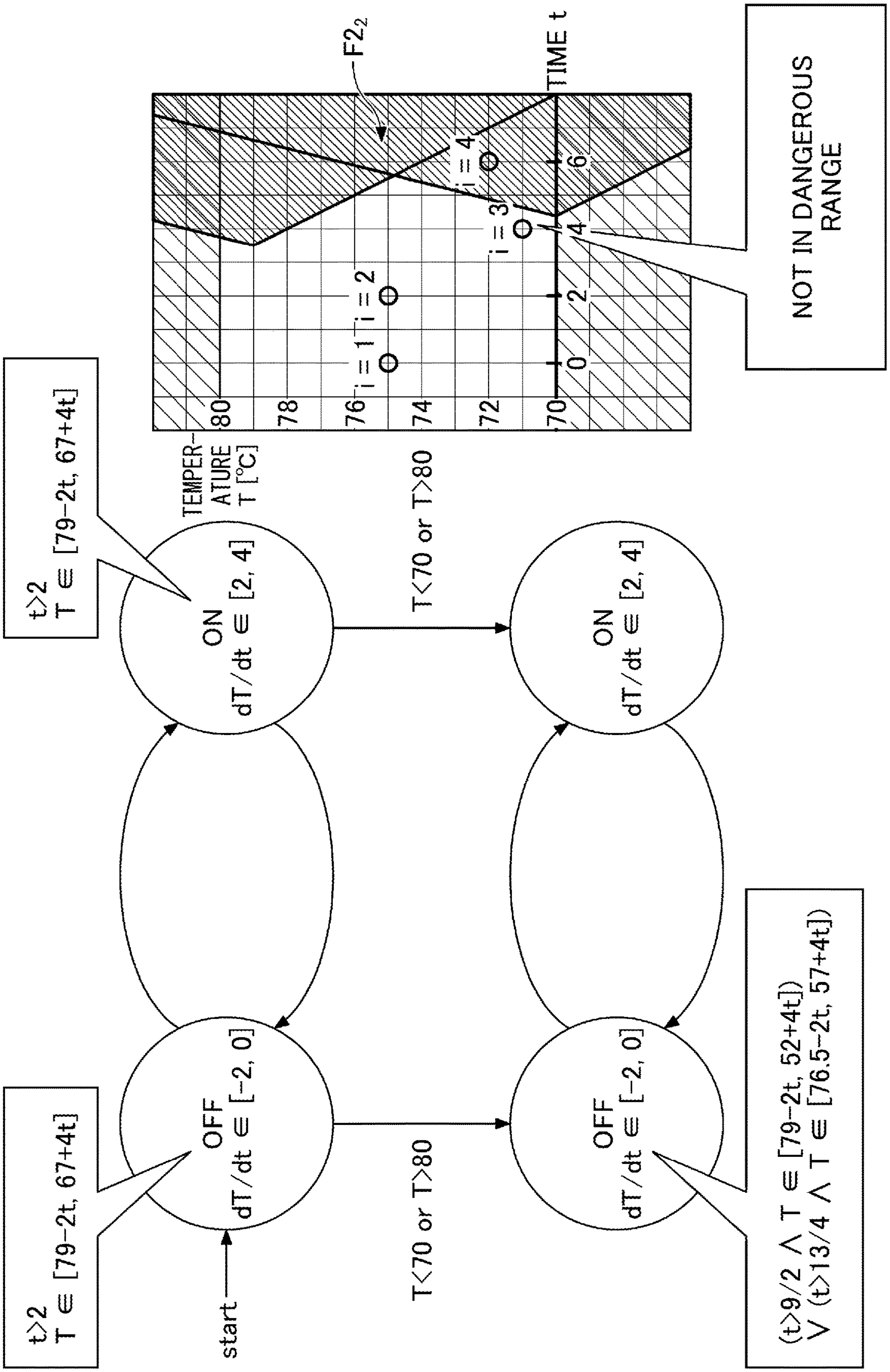
FIG. 34 is a diagram that shows a monitoring process according to one embodiment of the present disclosure.

Then, the determining part 120 determines whether $T_3$=71 is included in the reachable range $F2_2$. As shown in FIG. 34, $T_3$=71 is not included in the reachable range $F2_2$, and therefore the determining part 120 determines that it is not possible to reach $T_3$=71 from $T_2$=75 via the insufficient range N, and that the constant temperature bath control system satisfies the specification φ in the range of time 2≤t≤4.

Figure 35:
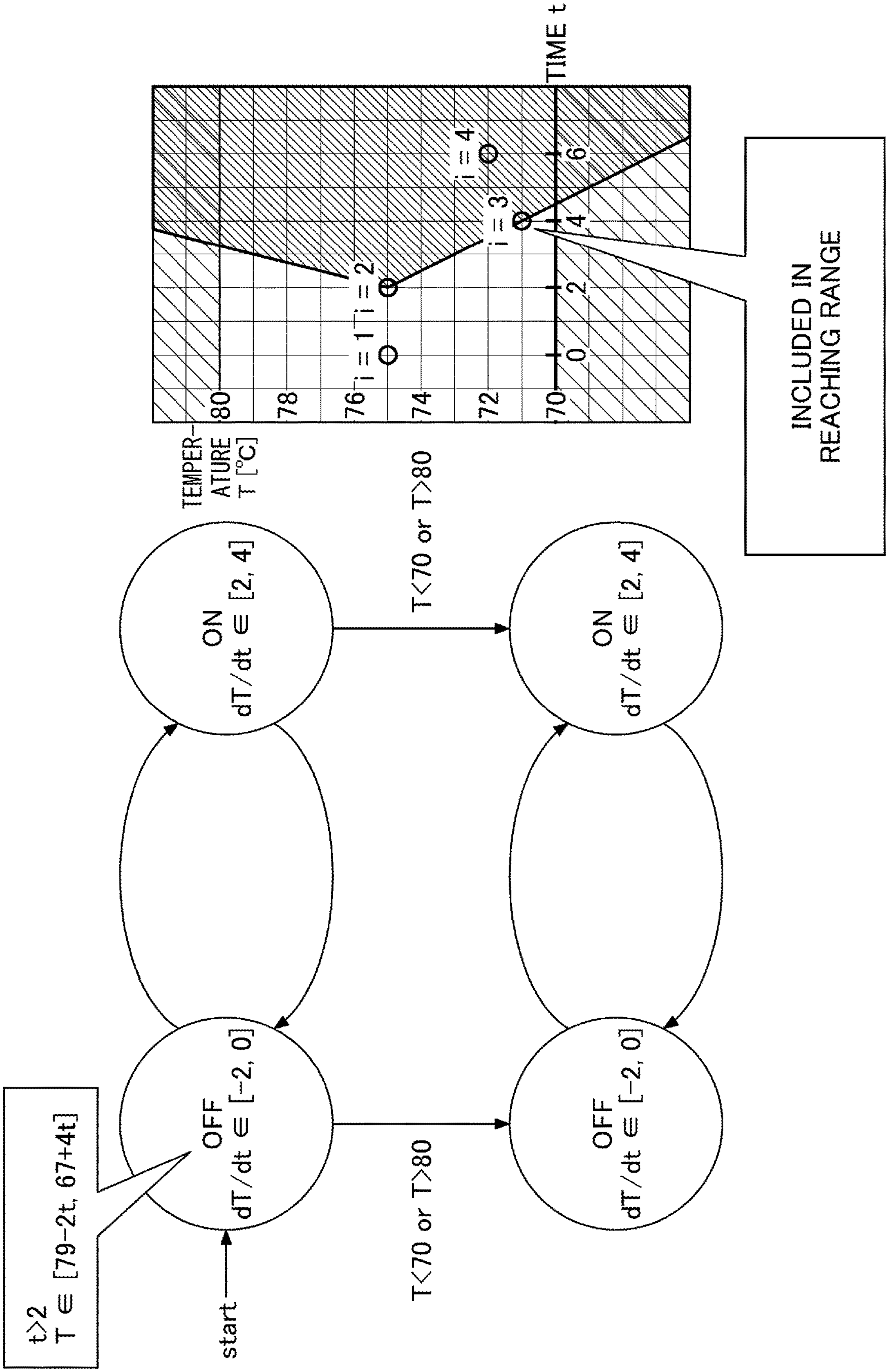
FIG. 35 is a diagram that shows a monitoring process according to one embodiment of the present disclosure.

Note that the determining part 120 may confirm if it is possible to reach from $T_2$ to $T_3$ in the forward direction on the time axis. As shown in FIG. 35, since the forward-direction reachable range $F2_2$, which starts from $T_2$, includes $T_3$=71, it is clear that that it is possible to reach from $T_2$ to $T_3$ in the forward direction on the time axis. If it is not possible to reach from $T_2$ to $T_3$ in the forward direction on the time axis, it then can be determined that there was a problem with the observation of the observed value $T_3$.

Figure 36:
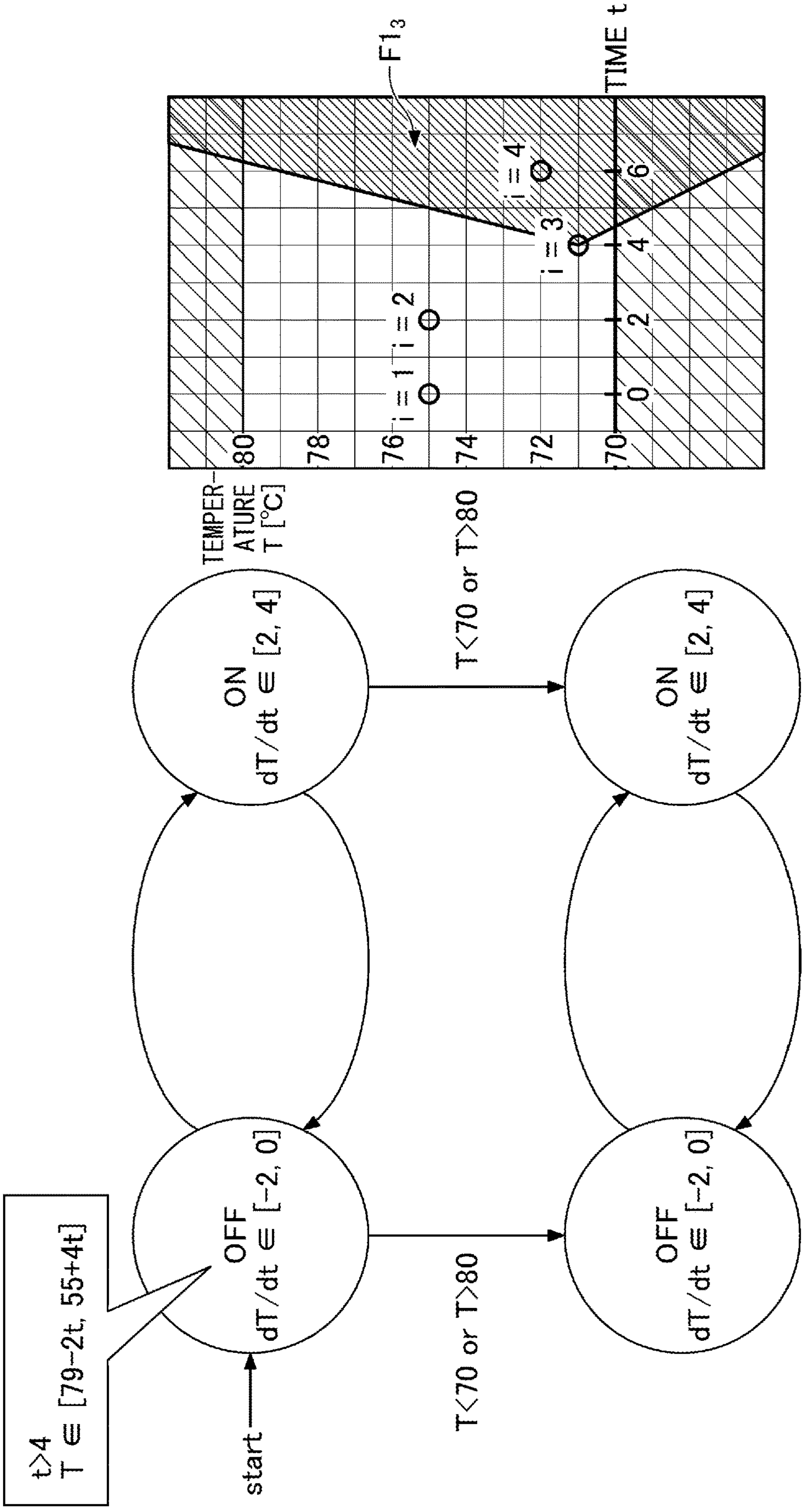
FIG. 36 is a diagram that shows a monitoring process according to one embodiment of the present disclosure.

Next, the above process is repeated with respect to the observed value $T_3$. At time t>4, T∊[79−2t, 55+4t] holds, and, as shown in FIG. 36, the determining part 120 determines a forward-direction reachable range $F1_3$ that can be reached in the forward direction on the time axis while the present state is in the off state or the on state of the upper-half hybrid automaton.

Figure 37:
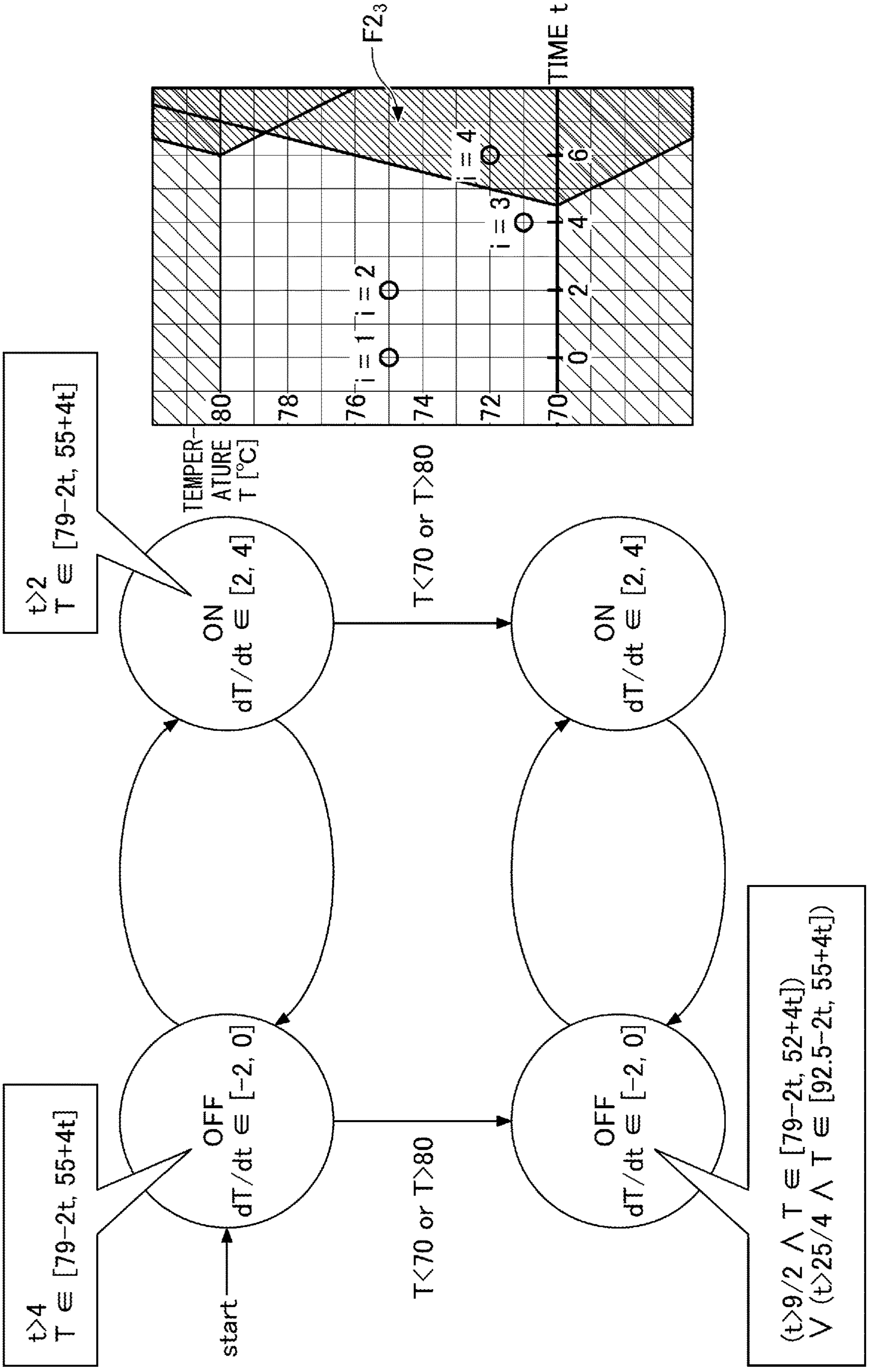
FIG. 37 is a diagram that shows a monitoring process according to one embodiment of the present disclosure.

Next, the determining part 120 determines an overlapping range $O_3$ between the forward-direction reachable range $F1_3$ and the insufficient range N, and determines a reachable range $F2_3$ that can be reached from the overlapping range $O_3$ in the forward direction on the time axis while the present state is in the off state and the on state of the lower-half hybrid automaton. The reachable range $F2_3$ is, for example, the range shown in FIG. 37.

Figure 38:
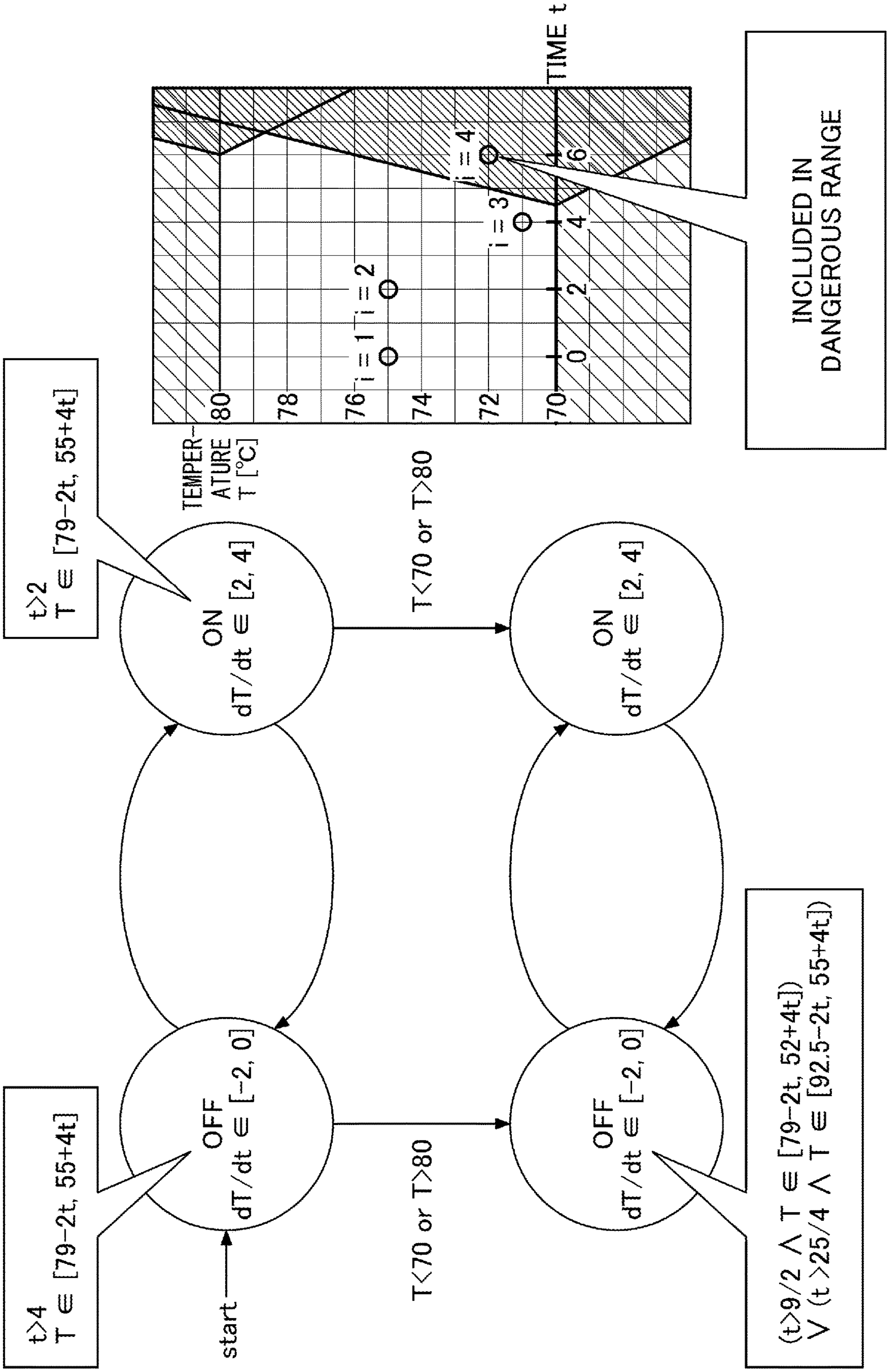
FIG. 38 is a diagram that shows a monitoring process according to one embodiment of the present disclosure.

Then, the determining part 120 determines whether $T_4$=72 is included in the reachable range $F2_3$. As shown in FIG. 38, $T_4$=72 is included in the reachable range $F2_3$, and therefore the determining part 120 determines that it is not possible to reach $T_4$=72 from $T_3$=71 via the insufficient range N, and that the constant temperature bath control system does not satisfy the specification φ in the range of time 4≤t≤6.

As a result of this, the determining part 120 determines that the constant temperature bath control system does not satisfy the specification φ, as in the monitoring process of embodiment 1.

In the above-described embodiment, the forward-direction reachable range $F1_i$ is a range that can be reached from time i until any point in time, in the forward direction on the time axis. However, the present disclosure is by no means limited to this, and the forward-direction reachable range $F1_i$ may be, for example, a range that can be reached from time i until time (i+1) in the forward direction.

[Monitoring Process for Automobile Control System According to Embodiment 2]

To illustrate another example, a case will be described below in which, as in embodiment 1, a monitoring process is performed to determine whether or not an automobile control system that controls an automobile satisfies a specification φ: "the velocity v is always 120 km/h or slower (v≤120)." The automobile control system operates an automobile in a low-speed mode (LOW) and a high-speed mode (HIGH). A minimum interval of 2 seconds is required to switch the mode. In the low-speed mode, the velocity v is from 0 to 90 km/h (v∊[0, 90]), and, in the low-speed mode, the velocity v varies in a range of −6 to 15 km/h per unit time (dv/dt∊[−6, 15]). On the other hand, in the high-speed mode, the velocity v is 30 km/h or faster (v≥30), and, in the high-speed mode, the velocity v varies in a range of −6 to 7 km/h per unit time (dv/dt∊[−6, 7]). Also, transition from the low-speed mode to the high-speed mode is possible only when v≥45 holds, and transition from the high-speed mode to the low-speed mode is possible only when v≤50 holds. Also, the time to spend in each mode is represented by a parameter c. For example, as shown in FIG. 15, the automobile control system according to this embodiment can be represented by a hybrid automaton that can express discrete mode changes of a differential equation. For example, assume that, as illustrated in FIG. 16, the acquiring part 110 acquires three observed values, namely $v_1$=30 (t=1), $v_2$=90 (t=6), and $v_3$=100 (t=15), sampled with respect to an automobile that is controlled by the automobile control system.

Figure 39:
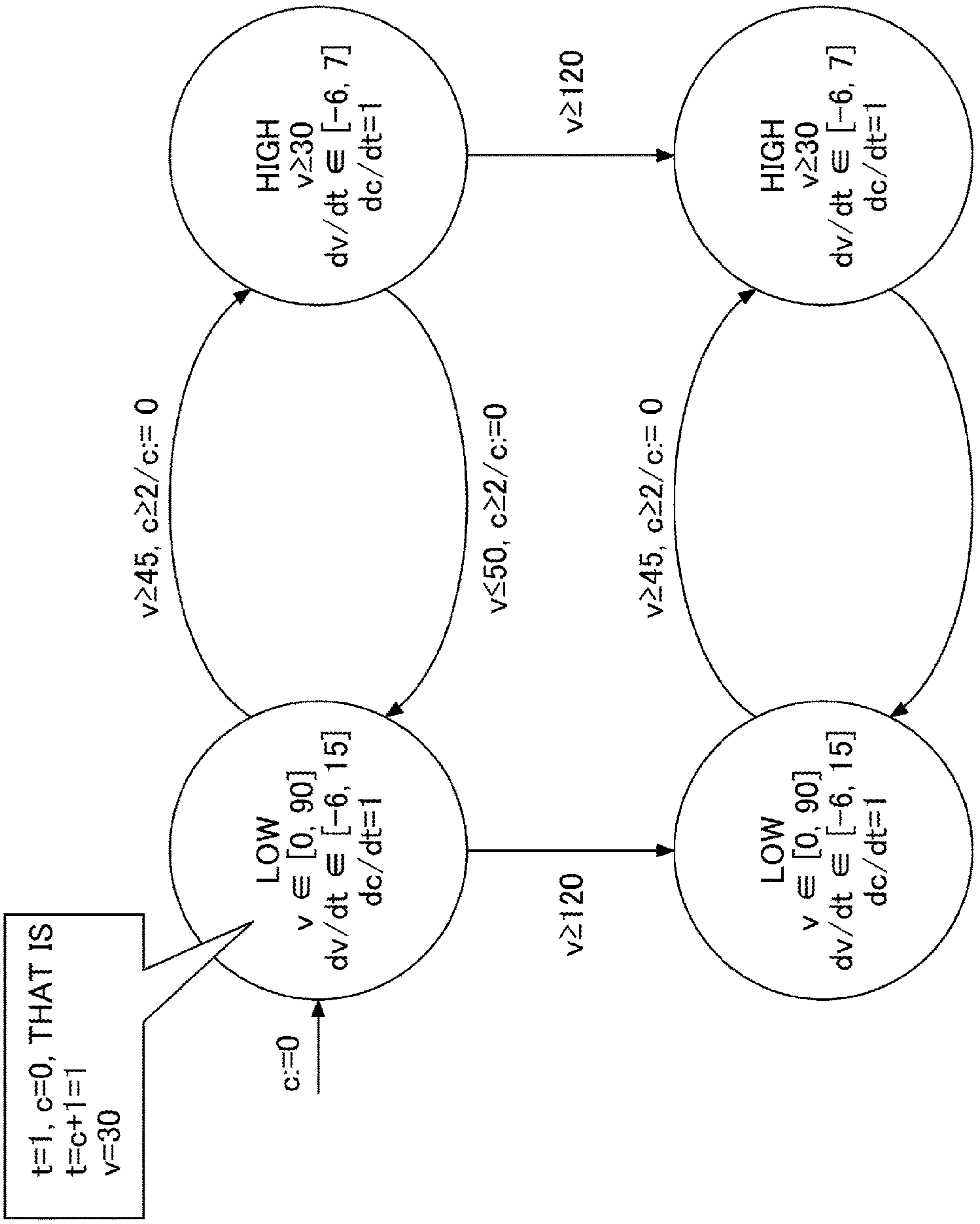
FIG. 39 is a diagram that shows a monitoring process according to one embodiment of the present disclosure.

According to embodiment 2, the hybrid automaton of FIG. 15 is enhanced to hybrid automata including transition to the insufficient range N "v>120," as shown in FIG. 39. The upper half of the enhanced hybrid automata represents transition between the low-speed mode and the high-speed mode of the automobile within a range the specification φ is satisfied, from the initial state (start). The lower-half hybrid automaton is a duplicate of the upper-half hybrid automaton, and represents transition between the low-speed mode and the high-speed mode of the automobile, after transition from the low-speed mode and the high-speed mode in the range in which the specification φ is satisfied in the upper-half hybrid automaton, to an insufficient range. The range that can be reached from the lower-half hybrid automaton corresponds to a range that can be reached after the behavior demonstrated by the upper-half hybrid automaton enters a dangerous range while in progress.

Since the example of the constant temperature bath control system described above was a relatively simple one, the monitoring process was explained by calculating various ranges and showing their inclusion relations in a graphic manner. However, the control system being subject to monitoring may not be always as simple as it can be illustrated. In the automobile control system according to the present embodiment, a monitoring process to use hybrid automata will be described without illustrating their inclusion relations in a graphic manner. The conditional expressions of the illustrated hybrid automata can be calculated based on differential equations, configuration conditions, and the like, and may be calculated by using any known library for polyhedral calculation such as Parma Polyhedra Library (PPL) (for more details, see, for example, https://www-.bugseng.com/parma-polyhedra-librar). In the following embodiment, only calculation results of conditional expressions based on polyhedral calculation and the like will be described for ease of understanding.

First, for the first point in time (i=1), the determining part 120 sets the low-speed mode of the upper-half hybrid automaton, which corresponds to the observed value $v_1$=30 (t=1) at the first point in time (t=1), to an initial state, as shown in FIG. 39.

Figure 40:
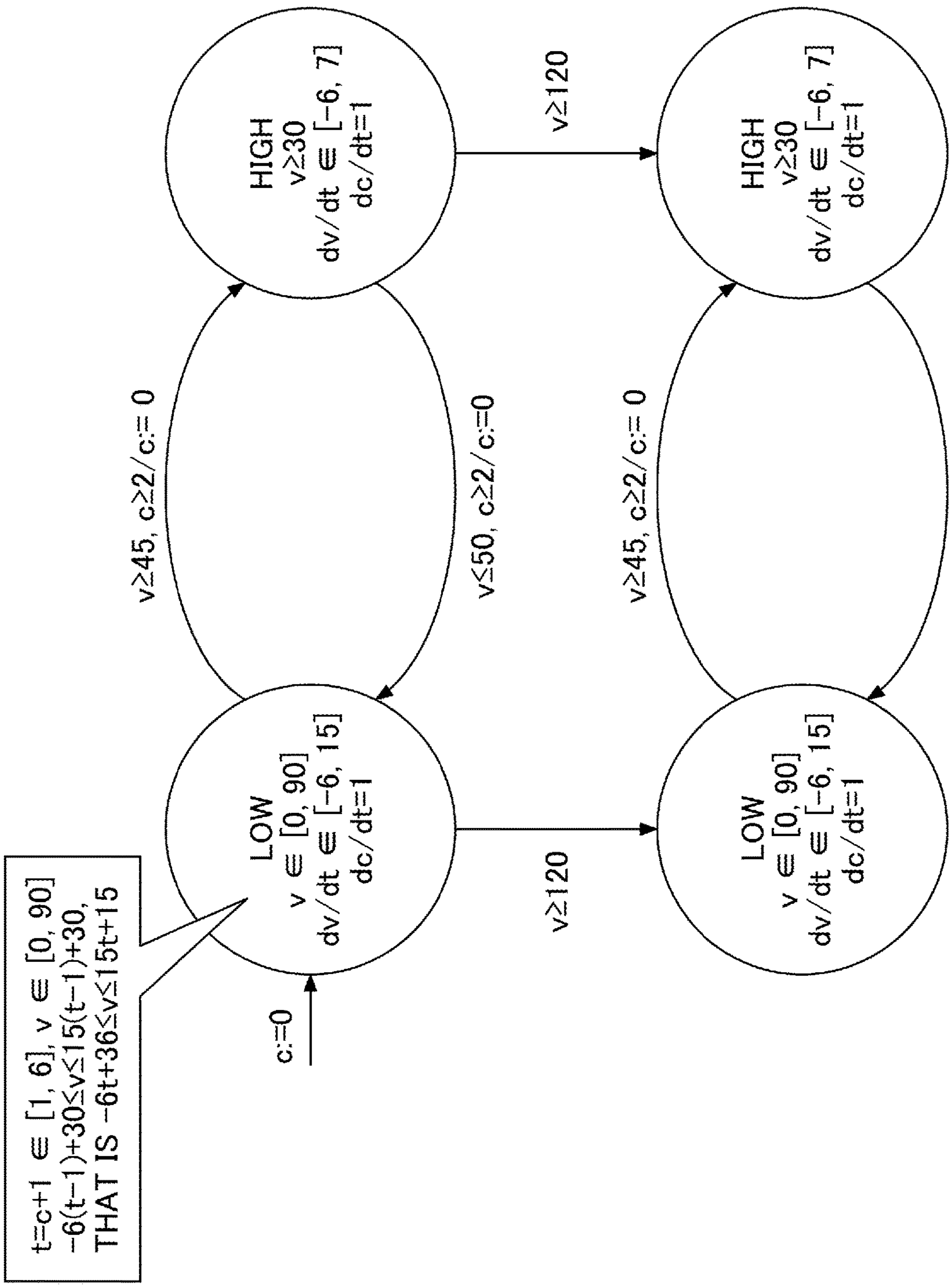
FIG. 40 is a diagram that shows a monitoring process according to one embodiment of the present disclosure.

Assuming that time passes in this initial state, the range of the velocity v that can be reached in the forward direction until a second point in time (t=6) is −(6t−1)+30≤v≤15(t−1)+30, that is, −6t+36≤v≤15t+15, as shown in FIG. 40.

Figure 41:
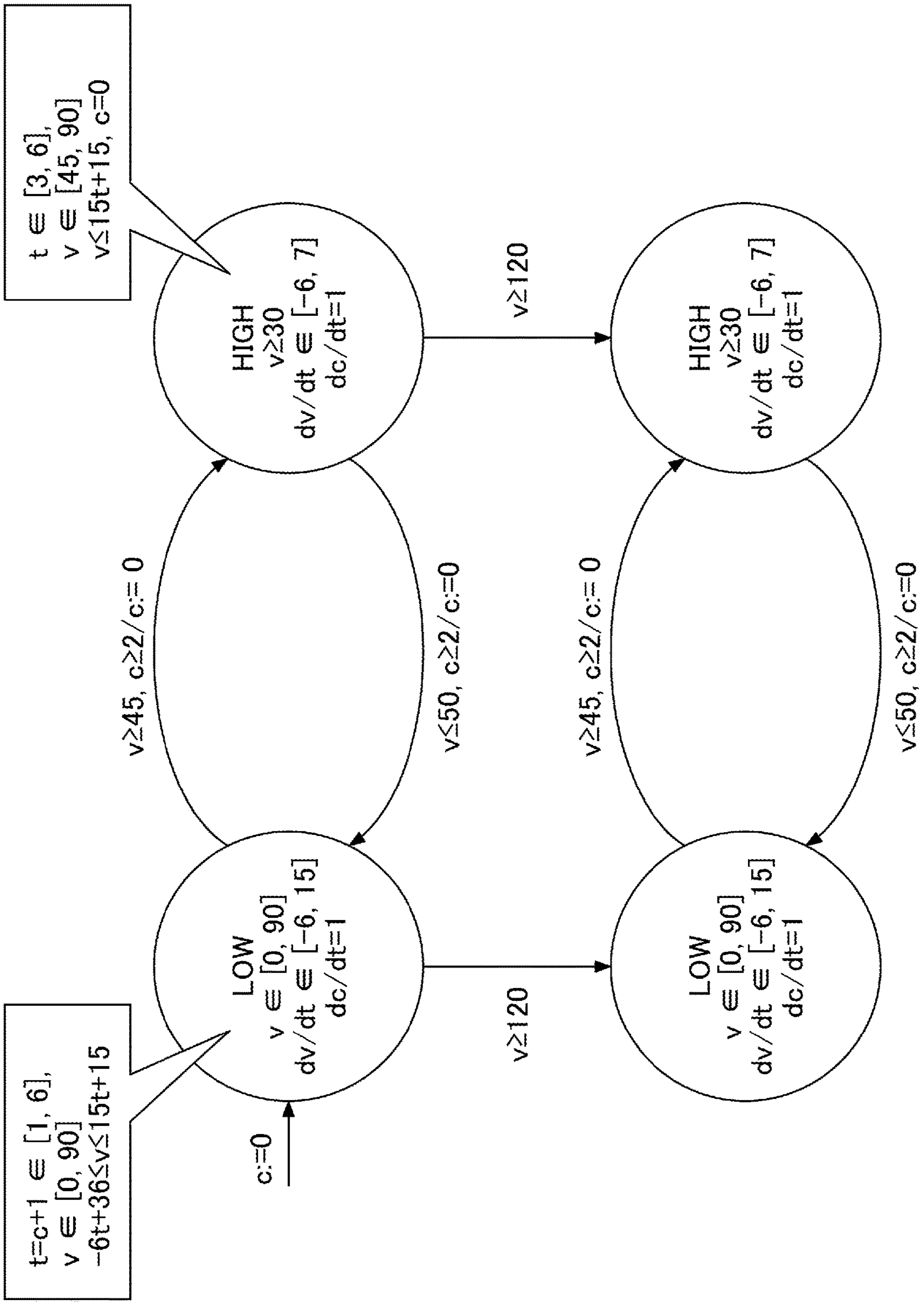
FIG. 41 is a diagram that shows a monitoring process according to one embodiment of the present disclosure.

Next, assuming that the low-speed mode of the initial state shifts to the high-speed mode of the upper-half hybrid automaton, then, as shown in FIG. 41, the determining part 120 derives t∊[3, 6], v∊[45, 90], and v≤15t+15, from the low-speed mode prior to the shift and the conditions for the transition v≥45 and c≥2. Also, the timer parameter c is reset to zero.

Figure 42:
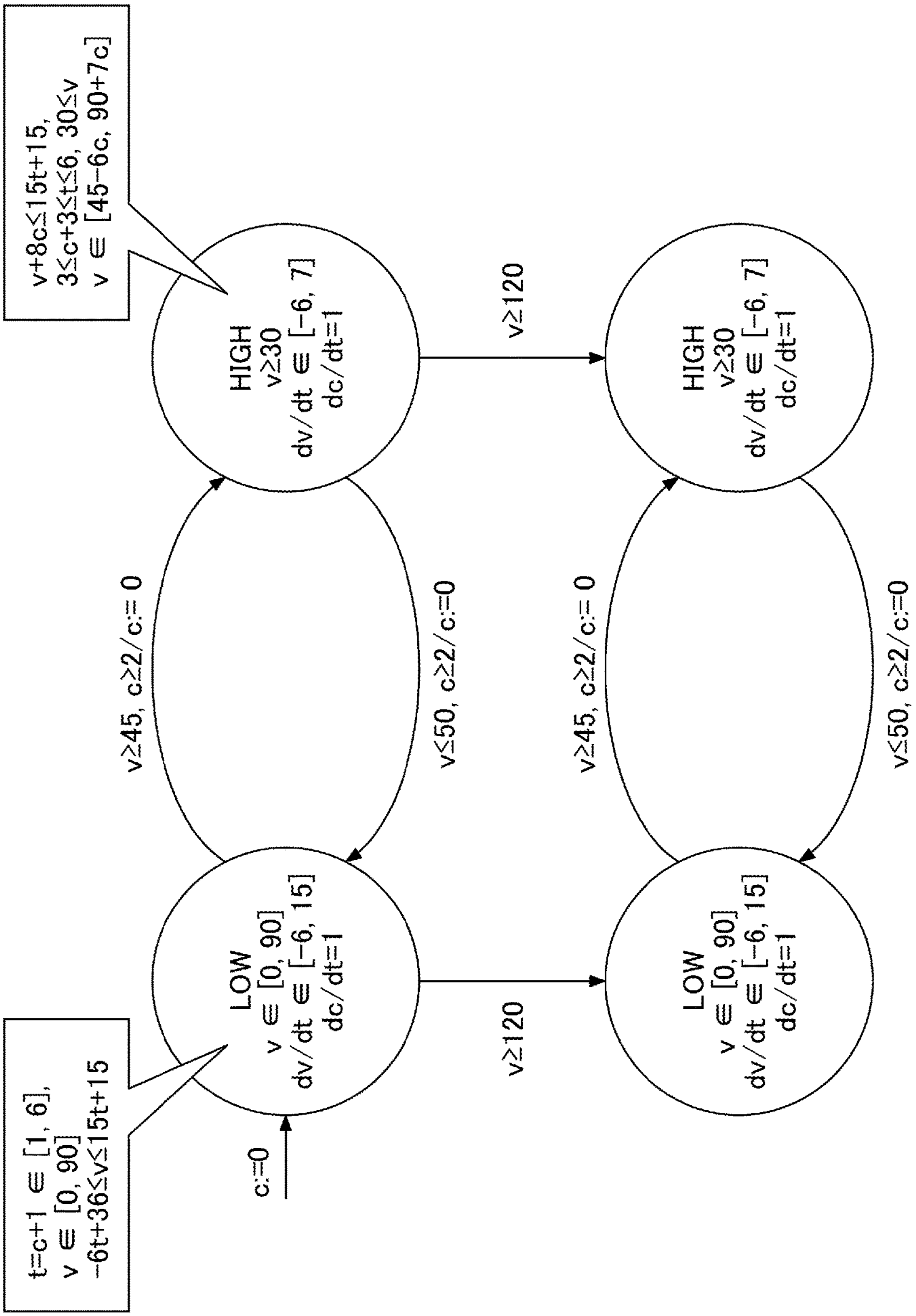
FIG. 42 is a diagram that shows a monitoring process according to one embodiment of the present disclosure.

Assuming that time passes in this high-speed mode, then, as shown in FIG. 42, by removing t and v from t∈[3, 6], v∈[45, 90], and v≤15t+15 derived above, the high-speed mode differential equation t'=t+c and v'∈[v−6c, v+7c] (here, t' is the time after the transition to the high-speed mode, and v is the speed upon transition to the high-speed mode), and the time-related conditions t'≤6 and 0≤c, the determining part 120 can derive the reachable range v+8c≤15t+15, 3≤c+3≤t≤6, 30≤v, and v∈[45−6c, 90+7c].

Next, the determining part 120 can determine that it is not possible to reach the insufficient range N "v>120" from the above-derived low-speed mode reachable range t=c+1∈[1, 6], v∈[0, 90], and −6t+36≤v≤15t+15, and the above-derived high-speed mode reachable range v+8c≤15t+15, 3 c+3≤t≤6, 30≤v, and v∈[45−6c, 90+7c]. That is, the upper limit of the velocity v is v=90+7×3=111 at t=6 after the transition to the high-speed mode, and is less than or equal to is 120.

Figure 43:
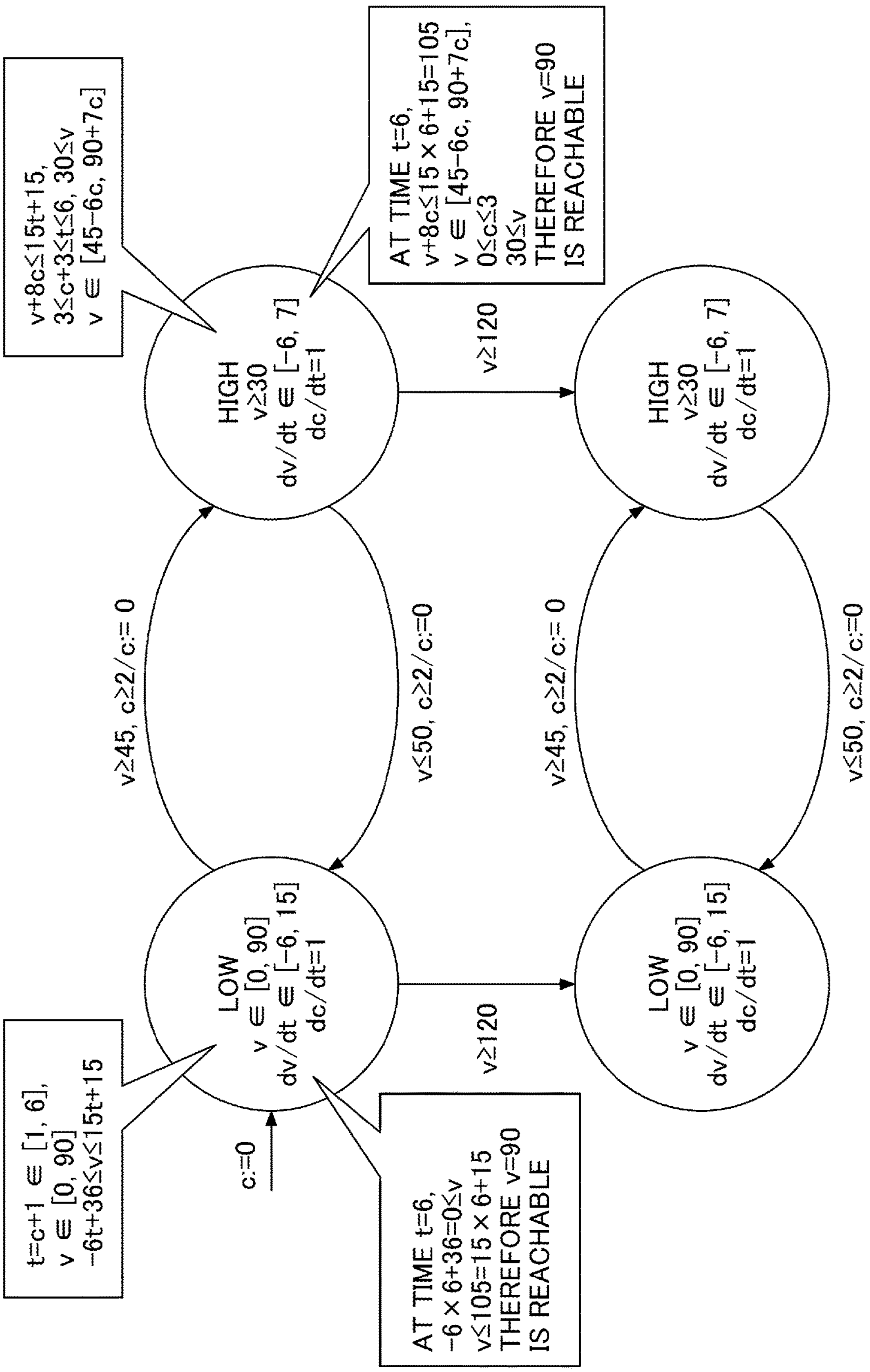
FIG. 43 is a diagram that shows a monitoring process according to one embodiment of the present disclosure.

Then, the determining part 120 determines whether the reachable range in the upper-half hybrid automaton includes $v_2$=90 (t=6). As shown in FIG. 43, the upper limit of the velocity v at t=6 in the low-speed mode is 15×6+15=105, and the upper limit of the velocity v at t=6 in the high-speed mode is 111, so that the determining part 120 determines that $v_2$=90 (t=6) can be reached.

Figure 44:
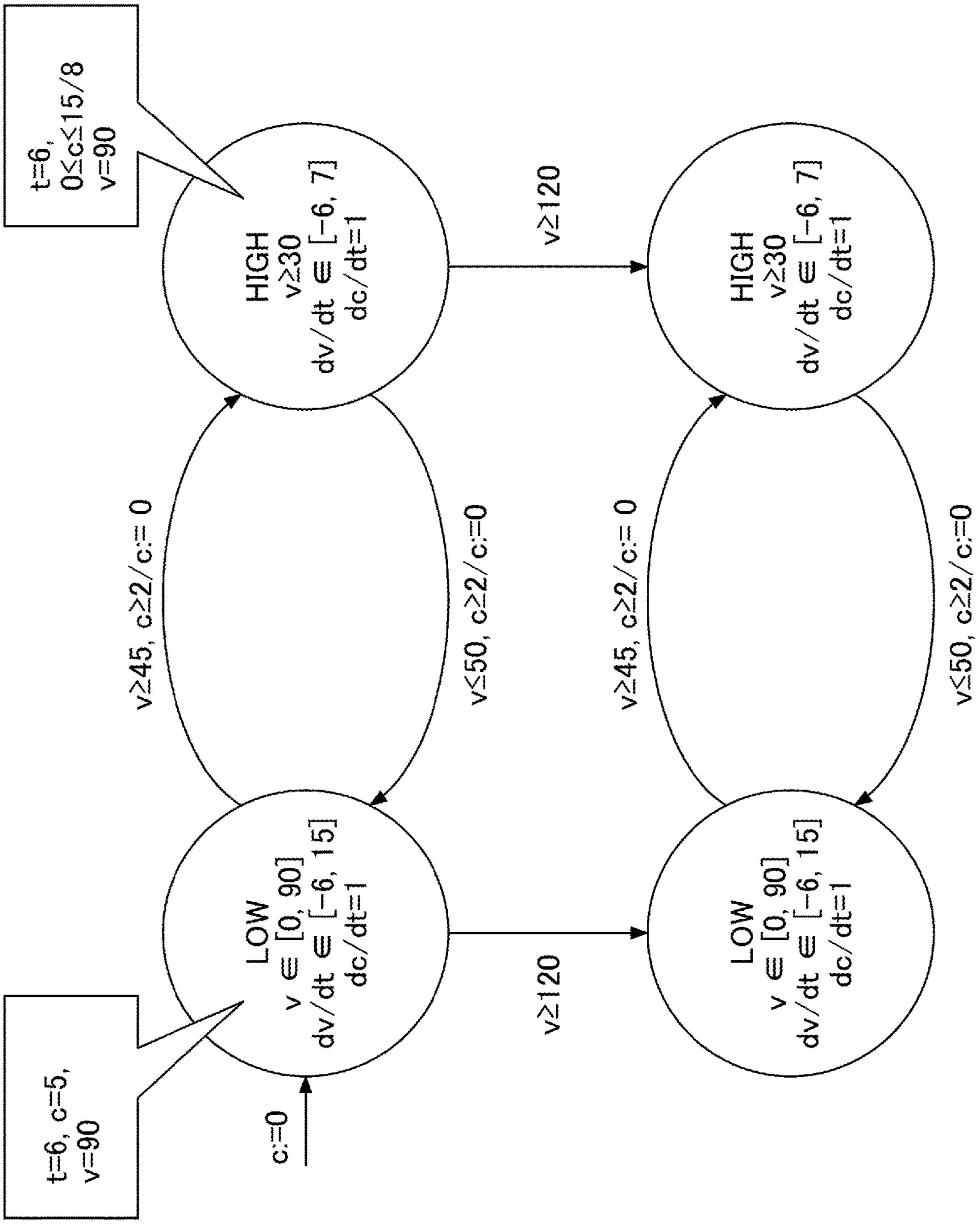
FIG. 44 is a diagram that shows a monitoring process according to one embodiment of the present disclosure.

Next, for the second point in time (i=2), the determining part 120 sets the low-speed mode and the high-speed mode of the upper-half hybrid automaton, which correspond to the observed value $v_2$=00 (t=6) at the second point in time (t=6), to initial states, as shown in FIG. 44. In the low-speed mode, t=6, c=5, and v=90, and, in the high-speed mode, t=6, 0≤c≤15/8, and v=90.

Figure 45:
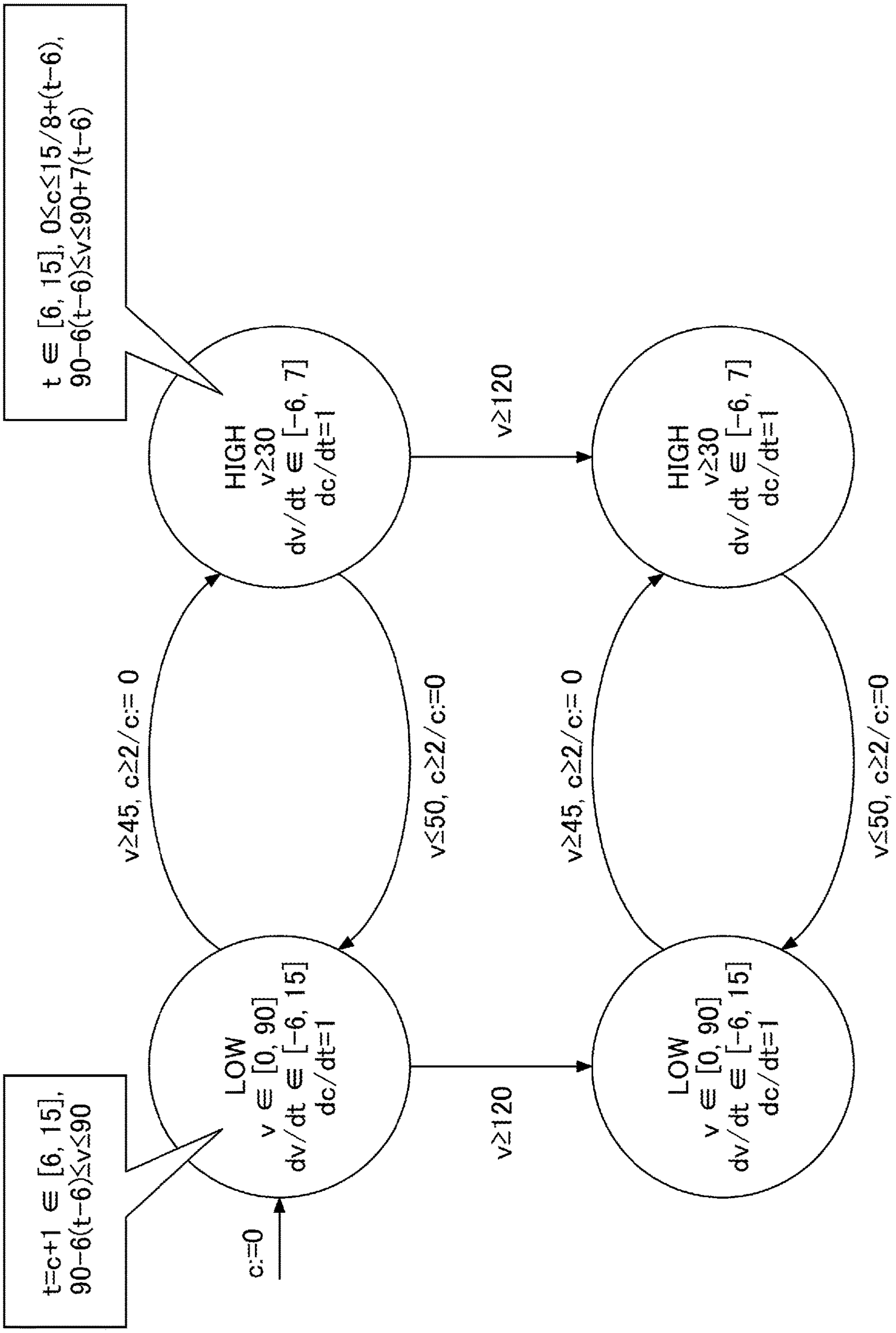
FIG. 45 is a diagram that shows a monitoring process according to one embodiment of the present disclosure.

Assuming that time passes in each state, the range of the velocity v that can be reached in the forward direction by a third point in time (t=15) is 90−6(t−6)≤v≤90 in the low-speed mode, and 90−6(t−6)≤v≤90+7(t−6) in the high-speed mode, as shown in FIG. 45.

Figure 46:
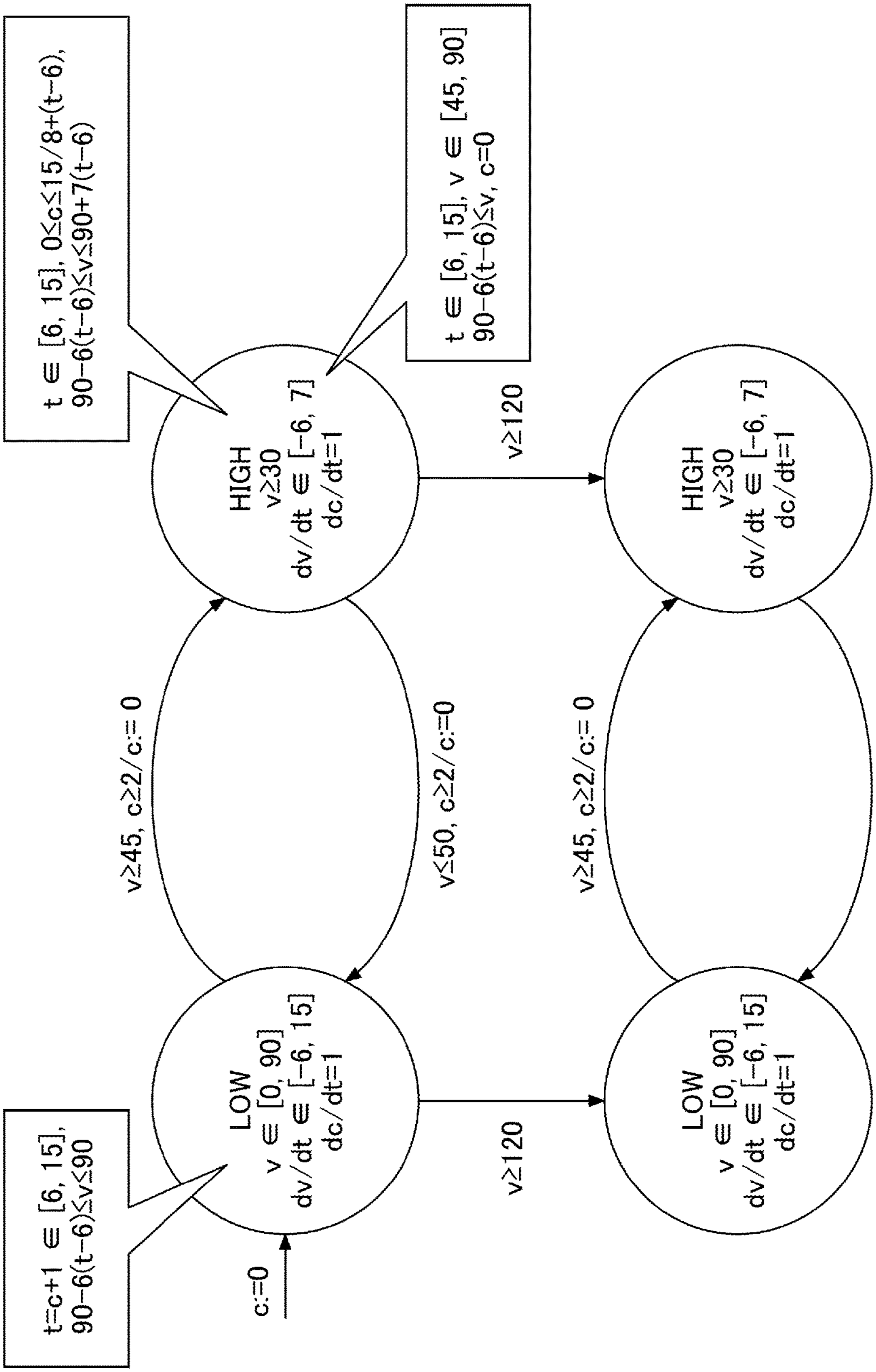
FIG. 46 is a diagram that shows a monitoring process according to one embodiment of the present disclosure.

Then, assuming that the low-speed mode shifts to the high-speed mode, as shown in FIG. 46, the determining part 120 derives t∈[6, 15], v∈[45, 90], and 90−6(t−6)≤v from the low-speed mode prior to the shift and the conditions for the transition v≥45 and c≥2. Also, the timer parameter c is reset to zero.

Figure 47:
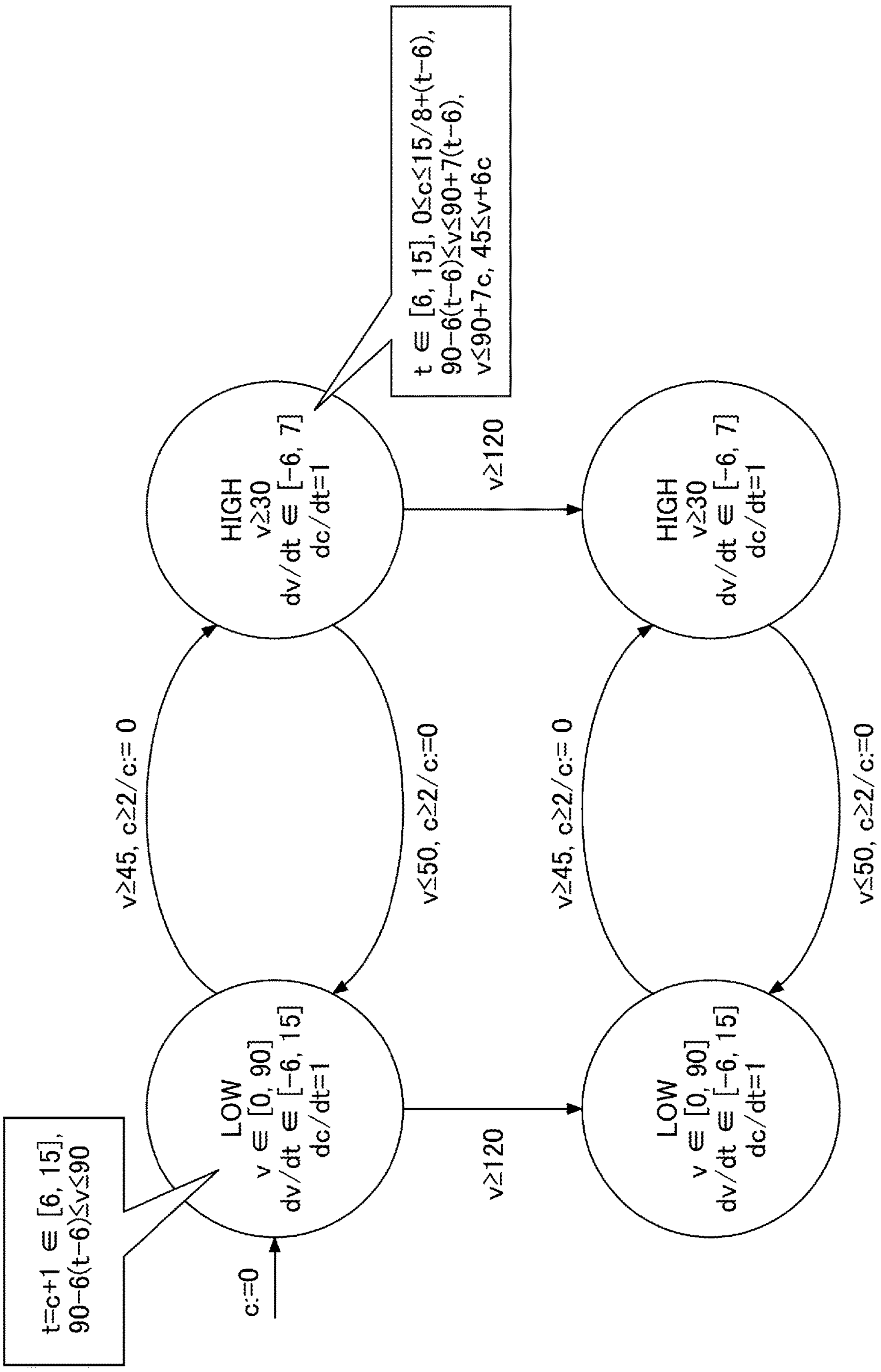
FIG. 47 is a diagram that shows a monitoring process according to one embodiment of the present disclosure.

Assuming that time passes in this high-speed mode, as shown in FIG. 47, the determining part 120 derives, from the above-derived t∈[6, 15], v∈[45, 90], 90−6(t−6)≤v, and c=0, the differential equation for the high-speed mode, and the conditions related to time, a reachable range t∈[6, 15], 0≤c≤15/8+(t−6), 90−6(t−6)≤v≤90+7(t−6), v≤90+7c, and 45≤v+6c. Here, the upper limit of the velocity v is 90+7 (15−6)=153, which may belong to the insufficient range "v>120."

Figure 48:
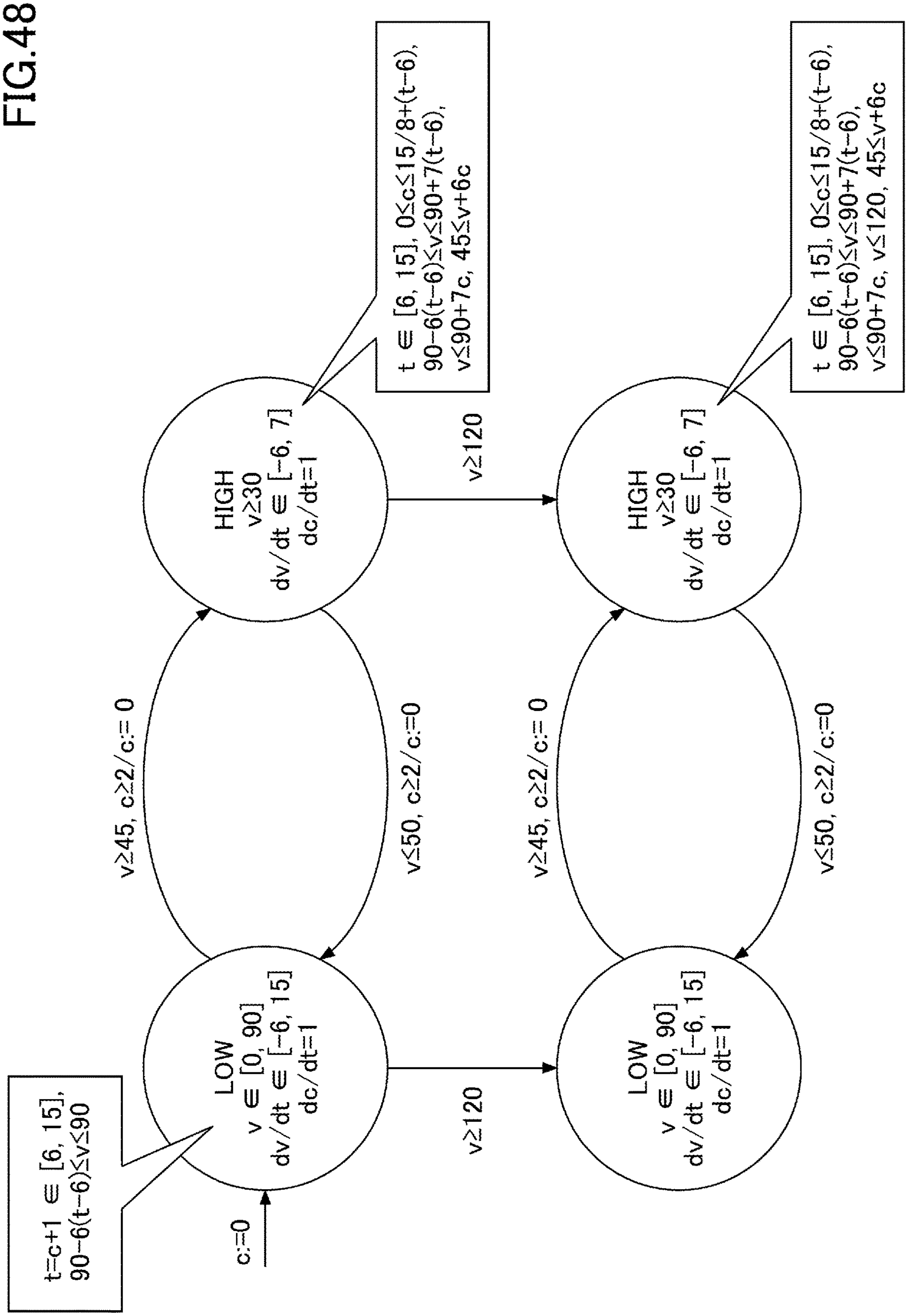
FIG. 48 is a diagram that shows a monitoring process according to one embodiment of the present disclosure.

Consequently, as shown in FIG. 48, the determining part 120 assumes that the present state has shifted from the high-speed mode of the upper-half hybrid automaton to the lower-half hybrid automaton for the insufficient range, and duplicates the conditions for the upper-half hybrid automaton's high-speed mode, as conditions for the lower-half hybrid automaton. However, v≥120 is added.

Figure 49:
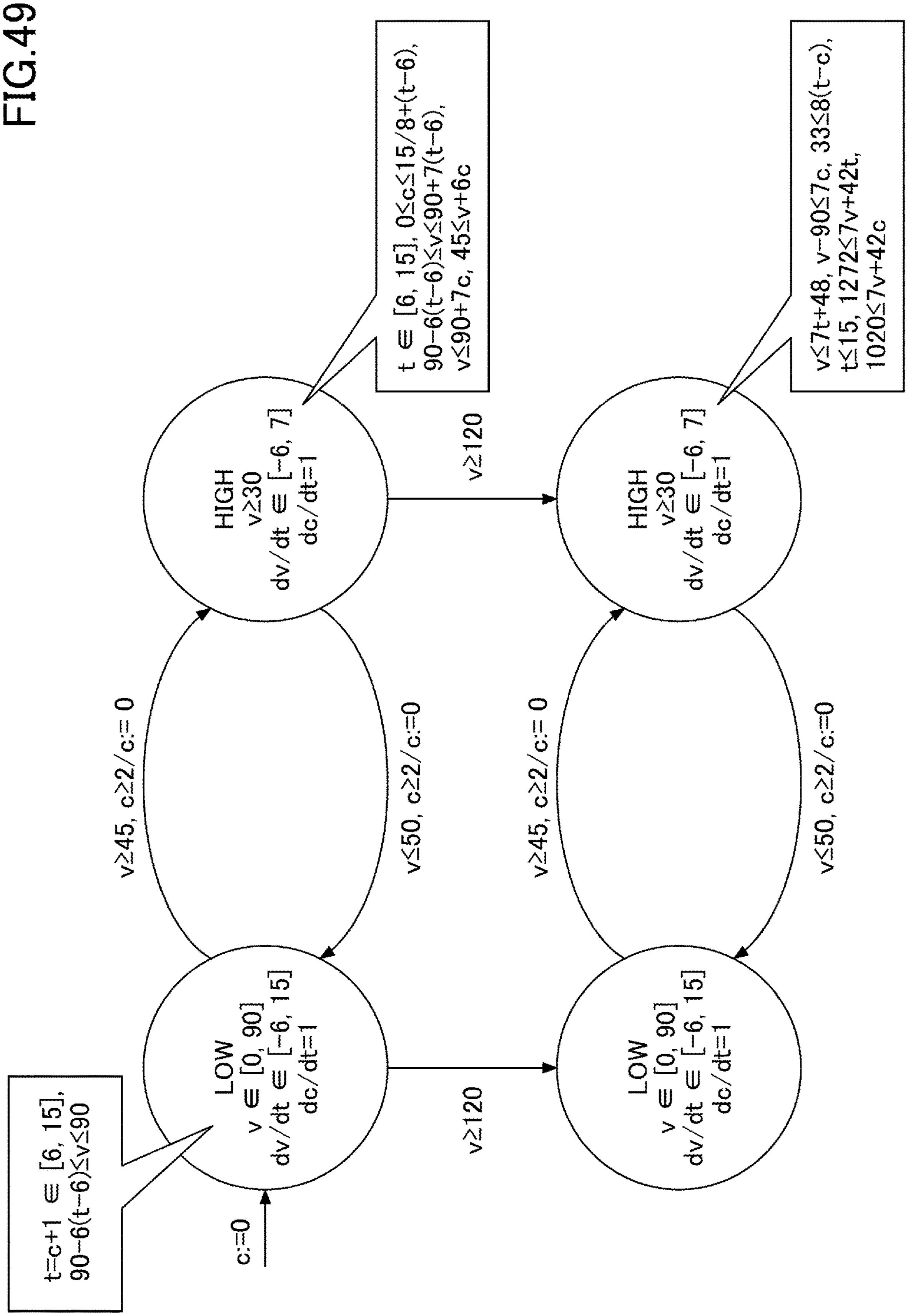
FIG. 49 is a diagram that shows a monitoring process according to one embodiment of the present disclosure.

Then, assuming that time passes in the high-speed mode of the lower-half hybrid automaton, as shown in FIG. 49, the range of the velocity v that can be reached in the forward direction by the third point in time (t=15) is given as v≤7t+48, v−90≤7c, 33≤8(t−c), t≤15, 1272≤7v+42t, and 1020≤7v+42c.

Since the derived range of the velocity v includes $v_3$=100 at t=15 and c=10, the determining part 120 can determine that the derived range can reach the insufficient range N "v>120," and determine that the automobile control system does not satisfy the specification φ.

[Modifications]

Although the observed values in the above-described embodiments are one-dimensional values such as temperature and velocity, the observed values according to the present disclosure are by no means limited to these, and vector values of two or more dimensions, such as the pair of temperature and humidity, the respective positions of N automobiles, and so forth may be used as well.

To illustrate an example of employing such observation vectors of two or more dimensions, a process of monitoring the inter-vehicle distance between two platooning automobiles may be considered. To determine whether the vehicle control system for platooning automobiles satisfies the specification that the inter-vehicle distance $x_1$−$x_2$ (where $x_i$ is the position of an automobile i) is always greater than or equal to 1, monitoring is performed based on observation vectors of each automobile's running position, sampled every 10 seconds.

The automobile control system according to the present embodiment maintains a distance between two automobiles by switching between a normal mode (NORMAL) and an inter-vehicle distance securing mode (WIDEN). Switching to the inter-vehicle distance securing mode is possible only when $x_1$−$x_2$≤4 holds, and switching to the normal mode is possible only when $x_1$−$x_2$≥4 holds. The velocity in the normal mode is $dx_1/dt$∈[7.5, 8.5] and $dx_2/dt$∈ [8.0, 9.0], and the velocity in the inter-vehicle distance securing mode is $dx_1/dt$∈[11.0, 13.0] and $dx_2/dt$∈[9.0, 11.0]. In this case, the hybrid automaton can be described by the state transition diagram shown in FIG. 50.

Figure 50:
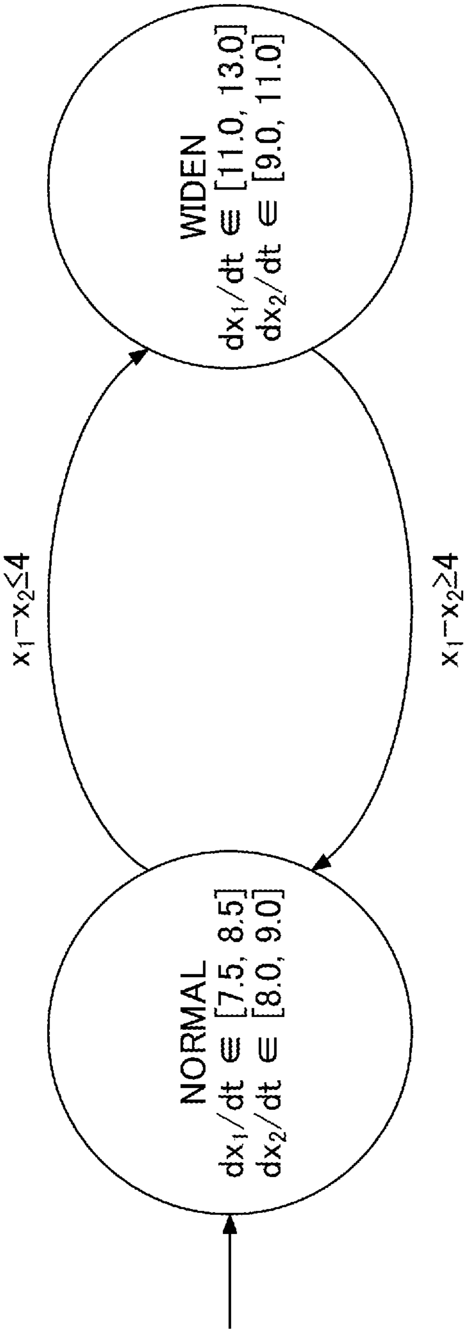
FIG. 50 is a state transition diagram that shows a hybrid automaton according to a modification of the present disclosure.
Figure 51:
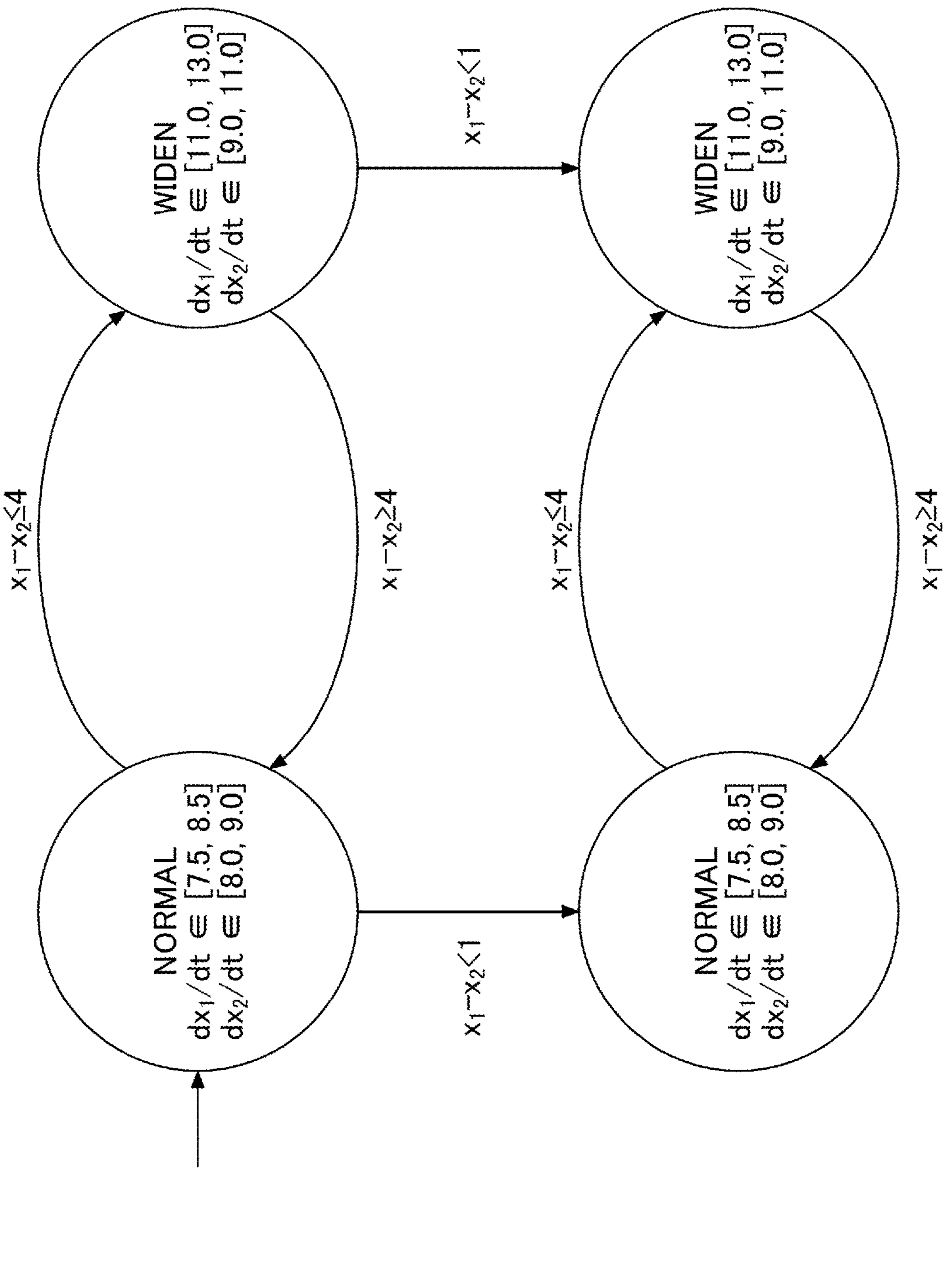
FIG. 51 is a state transition diagram that shows a hybrid automaton according to a modification of the present disclosure.

For example, assume that: at the first point in time (t=0), $x_1$=40 and $x_2$=25; at the second point in time (t=10), $x_1$=123 and $x_2$=25; and at the third point in time (t=20), $x_1$=203 and $x_2$=201. Then, the hybrid automaton shown in FIG. 50 is enhanced to include a hybrid automaton related to the insufficient range, as shown in FIG. 51.

Figure 52:
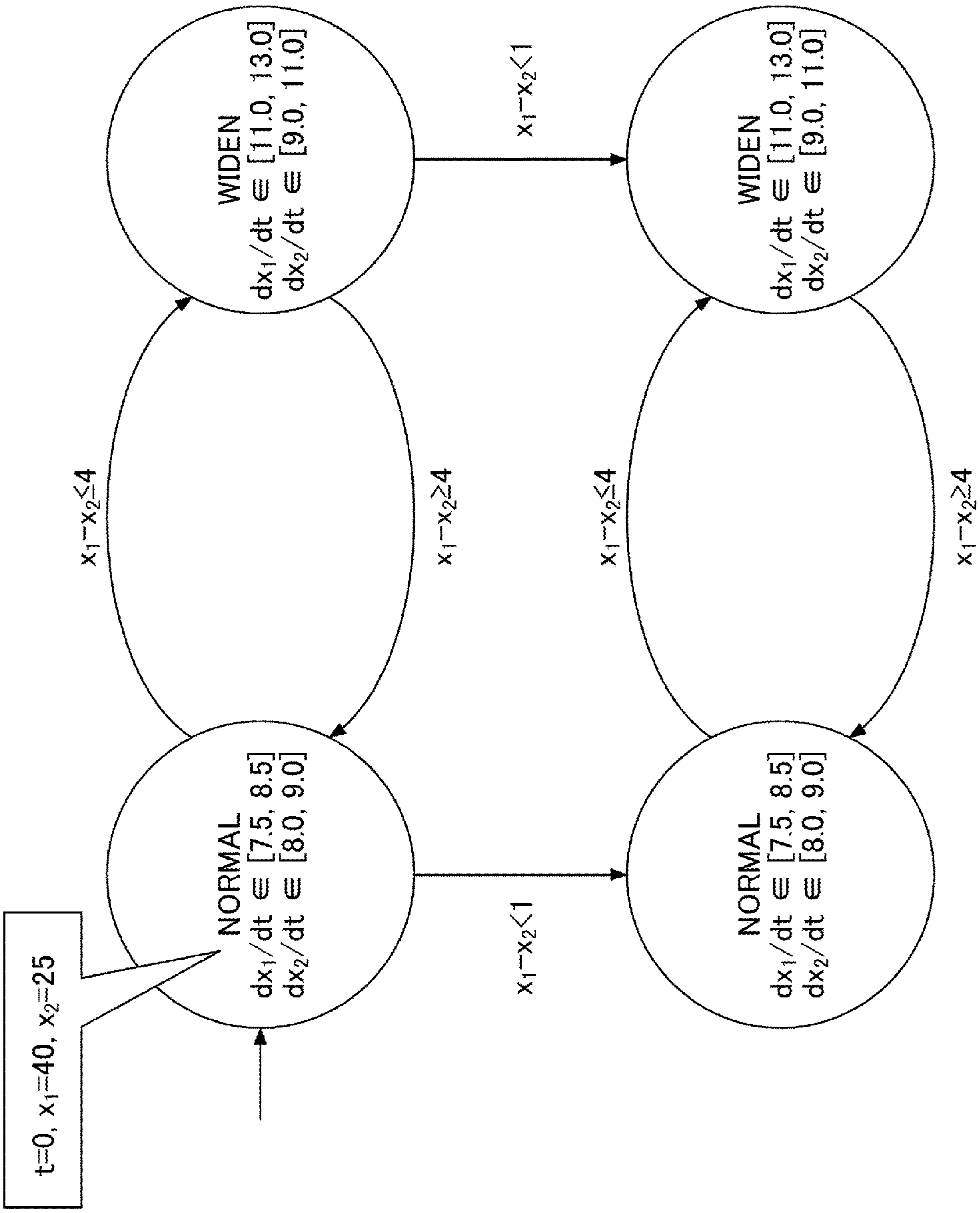
FIG. 52 is a diagram that shows a monitoring process according to a modification of the present disclosure.

First, for the first point in time (i=1), the determining part 120 sets the normal mode of the upper-half hybrid automaton, which corresponds to the observation vectors $x_1$=40 and $x_2$=25 at the first point in time (t=0) to an initial state, as shown in FIG. 52.

Figure 53:
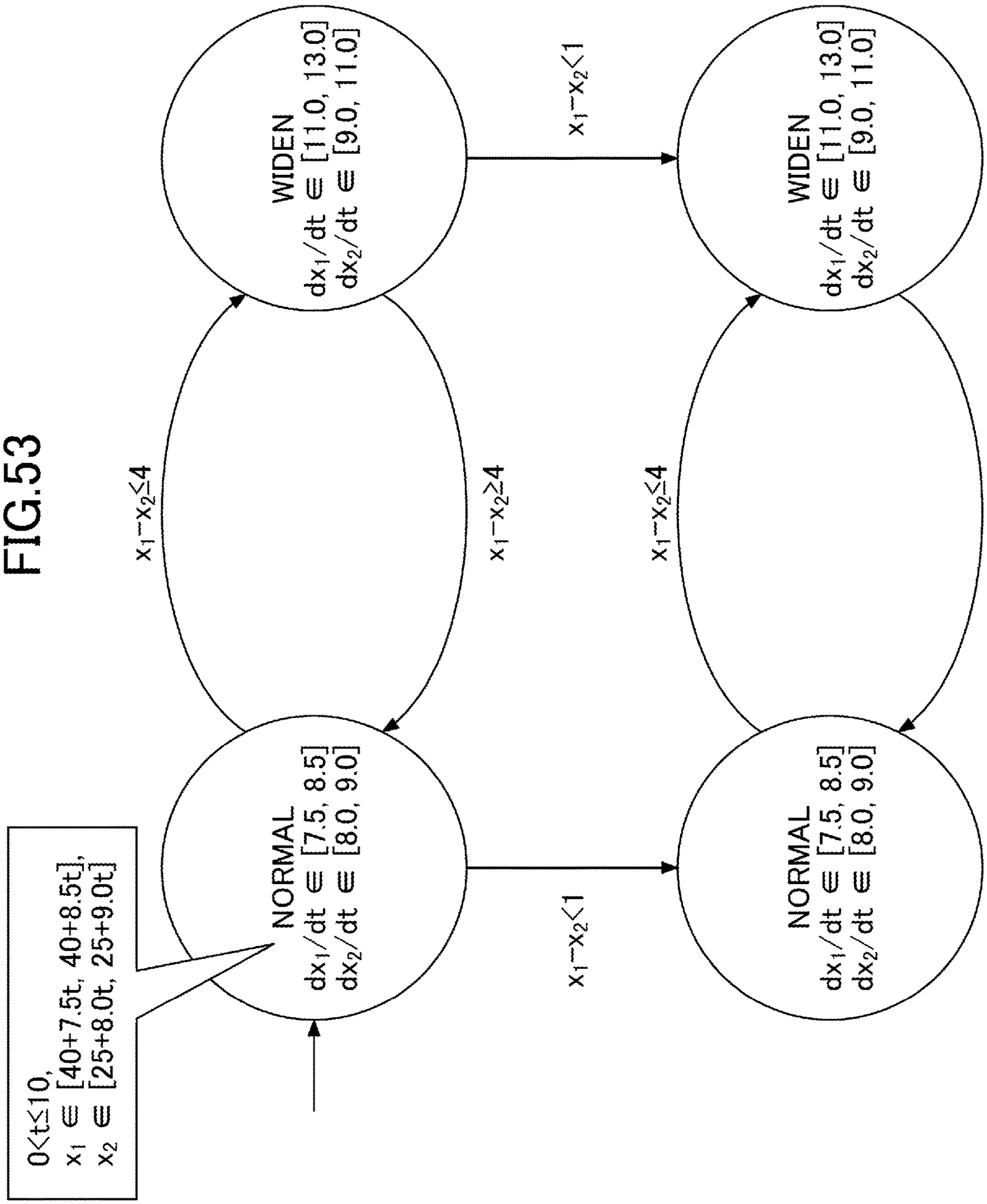
FIG. 53 is a diagram that shows a monitoring process according to a modification of the present disclosure.

Assuming that time passes in this initial state, the range of observation vectors that can be reached in the forward direction by a second point in time (t=10) is $x_1$∈[40+7.5t, 40+8.5t] and $x_2$∈[25+8.0t, 25+9.0t], as shown in FIG. 53.

Figure 54:
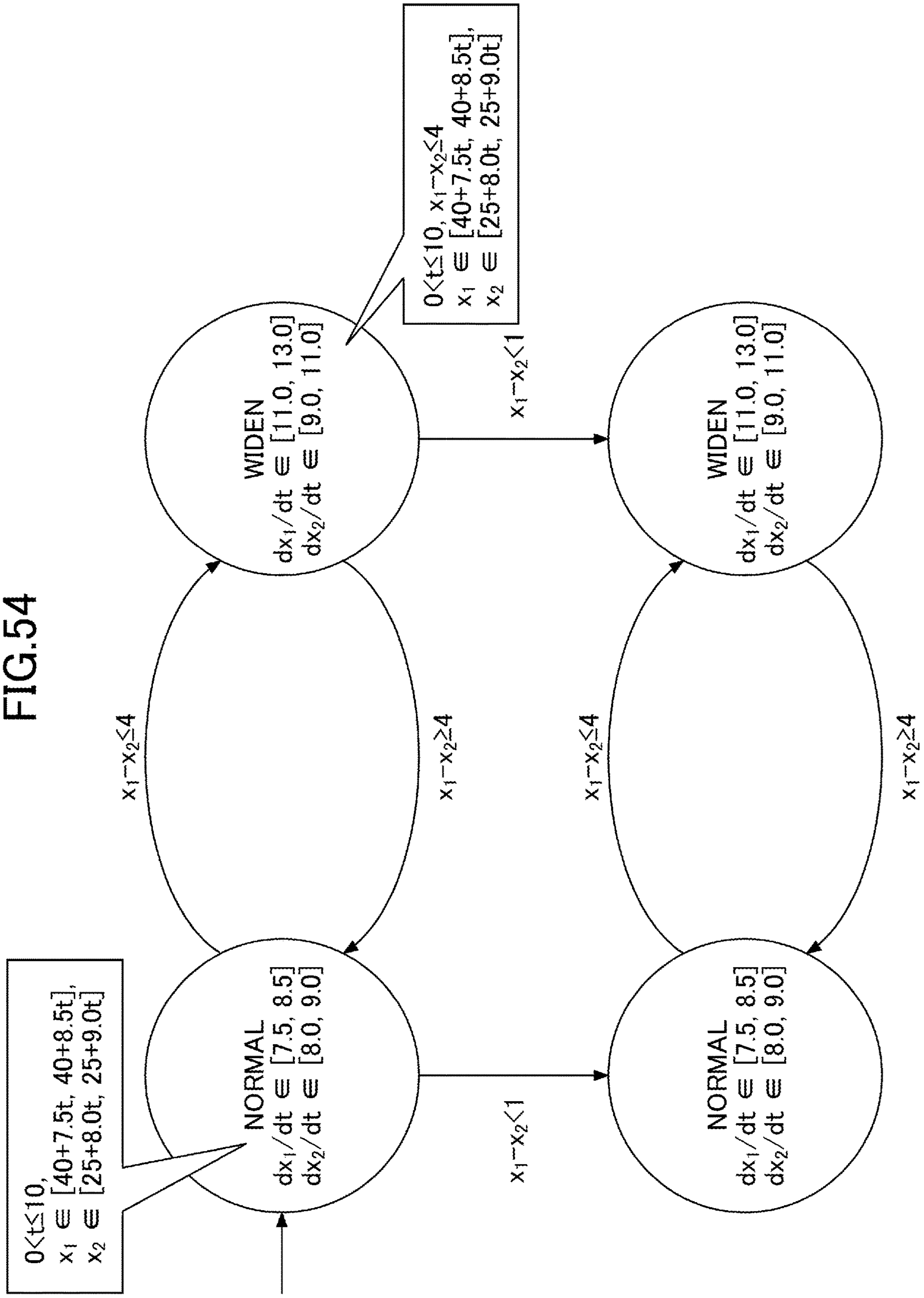
FIG. 54 is a diagram that shows a monitoring process according to a modification of the present disclosure.

Next, assuming that the normal mode of the initial state switches to the inter-vehicle distance securing mode of the upper-half hybrid automaton, the determining part 120, as shown in FIG. 54, derives 0<t≤10, $x_1$−$x_2$≤4, $x_1$∈[40+7.5t, 40+8.5t], and $x_2$∈[25+8.0t, 25+9.0t], from the normal mode prior to the shift and the conditions for the transition.

Figure 55:
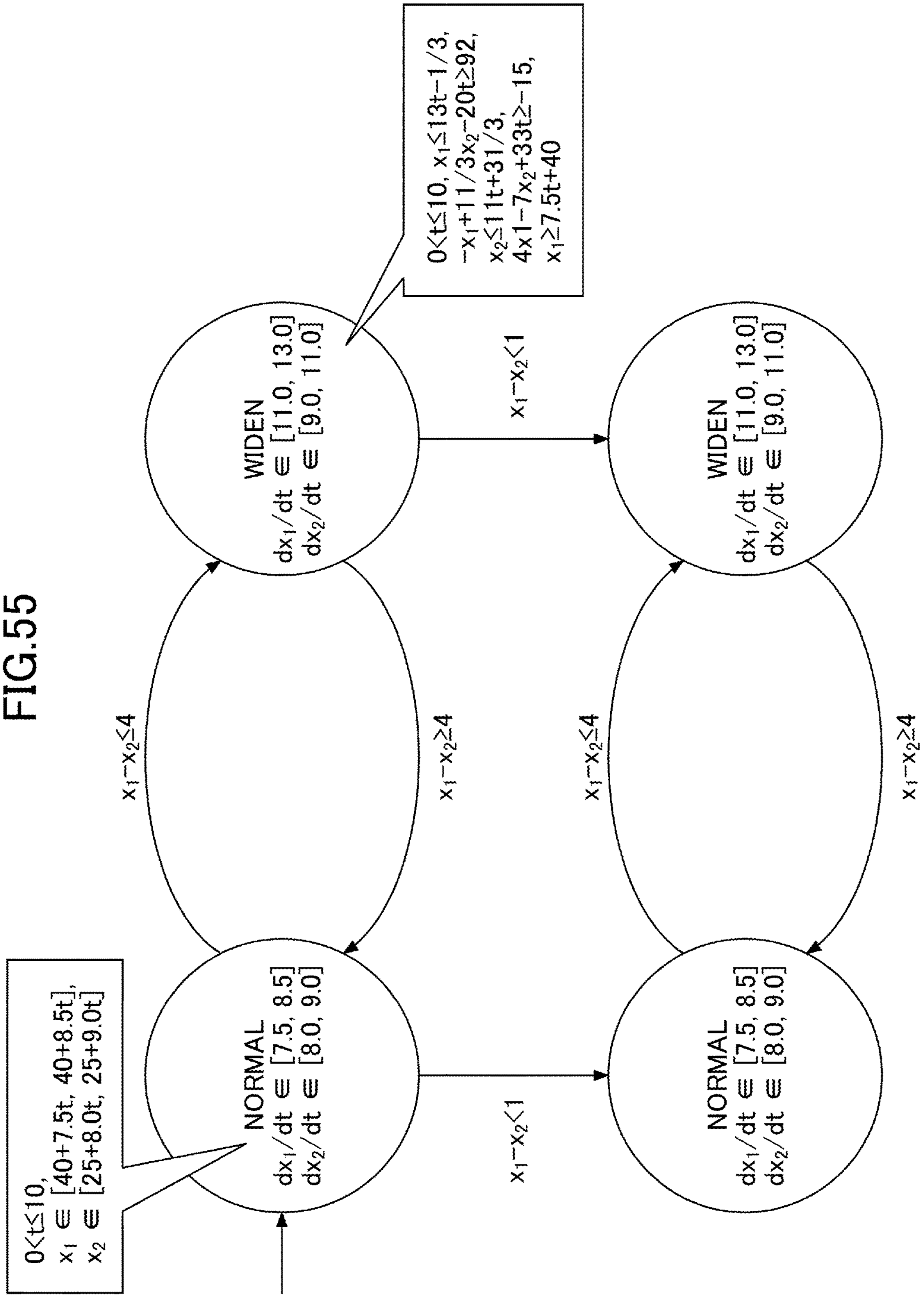
FIG. 55 is a diagram that shows a monitoring process according to a modification of the present disclosure.

Assuming that time passes in this inter-vehicle distance securing mode, the determining part 120 can derive, as shown in FIG. 55, a reachable range 0<t≤10, $x_1$≤13t−1/3, −$x_1$+11/3$x_2$−20t≥92, $x_2$≤11t+31/3, 4$x_1$−7$x_2$+33t≥−15, and $x_1$≥7.5t+40.

The determining part 120 determines whether the specification: "$x_1$−$x_2$ is always greater than or equal to 1" is satisfied, from the reachable ranges for the normal mode and inter-vehicle distance securing mode derived as described above. If the specification is satisfied, the determining part 120 similarly derives the reachable ranges for the observation vectors at the second point in time, and determines whether the specification is satisfied. On the other hand, if the specification is not satisfied, the determining part 120 determines that the automobile control system does not satisfy the specification.

Also, the calculation of reachable ranges described above may be carried out using linear hybrid automata. In linear hybrid automata, the differentiation of each observed value is given in the form of $a_1dx_1/dt+ \ldots +a_ndx_n/dt \leq c$. When a hybrid automaton is beyond the range of a linear hybrid automaton, it is not possible to calculate exact reachable ranges. For example, there may be a hybrid automaton including a differential equation such as dx/dt=1/x. However, even such a hybrid automaton can be handled by using approximation.

For example, $dx/dt=-0.01x+0.005y+2$, $x\in[0, 100]$, and $y\in[0, 100]$ and so forth do not constitute a linear hybrid automaton that can be expressed in the form of $a_1dx_1/dt+ \ldots +a_ndx_n/dt \leq c$, and it is therefore not possible to analyze, in a strict manner, where a hybrid automaton containing a differential equation like this can reach. However, by removing unnecessary variables by using, for example, $y\in[0, 100]$, $dx/dt\in[-0.01x+2, -0.01x+100*0.005+2]=[-0.01x+2, -0.01x+2.5]$, and $x\in[0, 100]$, and deriving, for example, $dx/dt\in[1, 2.5]$, the present disclosure is applicable. Removal of such variables is possible based on, for example, the Fourier-Motzkin (for detail, see "Frehse, Goran. "An introduction to hybrid automata, numerical simulation and reachability analysis." Formal Modeling and Verification of Cyber-Physical Systems. Springer Vieweg, Wiesbaden, 2015. pp. 50-81.").

Figure 56:
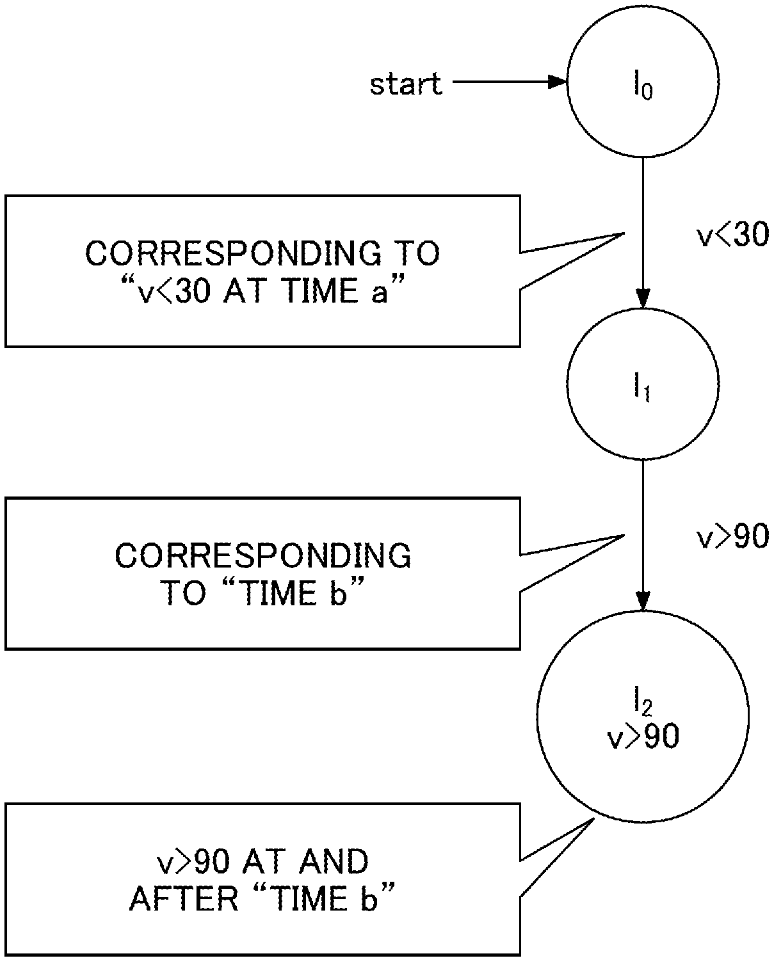
FIG. 56 is a state transition diagram that shows a hybrid automaton according to a modification of the present disclosure.
Figure 57:
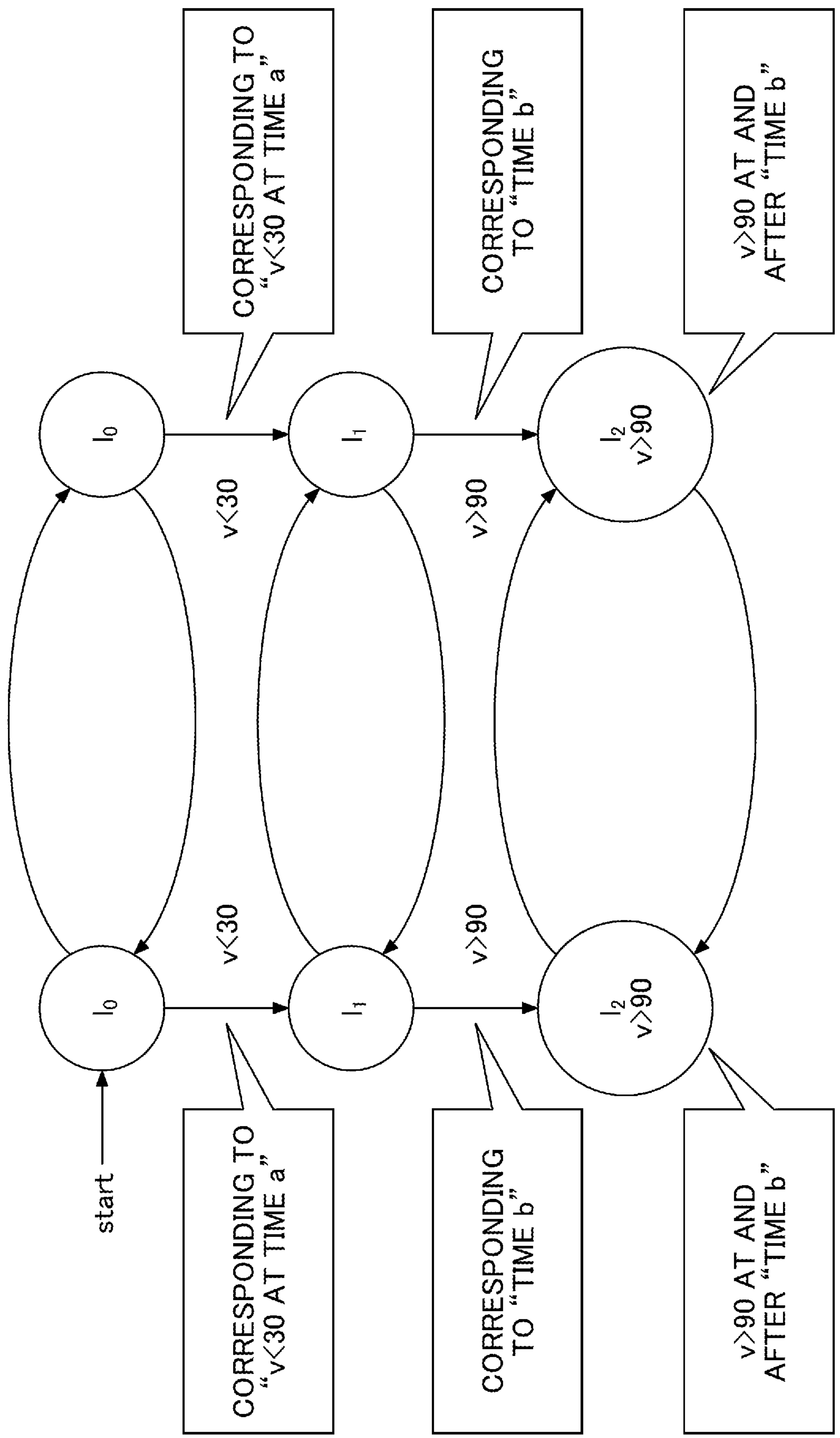
FIG. 57 is a state transition diagram that shows a hybrid automaton according to a modification of the present disclosure.

Also, the specification may relate to the passage of time. In the above-described embodiments, the specification is fixed regardless of time, but the present disclosure is also applicable to specifications that depend on the passage of time. For example, an automobile control system may employ a specification φ: "It is not good to satisfy v<30 at a certain point time a, and then always satisfy v>90 from a certain point in time b onward." This specification φ can be expressed, for example, by the hybrid automaton shown in FIG. 56. For example, assuming that an automobile control system controls an automobile in two operating states, hybrid automata incorporating the specification φ can be expressed by the state transition diagram shown in FIG. 57. That is, in the highest-layer hybrid automaton including the initial state, when the velocity v falls below 30 at time a, the state transitions to the intermediate-layer hybrid automaton. Subsequently, when the velocity v becomes higher than 90 at time b, the state transitions to the lowest-layer hybrid automaton. In this way, the specification φ that depends on the passage of time can be expressed by hybrid automata.

Although embodiments of the present invention have been described in detail above, the present invention is by no means limited to the specific embodiments described above, and various changes and modifications can be made within the scope of the present invention recited in the accompanying claims.

The invention claimed is:

1. A cyber-physical system comprising:

a physical system associated with a time-varying parameter;

an Internet of Things (IoT) device configured to sample the time-varying parameter of the physical system at discrete time intervals to generate observed values of a variable, the IoT device being configured to operate at a sampling interval extended for reduced power consumption such that unobserved time intervals exist between successive observed values; and an information system configured to monitor a behavior of the physical system, the information system comprising:

a processor and a memory storing instructions that, when executed by the processor, cause the processor to:

acquire the observed values of the variable generated by the IoT device while the physical system is running;

determine a range of possible observed values reached by the variable during the unobserved time intervals, based on the acquired observed values; and determine whether a variation range of the acquired observed values satisfies a specification, based on an overlap between the range of the possible observed values and a range not satisfying the specification.

2. The cyber-physical system according to claim 1, wherein the physical system is expressed by a first hybrid automaton.

3. The cyber-physical system according to claim 2, wherein each state in the first hybrid automaton is defined by an individual operation mode and a differential equation that shows variation of the acquired observed values in accordance with small changes in time.

4. The cyber-physical system according to claim 1, wherein the processor is further configured to:

determine a first range of the possible observed values that the variable possibly reaches in a forward direction between a time i and a time (i+1), and a second range of the possible observed values that the variable possibly reaches in a backward direction between time (i+1) and time i; and determine whether the variation range of the acquired observed values satisfies the specification, based on whether or not there is a first overlap between a common range of the first range of the possible observed values and the second range of the possible observed values, and the range not satisfying the specification.

5. The cyber-physical system according to claim 1, wherein the processor is further configured to:

determine a third range of the possible observed values that the variable possibly reaches from time i in a forward direction on a time axis;

determine a second overlap between the third range of the possible observed values and the range not satisfying the specification; and determine whether the variation range of the acquired observed values satisfies the specification, based on whether a fourth range of the possible observed values that the variable possibly reaches from the second overlap in the forward direction on the time axis includes an observed value at time (i+1).

6. The cyber-physical system according to claim 5, wherein the processor is further configured to use a second hybrid automaton that is derived by adding a state not satisfying the specification, to states of a first hybrid automaton expressing the physical system.

7. A computer-executable monitoring method comprising:

acquiring observed values of a variable generated by an IoT device that samples a time-varying parameter of a physical system while the physical system is running, the IoT device being configured to operate at a sampling interval extended for reduced power consumption such that unobserved time intervals exist between successive observed values.

8. The monitoring method according to claim 7, wherein the physical system is expressed by a first hybrid automaton.

9. The monitoring method according to claim 8, wherein each state in the first hybrid automaton is defined by an individual operation mode and a differential equation that shows variation of the acquired observed values in accordance with small changes in time.

10. The monitoring method according to claim 7, wherein determining whether the variation range of the acquired observed values satisfies the specification includes:

determining a first range of the possible observed values that the variable possibly reaches in a forward direction between a time i and a time (i+1), and a second range of the possible observed values that the variable possibly reaches in a backward direction between time (i+1) and time i; and determining whether the variation range of the acquired observed values satisfies the specification, based on whether or not there is a first overlap between a common range of the first range of the possible observed values and the second range of the possible observed values, and the range not satisfying the specification.

11. The monitoring method according to claim 7, wherein determining whether the variation range of the acquired observed values satisfies the specification includes:

determining a third range of the possible observed values that the variable possibly reaches from time i in a forward direction on a time axis;

determining a second overlap between the third range of the possible observed values and the range not satisfying the specification; and determining whether the variation range of the acquired observed values satisfies the specification, based on whether a fourth range of the possible observed values that the variable possibly reaches from the second overlap in the forward direction on the time axis includes the observed value at time (i+1).

12. The monitoring method according to claim 11, wherein determining whether the variation range of the acquired observed values satisfies the specification includes using a second hybrid automaton that is derived by adding a state not satisfying the specification, to states of a first hybrid automaton expressing the physical system.

* * * * *